United States Patent
Carver et al.

(10) Patent No.: US 9,899,846 B2
(45) Date of Patent: Feb. 20, 2018

(54) ENTROPIC ENERGY TRANSFER METHODS AND CIRCUITS

(71) Applicant: Carver Scientific, Inc., Baton Rouge, LA (US)

(72) Inventors: David Reginald Carver, Baton Rouge, LA (US); Sean Claudius Hall, Baton Rouge, LA (US); Sean William Reynolds, Baton Rouge, LA (US)

(73) Assignee: Carver Scientific, Inc., Baton Rouge, LA (US)

( * ) Notice: Subject to any disclaimer, the term of this patent is extended or adjusted under 35 U.S.C. 154(b) by 381 days.

(21) Appl. No.: 14/729,851

(22) Filed: Jun. 3, 2015

(65) Prior Publication Data
US 2015/0270710 A1  Sep. 24, 2015

Related U.S. Application Data

(63) Continuation-in-part of application No. 14/574,175, filed on Dec. 17, 2014, which is a
(Continued)

(51) Int. Cl.
*H02J 7/00* (2006.01)
*C08F 232/06* (2006.01)
*H02J 7/34* (2006.01)

(52) U.S. Cl.
CPC .......... *H02J 7/0024* (2013.01); *C08F 232/06* (2013.01); *H02J 7/345* (2013.01)

(58) Field of Classification Search
CPC .................................................. H02J 7/0024
(Continued)

(56) References Cited

U.S. PATENT DOCUMENTS

| 2,798,990 A | 7/1957 | Davis |
| 3,342,754 A | 9/1967 | Gorham |

(Continued)

FOREIGN PATENT DOCUMENTS

EP  2 278 685 A2  1/2011

OTHER PUBLICATIONS

International Search Report and Written Opinion, dated Mar. 21, 2016, issued in corresponding International Application No. PCT/US2015/065679.
(Continued)

*Primary Examiner* — Suresh Memula
(74) *Attorney, Agent, or Firm* — Klarquist Sparkman, LLP

(57) ABSTRACT

Embodiments of methods for discharging an entropic energy storage device (EESD) that stores and releases entropic energy are disclosed. Embodiments of circuits including the EESD also are disclosed. The method includes providing a circuit including an EESD charged to a first voltage level, the EESD including first and second electrodes with a dielectric film positioned there between, the dielectric film comprising an entropic material, and the first electrode charged positively or negatively with respect to the second electrode; and applying a reversed polarization electric potential to the first electrode of the EESD in a first mode of operation of the circuit for a discharge period of time, thereby supplying power from the EESD to a load. In some embodiments, the method includes a pulsed discharge of the EESD with alternating discharge and recovery periods of time.

26 Claims, 23 Drawing Sheets

Related U.S. Application Data continuation-in-part of application No. 14/156,457, filed on Jan. 16, 2014, now Pat. No. 8,940,850, which is a continuation-in-part of application No. 13/853,712, filed on Mar. 29, 2013, now Pat. No. 9,011,627, and a continuation-in-part of application No. 13/599,996, filed on Aug. 30, 2012, now Pat. No. 8,633,289.

(60) Provisional application No. 61/808,733, filed on Apr. 5, 2013.

(58) Field of Classification Search
USPC .......................................................... 320/131
See application file for complete search history.

(56) References Cited

U.S. PATENT DOCUMENTS

| | | | |
|---|---|---|---|
| 3,616,314 | A | 10/1971 | Settineri et al. |
| 3,907,748 | A | 9/1975 | Marvel et al. |
| 4,359,327 | A | 11/1982 | Armand et al. |
| 4,500,562 | A | 2/1985 | Jahn et al. |
| 4,532,369 | A | 7/1985 | Härtner |
| 4,649,468 | A | 3/1987 | Cubbison, Jr. |
| 4,675,462 | A | 6/1987 | Ungarelli et al. |
| 4,734,533 | A | 3/1988 | Ungarelli et al. |
| 4,769,505 | A | 9/1988 | Lee et al. |
| 4,795,838 | A | 1/1989 | Bornengo et al. |
| 4,806,702 | A | 2/1989 | Lee et al. |
| 4,816,608 | A | 3/1989 | Bornengo et al. |
| 4,849,559 | A | 7/1989 | Lee et al. |
| 4,853,488 | A | 8/1989 | Ungarelli et al. |
| 4,886,923 | A | 12/1989 | Ungarelli et al. |
| 4,942,061 | A | 7/1990 | Domes |
| 5,110,903 | A | 5/1992 | Lee et al. |
| 5,144,529 | A | 9/1992 | Takahashi |
| 5,266,291 | A | 11/1993 | Drnevich et al. |
| 6,341,056 | B1 | 1/2002 | Allman et al. |
| 8,164,881 | B2 | 4/2012 | Hu et al. |
| 8,223,058 | B2 | 7/2012 | Kobayashi et al. |
| 8,525,487 | B1 | 9/2013 | Stevenson |
| 8,633,289 | B2 | 1/2014 | Carver et al. |
| 8,940,850 | B2 | 1/2015 | Carver et al. |
| 9,011,627 | B2 | 4/2015 | Carver |
| 2006/0074164 | A1 | 4/2006 | Slenes et al. |
| 2008/0316678 | A1 | 12/2008 | Ehrenberg et al. |
| 2009/0243536 | A1 | 10/2009 | Whitehouse et al. |
| 2012/0081022 | A1 | 4/2012 | Moussakov et al. |
| 2012/0241085 | A1 | 9/2012 | Carver |
| 2013/0229157 | A1 | 9/2013 | Carver |
| 2015/0131198 | A1 | 5/2015 | Carver et al. |

OTHER PUBLICATIONS

"Boost Converter," <https://en.wikipedia.org/wiki/Boost_converter>, 7pp., accessed Nov. 12, 2015.

"Buck Converter," <https://en.wikipedia.org/wiki/Buck_converter>, 16pp., accessed Nov. 12, 2015.

"Charge Pump," <https://en.wikipedia.org/wiki/Charge_pump>, 4pp., accessed Nov. 12, 2015.

Definition for dielectric material, < http://whatis.techtarget.com/defi-nition/dielectric-material>, 11pp., accessed Nov. 9, 2015.

"Sample and Hold," <http://en.wikipedia.org/wiki/Sample_and_hold>, 3pp., accessed Nov. 12, 2015.

"Aluminum Electrolytic Capacitors (Radial Lead Type)," Panasonic, Mar. 2016, 3 pages.

"Carver EESD Product Overviews," Carver Scientific, Inc., 2017, 1 page.

"Electric Double Layer Capacitors (Gold Capacitor), Series: HL," Panasonic, Jan. 2015, 1 page.

"Gold Capacitors—Electric Double Layer Capacitors" Products Catalog, Panasonic, Jan. 2017, 28 pages.

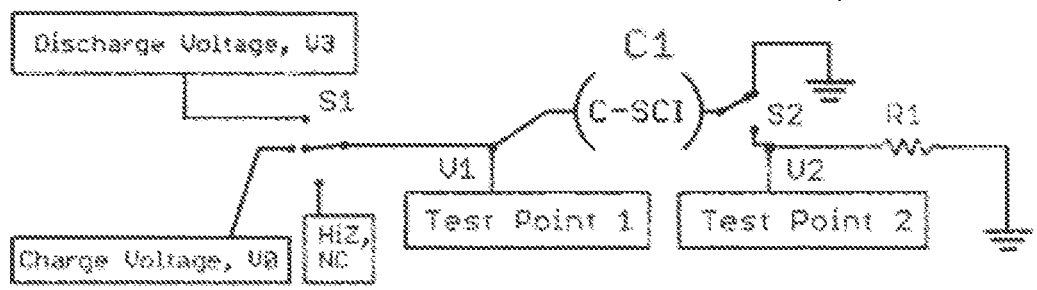
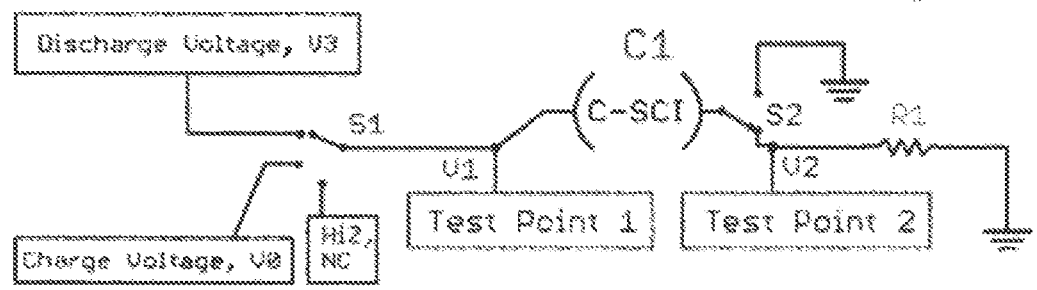
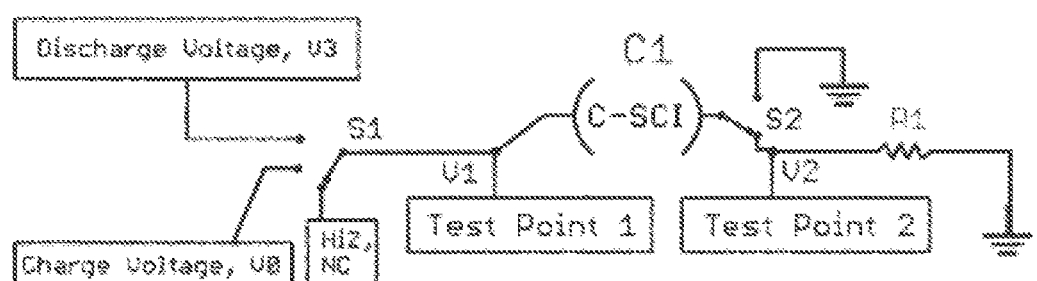
FIG. 4

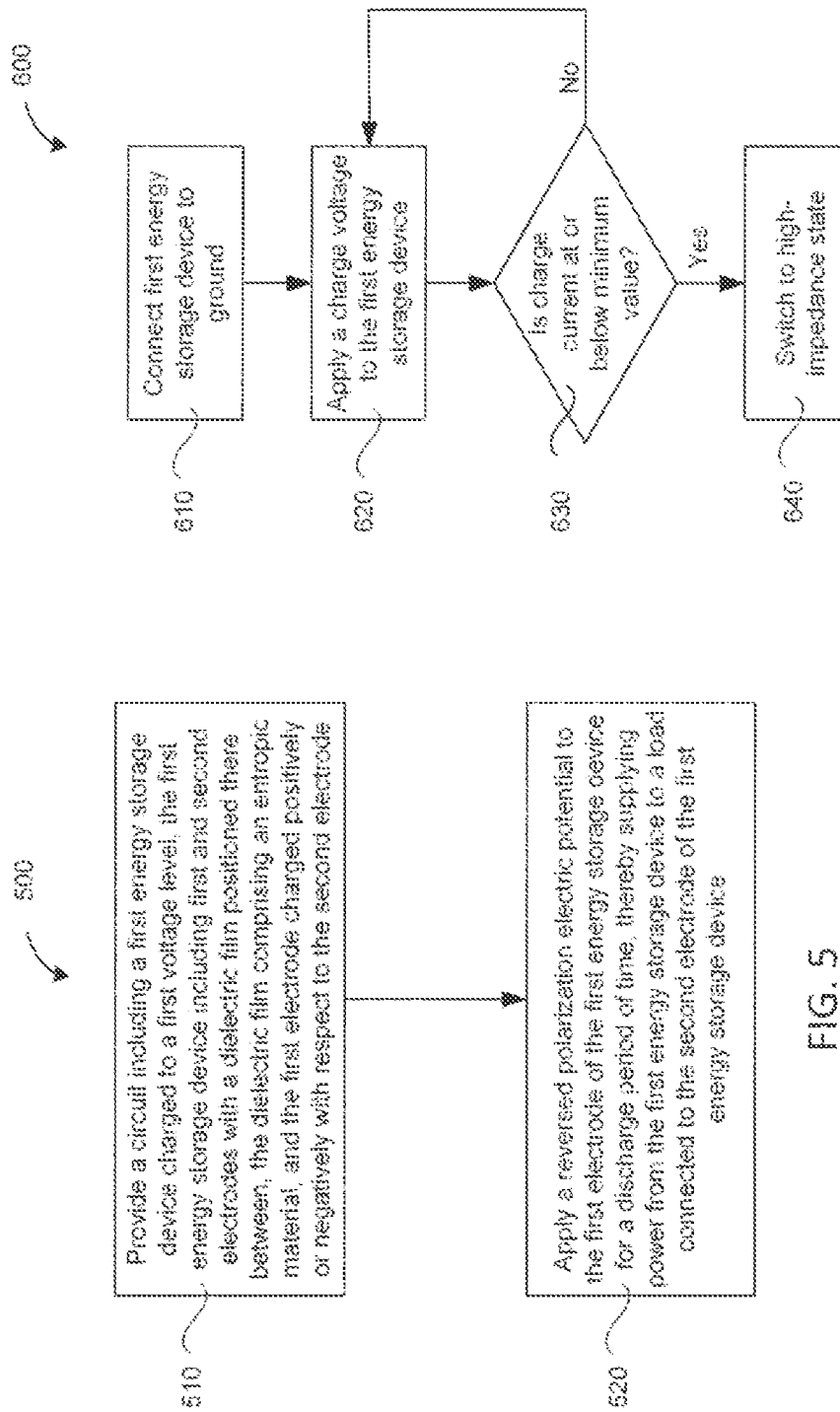

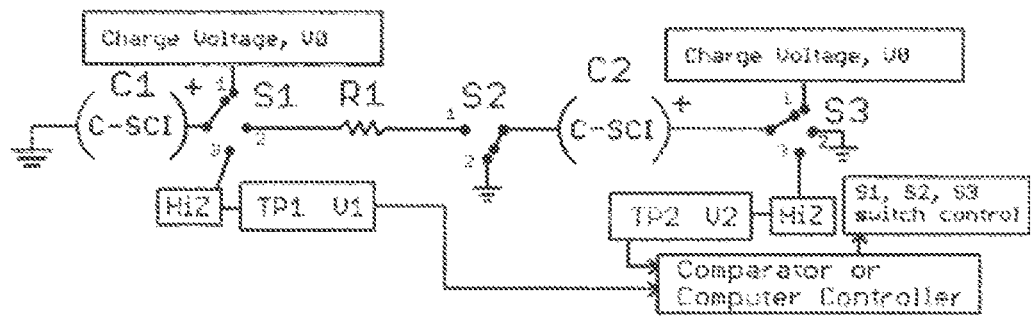
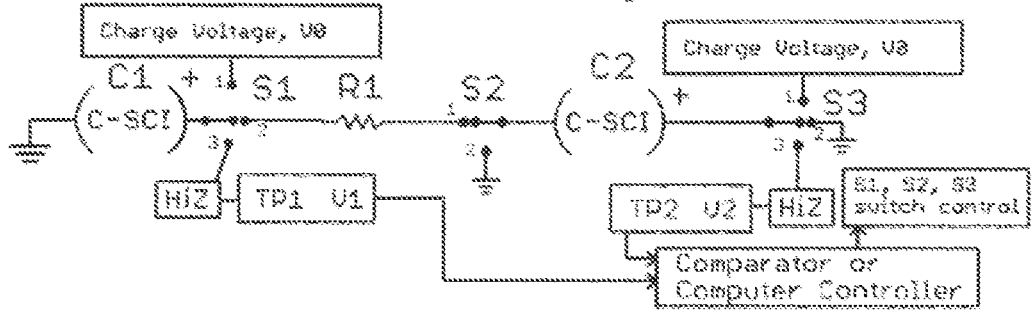
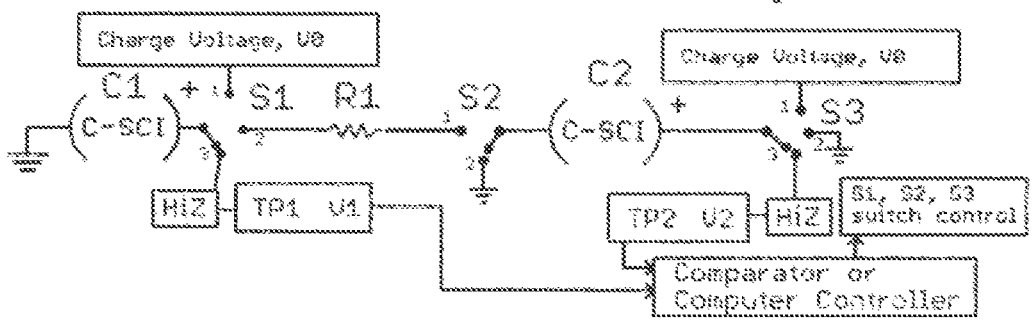
FIG. 7

ENTROPIC ENERGY TRANSFER METHODS AND CIRCUITS

CROSS REFERENCE TO RELATED APPLICATIONS

This application is a continuation-in-part of U.S. application Ser. No. 14/574,175, filed Dec. 17, 2014, which is a continuation-in-part of U.S. application Ser. No. 14/156,457, filed Jan. 16, 2014, issued as U.S. Pat. No. 8,940,850 on Jan. 27, 2015, which claims the benefit of U.S. Provisional Application No. 61/808,733, filed Apr. 5, 2013, and which is a continuation-in-part of U.S. application Ser. No. 13/853,712, filed on Mar. 29, 2013, issued as U.S. Pat. No. 9,011,627 on Apr. 21, 2015, and a continuation-in-part of U.S. application Ser. No. 13/599,996, filed on Aug. 30, 2012, issued as U.S. Pat. No. 8,633,289 on Jan. 21, 2014, each of which is incorporated herein in its entirety by reference.

FIELD

This disclosure concerns methods of discharging an energy storage device that stores and releases entropic energy, as well as embodiments of circuits including the energy storage device.

BACKGROUND

Electrostatic capacitance is a method of energy storage that has not been widely used for bulk electrical energy storage. As a method of energy storage, electrostatic capacitors have excelled at the speed with which they can accumulate and discharge energy. The physical mechanisms by which such energy storage can take place are widely documented and described. In general the charge and discharge mechanisms for traditional electrostatic energy storage in a dielectric material is in a time-domain regime of picoseconds to hundreds of microseconds.

There has been a recent trend in the use of electrochemical capacitors for enhanced storage of electrical energy. These capacitors derive their enhanced characteristics from two primary mechanisms: double layer capacitance and pseudo-capacitance. Double layer-type capacitors use an electrical double layer (explained below) to achieve a very small charge separation (d), which increases electric field (E) for a given voltage, increases capacitance (C) and consequently increases the energy stored (U) for the given voltage versus a conventional planar surface capacitor, as apparent in Eqs. 1 through 3 below.

$$E = \frac{V}{d} \qquad \text{Eq. 1}$$

where E=electric field, V=potential difference or voltage, and d=separation of charged plates.

$$C = \frac{k\varepsilon_0 A}{d} \qquad \text{Eq. 2}$$

where k=relative permittivity or dielectric, C=capacitance, ∈0=permittivity of free space, and A=cross-sectional surface area.

$$U = \frac{1}{2}CV^2 \qquad \text{Eq. 3}$$

where U=energy stored, C=capacitance and V=voltage.

Practically, the smaller thickness (d) allows for much more surface area of the plates to be packaged (usually rolled or stacked) in a given volume. As evident from Eq. 2, this area increase also significantly increases capacitance. Devices of the above described nature are commonly referred to as electric double layer capacitors (EDLCs).

In pseudocapacitors, which are a hybrid between double-layer capacitors and batteries, both the bulk and the surface of the material play key roles. They thus can store much more energy than conventional planar surface capacitors, but face many of the same reliability and scientific challenges as advanced batteries, including high cost due to expensive raw materials and complex processing. Pseudocapacitance imitates battery technology by storing energy in chemical reactions (oxidation and reduction) which take place at or very near the surface of the relevant electrodes. The surface nature of the reactions is the distinguishing characteristic from chemical battery technology. Either or both of these effects (i.e., double layer and pseudocapacitance) may be used in so called "supercapacitors."

Current EDLCs can handle only low voltages before breakdown. In order to attain the higher voltages necessary for many practical applications (such as electric vehicles), low voltage EDLCs are connected in series much in the same way batteries are series-connected for high voltage use.

A need exists for energy storage devices with greater storage capacity, that can be connected in series, and that are capable of handling higher voltages. A need also exists for a method for discharging such energy storage devices.

SUMMARY

This disclosure concerns embodiments of a method for discharging an entropic energy storage device (EESD). Embodiments of circuits including one or more EESDs also are disclosed.

A method of supplying energy from an energy storage device to a load includes (i) providing a circuit including a first energy storage device charged to a first voltage level, the first energy storage device including first and second electrodes with a dielectric film positioned there between, the dielectric film comprising an entropic material, and the first electrode charged positively or negatively with respect to the second electrode; and (ii) applying a reversed polarization electric potential to the first electrode of the first energy storage device in a first mode of operation of the circuit for a discharge period of time, thereby supplying power from the first energy storage device to a load connected to the second electrode of the first energy storage device. In some embodiments, the reversed polarization electric potential is less than the first voltage level and less than a voltage that would be generated by the first energy storage device in a high impedance state. In certain embodiments, the first electrode is charged positively with respect to the second electrode, and applying the reversed polarization electric potential to the first electrode comprises applying a negative voltage to the first electrode. In any or all of the foregoing embodiments, the circuit may include a plurality of first energy storage devices connected in series.

Providing the first energy storage device charged to a first voltage, may include connecting the first energy storage device to ground, and applying a charge voltage to the first energy storage device for a period of time effective to charge the first energy storage device to the first voltage. In some embodiments, charging the first energy storage device also includes monitoring a charge current of the first energy storage device while applying the charge voltage, comparing the charge current to a selected minimum value, and when the charge current is at or below the selected minimum level, switching the circuit to a second mode of operation in which the circuit is in a high-impedance state so that the first energy storage device does not receive the charge voltage and so that substantially no energy is supplied from the first energy storage device to the load.

In an independent embodiment, the circuit further includes a second energy storage device charged to a first voltage level and coupled in series with the first energy storage device, a first switch operable to connect the second energy storage device to ground and a second switch operable to connect the second energy storage device to the load, and applying a reversed polarization electric potential to the first electrode of the first energy storage device in the first mode of operation of the circuit comprises actuating the first switch to connect the second energy storage device to ground and actuating the second switch to connect the second energy storage device to the load. The second energy storage device may include first and second electrodes with a dielectric film positioned there between, the dielectric film comprising an entropic material.

In any or all of the above embodiments, the method of supplying energy from an energy storage device to a load may further include switching the circuit to a second mode of operation for at least a threshold recovery period of time to provide a voltage recovery period during which the circuit is in a high-impedance state so that substantially no energy is supplied from the first energy storage device to the load and the entropic material is restored to a desired level of entropic equilibrium, and repeatedly switching the circuit between the first and second modes of operation without recharging the first energy storage device from an external power source. In some embodiments, the discharge period of time and the recovery period of time collectively constitute a duty cycle, and wherein the discharge period of time is 0.1-99.9% of the duty cycle. In any of the foregoing embodiments, if the energy storage device is disconnected from the load while in the second mode of operation, the method further comprises reconnecting the energy storage device to the load before switching the circuit from the second mode of operation to the first mode of operation.

In some embodiments, switching the circuit between the first and second modes of operation may be performed by a controller. In one embodiment, the method includes (i) monitoring a voltage of the first energy storage device with a controller while in the first mode of operation until the voltage reaches a desired discharge voltage level; (ii) switching the circuit from the first mode of operation to the second mode of operation with the controller when the desired discharge voltage level is reached; (iii) monitoring the voltage of the first energy storage device with the controller while in the second mode of operation until the voltage reaches a desired recovery voltage level; and (iv) switching the circuit from the second mode of operation to the first mode of operation with the controller when the desired recovery voltage level is reached. In an independent embodiment, the method includes (a) receiving, with a controller, a time value for the discharge period of time; (b) receiving, with the controller, a time value for the recovery period of time; (c) monitoring the discharge period of time with the controller while the circuit is in the first mode of operation; (d) switching the circuit from the first mode of operation to the second mode of operation with the controller when the time value for the discharge period of time is reached; (e) monitoring the recovery period of time with the controller while the circuit is in the second mode of operation; (f) receiving, with the controller, current and voltage levels of the first energy storage device after the time value for the recovery period of time is reached; (g) comparing, with the controller, the current and voltage levels to target values of the current and voltage levels to provide target value comparisons; and (i) updating, with the controller, the time values for the discharge period of time and the recovery period of time based at least in part on the target value comparisons. Optionally, the method further includes (j) switching the circuit from the second mode of operation to the first mode of operation with the controller; and (k) repeating steps (c)-(i).

In any or all of the above embodiments, the circuit may comprise an array of first energy storage devices, the array comprising m rows connected in parallel of n energy storage devices connected in series, wherein m and n independently are integers greater than one. In such embodiments, the method also includes connecting the load to a first row of the array via a multi-position switch; applying the reversed polarization electric potential to a first electrode of a first energy storage device in the first row of the array for a first discharge period of time, thereby supplying power from the first row of the array to the load; after the first discharge period of time, connecting the load to a subsequent row of the array via the multi-position switch; and applying the reversed polarization electric potential to a first electrode of a first energy storage device in the subsequent row of the array for a subsequent discharge period of time, thereby supplying power from the subsequent row of the array to the load.

An exemplary circuit includes (a) a first energy storage device as described herein; (b) a second energy storage device including first and second electrodes with a dielectric film positioned there between, the first electrode charged positively or negatively with respect to the second electrode; (c) a first multi-position switch connected to the first electrode of the first energy storage device and adapted to (i) couple the first electrode of the first energy storage device to a charge voltage source, (ii) couple the first electrode of the first energy storage device to a load, or (iii) place the first energy storage device in a high-impedance state so that substantially no energy is supplied from the first energy storage device to a load; (d) a second multi-position switch connected to the second electrode of the second energy storage device and adapted to couple the second electrode of the second energy storage device to a load or to ground; and (e) a third multi-position switch connected to the first electrode of the second energy storage device and adapted to (i) couple the first electrode of the second energy storage device to a charge voltage, (ii) couple the first electrode of the second energy storage device to ground, or (iii) place the second energy storage device in a high-impedance state in conjunction with the second multi-position switch positioned to connect the second electrode of the second energy storage device to ground. In some embodiments, the dielectric film of the second energy storage device comprises a dielectric material. The circuit may further include a controller operable to actuate the first, second, and third multi-position switches.

In an independent embodiment, an exemplary circuit includes (a) a first array of energy storage devices as disclosed herein, the first array comprising $m_1$ rows in parallel of $n_1$ energy storage devices connected in series, wherein $m_1$ and $n_1$ are integers; (b) a second array of energy storage devices, the second array comprising $m_2$ rows in parallel of $n_2$ energy storage devices connected in series, wherein $m_2$ and $n_2$ are integers, each energy storage device of the second array including first and second electrodes with a dielectric film positioned there between, the first electrode of each energy storage device charged positively or negatively with respect to the second electrode; (c) a first input multiplexer connected to ground and to the first array; (d) a second input multiplexer connected to the second array; (e) a first multi-position switch coupled to the first array and adapted to (i) couple the first array to a charge voltage source, (ii) couple the first array to a load, or (iii) place the first array in a high-impedance state so that substantially no energy is supplied from the first array to a load; (f) a second multi-position switch coupled to the second input multiplexer and adapted to (i) couple the second input multiplexer to a charge voltage source, or (ii) couple the second input multiplexer to ground; (g) a third multi-position switch coupled to a first side of the second array and adapted to (i) couple the first side of the second array to a load, (ii) couple the first side of the second array to ground, or (iii) place the second array in a high-impedance state in conjunction with the second multi-position switch positioned to connect the second input multiplexer to ground; and (h) a controller operable to control the first and second input multiplexers and to actuate the first, second, and third multi-position switches.

The foregoing and other objects, features, and advantages of the invention will become more apparent from the following detailed description, which proceeds with reference to the accompanying figures.

BRIEF DESCRIPTION OF THE DRAWINGS

FIG. 4 shows diagrams of an exemplary circuit including an embodiment of an entropic energy storage device as disclosed herein. The circuit is shown in a charging state (State A), a discharging state (State B), and a high-impedance state (State C).

FIG. 5 is a flow chart of a generalized method of supplying energy from an entropic energy storage device as disclosed herein to a load.

FIG. 6 is a flow chart of a method for charging an entropic energy storage device as disclosed herein.

FIG. 7 shows diagrams of an exemplary circuit including two energy storage devices, at least one of which is an embodiment of an entropic energy storage device as disclosed herein. The circuit is shown in a charging state (State A), a discharging state (State B), and a high-impedance/check-discharge state (State C).

DETAILED DESCRIPTION

Figure 1:
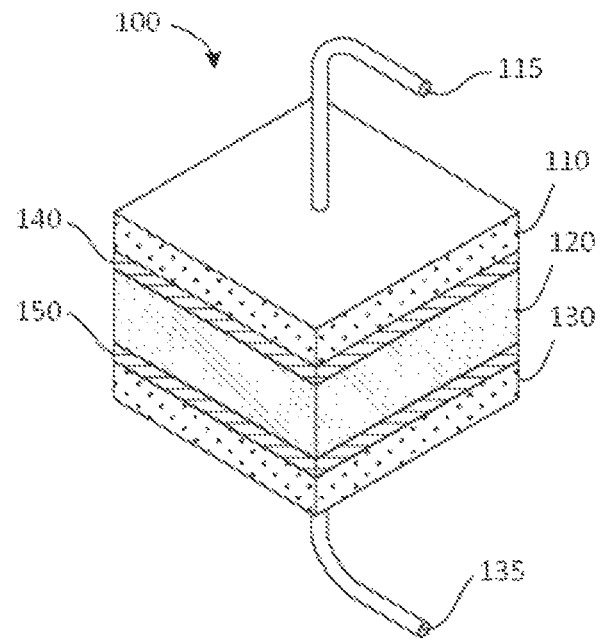
FIG. 1 is a schematic diagram of an exemplary energy storage device.

This disclosure concerns embodiments of a method for discharging an entropic energy storage device (EESD). Embodiments of circuits including one or more EESDs also are disclosed. Application of the disclosed methods and EESDs in the field of energy storage ranges from electronic components to smooth and bypass surges in voltage to bulk energy storage for power grid applications. Energy storage can range from as little as picoJoules of energy to TeraJoules of energy. The methods and materials described herein are applicable at any of these levels of scale. Common devices (fixed and mobile) that may utilize the EESDs include cell phones, laptops, automobiles, and electrical energy grid backup and start storage as well as a substitute for common electrostatic bypass (decoupling) capacitors used in electronic circuits. Expanded use of electrical energy storage in applications previously not thought possible is anticipated due to the high energy density, preferred safety profile, and low-cost of the EESDs described herein and the disclosed methods for discharging the EESDs.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, voltages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

In order to facilitate review of the various embodiments of the disclosure, the following explanations of specific terms are provided:

Capacitor: An energy storage device including two conducting plates separated by a substantially non-conducting material termed a dielectric. The value of the capacitance, or storage capability, of the capacitor depends on the size of the plates, the distance between the plates and the properties of the dielectric. The relationship is shown in Eq. 1:

$$C = \frac{e_0 \cdot e_r A}{d} \qquad \text{Eq. 1}$$

where: $e_0$=electrical permittivity of a vacuum ($8.8542 \times 10^{-12}$ F/m), $e_r$=relative permittivity (defined below), A=surface area of one plate (both the same size), and d=distances between two plates.

Dielectric material: An electrical insulator that can be polarized by an applied electric field.

Dielectric breakdown voltage: The voltage at which a dielectric material will "break down" and conduct current. The dielectric breakdown voltage is an indicator of the dielectric strength of a material.

EESD: Entropic energy storage device. As used herein, the term EESD refers to a capacitor-like device wherein the dielectric material is an entropic material as defined below.

Electrically insulative material or insulator: An insulator is a material having internal electric charges that do not flow freely, and therefore the material conducts little or no electric current. Recognizing that perfect insulators do not exist, as used herein, the term "electrically insulative material" refers to a material that is primarily insulative, i.e., a material that has a threshold breakdown field that exceeds an electric field applied across the material during normal use as a capacitor, thus avoiding electrical breakdown during normal use.

Electrode: As used here, the term "electrode" refers to an electrical conductor (e.g., a metal, carbon, or conductive polymer) or to a "composite" electrode comprising an electrical conductor and a nonconductive material on the surface of the electrical conductor.

Entropic material: A material in which energy is stored via entropic changes of the material. In some examples, the entropic changes are driven by electrical means, and the material is referred to as an Electroentropic™ material. In other examples, the entropic changes are driven by magnetic fields, and the materials is referred to as a Magnetoentropic™ material. Entropic changes include atomic, molecular, secondary, and/or tertiary structure changes, such as intramolecular movement of polymers and/or intermolecular movement of charged or polar molecular species within the material. Embodiments of the disclosed entropic materials comprise a plurality of polymeric molecules, particularly polymeric molecules including one or more polar functional groups and/or ionizable functional groups.

ESR: Equivalent series resistance.

High-impedance state: A state in which an energy storage device is not connected to either a load or a charge voltage source.

Insulative or nonconductive layer/coating: As used herein, the terms "insulative layer," "insulative coating," "nonconductive layer," and "nonconductive coating" refer to a layer or coating of a material that is electrically insulative from an Ohmic conductivity standpoint, i.e., the material has an Ohmic conductivity less than $1\times10^{-1}$ S/m (Siemens per meter).

Load: A component in a circuit or portion of a circuit that draws power.

Parylene: Polymerized p-xylylene, also known as a Puralene™ polymer (Carver Scientific, Inc.), or polymerized substituted p-xylylene. Polymerized p-xylylene satisfies the formula:

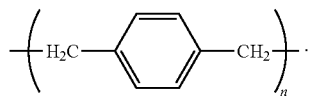

Permittivity: As used herein, the term "permittivity" refers to the ability of a material to become polarized, thereby changing the "dielectric constant" of its volume of space to a higher value than that of a vacuum. The relative permittivity of a material is a measurement of its static dielectric constant divided by the dielectric constant of a vacuum as shown in Eq. 2.

$$e_r = \frac{e_s}{e_0} \quad \text{Eq. 2}$$

where: er=relative permittivity, es=measured permittivity, and eo=electrical permittivity of vacuum ($8.8542\times10^{-12}$ F/m). A vacuum has a relative permittivity of 1, whereas water has a relativity permittivity of 80.1 (at 20° C.) and an organic coating typically has a relative permittivity of 3-8. Generally, speaking the term "high permittivity" refers to a material having a relative permittivity of at least 3.3. As used herein, the term "high permittivity" also refers to a material having a permittivity enhanced by at least 10% using a permittivity enhancement technique, such as immersion in an electric field.

Polar: The term "polar" refers to a compound, or a functional group within a compound, in which electrons are not equally shared between the atoms i.e., areas of positive and negative charges are at least partially permanently separated.

Polymer/polymeric molecule: A molecule of repeating structural units (e.g., monomers) formed via a chemical reaction, i.e., polymerization.

Sterically constrained dielectric film: As used herein, the term "sterically constrained dielectric film" refers to an electrically insulative and/or high permittivity dielectric film comprising a plurality of polymeric molecules having one or more polar functional groups, ionizable functional groups, or a combination thereof, wherein at least some proportion of the polymeric molecules or portions of a given polymer molecule are sterically constrained, i.e., at least some of the polymeric molecules or portions of a polymeric molecule are restricted by some degree of freedom from physical movement within the dielectric material. Steric constraint can arise when a portion of the polymeric molecule is bound to an electrode surface in contact with the dielectric film.

II. Entropic Energy Storage Device (EESD)

Energy stored in an energy storage device is related to the square of the voltage applied to the device. It is therefore important that the voltage rating for the device be as high as possible when energy storage is the primary use for the device. In one or more embodiments, besides having a high breakdown voltage, the device also possesses a low leakage current. In other words, when the energy storage device has been charged to a given voltage, the rate of charge conduction from one electrode to the other should be a relatively small value. When the device is charged for energy storage over some given period of time, the rate of leakage is an acceptably low enough value that would vary depending on the use of the storage device (how long is it stored) and the "value" of the energy thus stored (how easy is it to recharge and the cost of the charge). An acceptable value for leakage would typically vary greatly from application to application. In all embodiments, leakage is something that is generally avoided and minimized.

In one or more embodiments, the highest value of relative permittivity and the highest voltage rating possible for a given level of leakage provides the best energy storage device when evaluated for most energy storage applications. It should also be noted that the ability of the energy storage device to discharge and charge at a reasonable rate is also an important factor. For most electronic applications, the ability of an energy storage device to act as an ideal capacitor is an important parameter, especially when working at frequencies in the MHz range and above. The energy storage device should also have the ability to fully discharge the charge that has been placed into its electrodes. All capacitive devices suffer from "irreversible dielectric absorption", but in the field of energy, discharging a capacitor to a level that is determined by its application will place a limit on how much of this effect is acceptable. The term dissipation factor is generally used to describe these losses, but in the field of energy storage the term "round trip efficiency" is also used. Both terms may be used herein for general purpose energy storage devices.

Embodiments of an entropic energy storage device comprise two electrically conductive surfaces (electrodes) substantially parallel to one another and an entropic dielectric film between the conductive surfaces. The device may further include an insulative layer or coating on one or both of the electrodes. Embodiments of the disclosed EESDs have a very slow discharge, on the order of milliseconds to seconds, compared to conventional electrostatic capacitors. Advantageously, the disclosed EESDs are stable, robust, have a low leakage current, and may have a breakdown voltage of 5-500 V.

A. Electrodes

In some embodiments, the electrodes are planar or substantially planar. The electrodes may be metal, carbon-based, or conductive polymers. Each electrode independently may have a smooth surface or a rough surface. A rough electrode may be prepared with, for example, carbon particles, which provide the electrode with a much higher surface area than a smooth electrode, such as an electrode made of polished metal. The amount of surface roughness selected may depend, at least in part, upon the external electrical parameters that may be desired for a given energy storage device or electrically capacitive device. Compared to an energy storage device comprising a smooth electrode, a similar energy storage device comprising a rough electrode may have much faster charging and discharging amperages (e.g., 100 times faster) for a brief period of time, such as a few microseconds to milliseconds or longer, followed by a slower discharge rate that is similar to the discharge rate provided by energy storage devices having a smooth electrode.

B. Insulative Layer

Each electrode may be coated on one or more surfaces with an insulative (nonconductive) layer or coating. An electrode having an insulative coating is referred to as a "composite electrode." In the energy storage device, the composite electrode is oriented such that the insulative layer contacts the dielectric material. The insulative layer provides increased insulative properties for the electrode as well as providing binding sites for the dielectric materials to be added. The insulative layer has an Ohmic conductivity less than $1 \times 10^{-1}$ S/m, such as less than $1 \times 10^{-2}$ S/m, less than $1 \times 10^{-5}$ S/m, or less than $1 \times 10^{-10}$ S/m. In certain embodiments, the Ohmic conductivity is from $1 \times 10^{-25}$ S/m to $1 \times 10^{-1}$ S/m, from $1 \times 10^{-10}$ S/m to $1 \times 10^{-1}$ S/m or from $1 \times 10^{-5}$ S/m to $1 \times 10^{-1}$ S/m. The coating may range from a few nanometers to greater than 10 microns in thickness. In some embodiments, the insulative layer has an average thickness from 5 nm to 10 µm, such as from 0.1-10 µm, 0.3-10 µm, 0.3-5 µm, or 0.3-2 µm. In one embodiment, the coating has an average thickness that is less than 10% of the overall thickness of the capacitor as measured from an outer surface of the first electrode to an outer surface of the second electrode. The insulative coating may applied by any suitable means including, but not limited to, vapor phase deposition, liquid spraying, and other techniques known to one of ordinary skill in the art of applying coatings. An exemplary insulative coating is polymerized p-xylylene, such as a Puralene™ polymer coating as disclosed, for example, in US 2014/0139974.

The insulative layer may be modified with appropriate co-monomers to provide increased permittivity, and/or attachment sites for polymeric molecules of the dielectric material. In some embodiments, the co-monomers include one or more unsaturated bonds. An insulative layer comprising polymerized p-xylylene may be modified, for example, by inclusion of co-monomers including, but not limited to, olefins, vinyl derivatives, alkynyl derivatives, acryl compounds, allyl compounds, carbonyls, cyclic ethers, cyclic acetals, cyclic amides, oxazolines, and combinations thereof. In some embodiments, the co-monomers are acrylates (e.g., 2-carboxylethyl acrylate), methacrylates (e.g., 3-(trimethoxysilyl)propyl methacrylate), α-pinene, R-(−) carvone, linalool, cyclohexene, dipentene, α-terpinene, R-(+)-limonene, and combinations thereof. The copolymers may include alternating monomers or may be in the form of block copolymers.

C. Dielectric Films Comprising Entropic Materials

In the prior art it has been assumed that the energy stored in variously named layers adjacent to the electrodes is non-recoverable. In other words, when an electric potential is applied to a flat electrode in contact with a solution that has ions capable of movement through the solution, a movement of ions to that surface takes place. Once near enough to the electrode, the ions are assumed to be immobilized at the surface due to the strong electrostatic forces that bind them in place. The energy of collisions with solvent molecules is not sufficient to displace these ions. If the electric potential is removed from the surface, these ions are free to move about in a diffusive manner. It is interesting to note that if the electric potential is removed from the electrode surface, the resulting collapse of the electrical bilayer closest to the electrode allows the release of energy of the immobilized ions such that the energy is not fully released as heat, but instead the electrode can absorb the energy produced by the collapsing electrical field and produce an electric potential and current in that conductor. This effect is the basis for the energy storage in an electrical double layer capacitor (EDLC).

The energy that is stored in the diffuse outer layers of an EDLC is often not fully recovered. The electrical double layers that are formed close to the electrode surface are termed Helmholtz layers, while those that are further away are termed the Gouy-Chapman layers. One distinction between these layers is that the ionic layers that are not capable of being thermally diffused from the electrical surface are termed "Helmholtz" layers. These layers are essentially immobilized at the working temperature by the application of an electric potential to the surface. Another distinction is that the diffuse Helmholtz layers (Gouy-Chapman, but often referred to as Diffuse Helmholtz layers), referred to as DH layers herein, are layers wherein random thermal movements are able to diffuse the ionic arrangements induced by the electric field. Since this is not a sharp boundary, an arbitrary time unit associated with a 50% loss of potential energy over a period of 1 second could be used to define the boundary layer conditions between the two major macroscopic layers.

Both the Helmholtz and DH layers (which form at constant ambient temperature) are entropically reduced as compared to the bulk. These entropically modified materials display different physical characteristics that have been noted (e.g. permittivity). Application of the modified characteristics has been shown, for example, in U.S. Pat. No. 8,633,289, which describes improved synthesis of the stable intermediate dimer of xylylene ([2,2']paracyclophane) and derivatives related to that compound and general structure, a method for the formation of cyclophanes and related compounds with various substituents, and a method to apply the xylylene (or substituted xylylene) monomers to make coatings and other polymer products derived from the reactive intermediate. Likewise, U.S. Pat. No. 9,011,627 describes, inter alia, a method for making high permittivity dielectric material for capacitors using organic polymers to produce low conductivity dielectric coatings.

The rationale for enhanced permittivity in entropically reduced dielectric materials is understood by the concept of the charges being "organized" into discrete rows and columns. Since each charge layer is energetically optimized to be in the lowest energy configuration possible based upon surrounding ionic charges, imposition of an external electric field from the electrodes leads to disruption of the lowest energy state of an ion or dipole attainable from its current position in the dielectric material layer. Thus, when the electric field is applied, the dipole or ion is moved from its rest position (i.e., its position before the electric field is applied), which in turn leads to a rearrangement of the charge distribution in the material. This leads to other rearrangements of all other dipoles continuing throughout the dielectric material. Energy that is not converted into heat is absorbed by the dielectric material. When the energy is released, a reverse of this process can take place provided the energy stored is not released through other mechanisms such as increased thermal motions (e.g., random molecular motion, which is proportional to temperature). Dielectric materials that act in this manner are referred to as "entropic" materials since application of an external electric field induces changes in entropy within the dielectric material.

In the case of entropically "normal" materials, the rearrangement of the dipoles and ions in an electric field is not as certain to cause a rearrangement of all the other ions and dipoles in the materials. In other words, there is a probability that the rearrangement of the dipole or the ion can take place with little or no net interaction with the other dipoles and ions in the material. In these cases, the material will display less energy storage capability than in its entropically reduced form.

If the viscosity of the material is such that movement of the molecules is able to take place, the energy stored from the formation of the electric field by a given dipole or ion is able to dissipate through relaxation mechanisms in which the energy is converted into rotation, vibration, translation, and other movements that manifest themselves externally as heat. With a low viscosity material, the energy that has been stored in the Diffuse Helmholtz layers (DH layers) is thus lost due to random motions of the ions and dipoles.

With intermediate to high viscosity materials, the time frame for formation of the Helmholtz layers (H layers) and the DH layers is substantially increased. The thermal motions of molecules (excluding for now vibrations of the lattice as a macroscopic phenomenon), however, are effectively reduced to near negligibility. In these materials, it is possible to store the energy of an electric field in the H and DH layers relatively quickly compared to the time required for the energy to be dissipated thermally. Thermal dissipation is essentially a first order decaying exponential in time similar to radioactive decay or diffusion; if during the charging cycle the energy is absorbed over a time period of, for example, 1 second, a high viscosity material may require many seconds or even minutes to reach even 90% energy dissipation as heat.

The thermal decay process is substantially slower than the electrical double layer energy storage process. Thus, it is possible to utilize the energy stored by the formation of both the H and DH layers if the energy is quickly accessed. In this situation the release of most of the energy in the formed dipole and ionic layers is through the electric field and is subsequently coupled with electric potential and current. Since the discharge of the H and DH layers may require the movement of molecules and atoms, the discharge process can be relatively slow compared to charging but still remain fast relative to the relaxation mechanisms that produce heat.

Some embodiments of the energy storage device include a dielectric film comprising a single dielectric material layer, and other embodiments include a dielectric film comprising a multilayer dielectric material. The multilayer dielectric material may be formed with a single material that is deposited multiple times with or without surface modifications between the depositions. Alternatively, each layer may have a different chemical composition. In some embodiments, the device is constructed with a dielectric film comprising two or more dielectric layers having different electrical permittivities. The dielectric film may have an average thickness ranging from a few microns to several millimeters. In some embodiments, the dielectric film has an average thickness from 10 µm to 5 mm, such as from 10 µm to 1 mm, from 10 µm to 500 µm, or from 50 µm to 250 µm. In some embodiments, the dielectric film has an average thickness of 80-120 µm, such as an average thickness of 100 µm.

The dielectric film may comprise a conductive or nonconductive polymer, an inorganic metal oxide, mixed metal oxides, mixed polymer and organic materials, or combinations thereof. In some examples, the polymer is a biopolymer.

In some embodiments, the dielectric material has liquid characteristics, and has a viscosity similar to honey or greater. In certain embodiments, the dielectric material has a viscosity from 10,000 cP to 250,000 cP. In an independent embodiment, the dielectric material is a solid. In some embodiments, the dielectric material has a variable viscosity. A low viscosity may be increased in a controlled manner by application or removal of energy in the form of heat, a force, electric field, magnetic field or other means of changing viscosity of the applied dielectric material.

The dielectric material may be substantially free of conductivity; in other words, the dielectric material does not undergo oxidation/reduction at or near either electrode and does not exhibit Ohmic conductivity. Embodiments of the disclosed energy storage devices therefore are not traditional electrochemical batteries, but are more closely related to an electrostatic capacitor. However, the dielectric material is able to store larger amounts of specific energy for prolonged periods of time than either a traditional electrochemical battery or an electrostatic capacitor.

In some embodiments, the energy storage device comprises a high-permittivity dielectric material that is nonconductive. Two non-limiting examples of nonconductive, high-permittivity dielectrics are zein in a shellac matrix and a protein derivatized with maleic anhydride. In other embodiments, the dielectric material is conductive; in such embodiments, the electrodes typically are coated with an insulative layer as described above to mitigate or prevent Ohmic electrical conduction. An insulative layer may be used, for example, when the dielectric material has a resistance less than 2.5 MΩ per square centimeter. In some embodiments, the energy storage device comprises a dielectric material having a permittivity of at least 10 to 2,000,000 and an Ohmic conduction from 1 S/m to $1 \times 10^{-25}$ S/m.

In some embodiments, the dielectric material is a film contacting the two electrodes of the energy storage device. Typically, the contact can be described as direct physical contact between the film and entire contacting surface of the electrode. The dielectric material may contact "bare" metal or carbon-based electrode surfaces, or an insulative layer of a composite electrode.

Some embodiments of the disclosed energy storage devices include a dielectric material comprising polymeric molecules having polar and/or ionizable functional groups, resulting in intramolecular dipoles and dipole moments. The polymeric molecules may further include one or more double bonds. Proteins are readily available, inexpensive polar polymers that have low toxicity. The low toxicity is a large advantage over other polymers, and allows the energy storage devices to be recycled or incinerated. A protein molecule includes amino acids with polar and/or ionizable functional groups. In the case of a molecule in which there is substantial polarization and/or separation of charge due to zwitterionic structures, the ability to have high dielectric polarization may be "complete" within the single molecule itself. In many protein matrices, the ionic forms may be encapsulated which the protein backbone itself. Non-limiting examples of polar polymers include zein, hemp protein, wheat gluten, poly(acrylic acid-co-maleic acid), poly(acrylic acid), whey protein isolate, soy protein isolate, pea protein extract, shellac, and combinations thereof.

Other suitable polymers include, but are not limited to, substituted (e.g., fluorinated) and unsubstituted parylene polymers, acrylic acid polymers, methacrylic polymers, polyethylene glycol, urethane polymers, epoxy polymers, silicone polymers, organic terpenoid polymers, natural organic polymers (e.g., resins such as shellac), polyisocyanates, and combinations thereof. Copolymers, such as acrylate copolymers (e.g., copolymers with ethylene butyl-, ethyl-, and methyl-acrylates) and parylene copolymers (e.g., copolymers of p-xylylene with acrylates (e.g., 2-carboxylethyl acrylate), methacrylates (e.g., 3-(trimethoxysilyl)propyl methacrylate), α-pinene, R-(−)carvone, linalool, cyclohexene, dipentene, α-terpinene, R-(+)-limonene, and combinations thereof), also are within the scope of this disclosure.

In certain embodiments, polymeric molecules are derivatized to attach additional functional groups, such as functional groups that facilitate subsequent binding of the polymeric molecules to a bare electrode surface (i.e., a bare metal or carbon surface) or to a composite electrode surface. Exemplary derivatization agents include, but are not limited to, anhydrides, carbodiimides, imidoesters, and reagents including combinations of N-hydroxysuccinimide and maleimide, aryl azide, or diazirine groups. In some examples, the polymer is derivatized with an anhydride, such as maleic anhydride, itaconic anhydride, cis-4-cyclohexene-1,2-dicarboxylic anhydride, or cis-5-norbornene-end-2,3-dicarboxylic anhydride. A derivatized polymeric molecule can be bound to the electrode surface by crosslinking or by other reaction with the surface. When a polymeric molecule is derivatized with maleic anhydride, for example, the derivatized polymeric molecule can be crosslinked through the double bonds. Crosslinking can be performed by any suitable means, such as a chemical agent (e.g., a radical initiator), ultraviolet light activation, or thermal activation.

The inventors surprisingly discovered that polymeric molecules with the above-described characteristics, when sterically constrained, can be used for energy storage even though the polymeric molecules cannot freely move between the electrodes. Polymeric molecules can be sterically constrained by binding the polymeric molecules to a bare electrode surface or to a nonconductive or insulative coating of a composite electrode by any means, including a covalent bond (single or multiple), van der Waals forces, or hydrogen bonding, prior to charging and/or discharging an energy storage device including the electrode and a dielectric material comprising the polymeric molecules. In some embodiments, the polymeric molecules are bound to the positive electrode. The polymeric molecules remain bound to the electrode as the energy storage device charges and discharges during subsequent use, such as when the energy storage device is used subsequently in an electronic circuit.

Without wishing to be bound by any particular theory of operation, it is believed that within a large molecule, movements of only portions of the molecule may take place while other portions of the molecule are bound in place sufficiently to prevent the overall movement to a lower energy level and subsequent release of potential energy to be coupled to the electrode and not released as thermal motion. This constraint of movement decreases the degrees of freedom in the dielectric molecule, and consequently decreases the molecule's ability to dissipate absorbed energy from the electrical field as heat. Thus, a bound polymeric molecule couples to the electric field in such a way that the polymeric molecule cannot release energy in the form of heat due its reduced degrees of freedom. The movement of certain portions of a macromolecule can be related and is similar to electrophoretic movements known to those who use such techniques to analyze biological macromolecules.

Without wishing to be bound by any particular theory of operation, it is believed that when a portion of the polymer is bound to the electrode (or to a coating on the electrode), the remainder of the polymer may stretch, twist, or bend within the dielectric film as polar and/or ionizable functional groups reorient in response to an electric field. These changes in conformation and position (i.e., changes in entropy) store energy within the energy storage device. When the energy storage device discharges, the stored energy is released as electrical energy as the bound polymer molecules return to a less ordered conformation. An entropic dielectric material comprising polymeric molecules, wherein at least some of the polymeric molecules have decreased degrees of freedom, is referred to as a "sterically constrained dielectric film."

Thus, some embodiments of the disclosed energy storage devices include a sterically constrained dielectric material comprising polymeric molecules. In some embodiments, at least 1%, at least 10%, at least 25%, at least 50%, at least 80%, or at least 90% of the polymeric molecules in the sterically constrained dielectric material are bound to an electrode. In certain embodiments, at least some of the polymeric molecules are bound to the positive electrode. When the electrode is a composite electrode, the polymeric molecules are bound to the insulative layer of the composite electrode. The percentage of binding can be estimated by measuring the quantity of polymeric molecules rinsed off the electrode after binding at least some of the polymeric molecules to the electrode.

In certain embodiments, polymeric molecules are bound to at least 1%, at least 25%, at least 50%, at least 80%, or at least 90% of the positive electrode surface in contact with the dielectric material. The percentage of surface covered by bound polymers may be visually estimated, for example, by optical microscopy. After the energy storage device has been made, the device may be disassembled for inspection. The positive electrode is washed, such as by exposure to running water, to remove unbound material and then examined by optical microscopy. Areas of the surface covered by bound polymers are readily distinguishable from areas devoid of bound polymers.

The bonds between the polymeric molecules and the electrode are sufficiently strong to withstand casual disruption, such as by washing the electrode and bound polymeric molecules with running water having a force equivalent to water falling from a height of one meter or by manually rubbing the bound polymeric molecules under running water with a force less than 20 N. Binding with such strength is observed only when an electric field has been applied across the energy storage device. In some embodiments, at least some of the bonds may be broken by applying an external voltage to the device in a reversed polarity so that the positive electrode becomes negative.

D. Exemplary Energy Storage Devices

Figure 2:
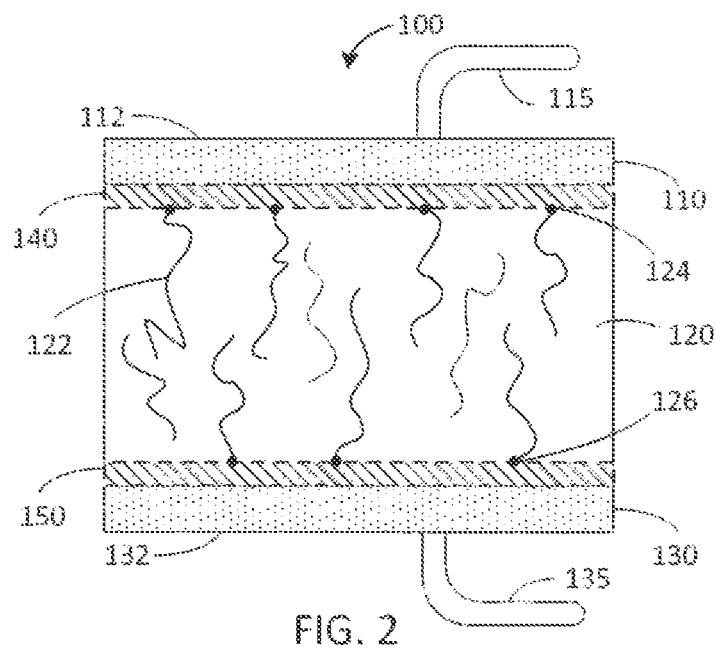
FIG. 2 is a schematic cross-sectional diagram of an exemplary energy storage device.

In some embodiments, an energy storage device 100 comprises a positive electrode 110, an entropic dielectric layer 120, and a negative electrode 130 (FIGS. 1, 2). The positive electrode 110 and the negative electrode 130 independently may be conductive metal, semiconductor, conductive polymer or other electrically conductive material. In certain cases it is advantageous for this material to be a high surface area conductor such as a carbon-based or graphene type of electrode. The dielectric layer 120 comprises a film material that (i) is electrically insulative and/or exhibits a high permittivity and (ii) comprises a plurality of polymeric molecules. Optionally, an insulative layer 140, 150 is disposed between the positive electrode 110 and the dielectric layer 120 and/or between the dielectric layer 120 and the negative electrode 130. In some embodiments, the insulative layer 140, 150 may have a thickness that is less than 10% of the overall thickness of the energy storage device 100, as measured from an outer surface 112 of the first electrode 110 to an outer surface 132 of the second electrode 130. An insulative layer may be included to prevent Joule heating and/or Ohmic conductive losses from occurring during use of the device.

By way of example, the insulative layer 140, 150 may comprise a metal oxide, Puralene™ (polymerized p-xylylene, Carver Scientific, Inc.) plasma or film coating. The thicker the insulative coating 140, 150, the higher the external applied voltage needs to be in order to store a given amount of energy at constant thickness. Additionally, thicker insulative coatings 140, 150 such as PET (polyethylene terephthalate) produce an almost order of magnitude reduction in the energy storage capabilities. A Puralene™ coating is preferred due to its characteristics of reduced pinholes, i.e., being substantially nonporous, and its ability to be coated into very thin layers. This enables the overall thickness of a capacitor to be in the range of 100 microns and reasonable voltages are thus possible. For example if the thickness were 1000 microns and the insulative coatings 140, 150 were 1% of that thickness (5 microns each), then to attain a 10V/micron e-field, 10,000V would have to be applied externally. This is too high of a voltage to be used economically and safely. Thus, the thinner the nonconductive coating 140, 150, the lower the voltage can be while retaining the storage capabilities of the device.

Using Puralene™, which is inexpensive and exhibits very desirable qualities such as reduced pinholes, flatness, etc., and the high molecular weight ionic polymers salts described below for the dielectric 120, energy densities that are at least 2 times that of typical EDLCs are achievable. Viscosity modifiers, such as solvents, branched polymers, low molecular weight oligomers, and dendritic polymers may be added to the dielectric material 120 to reduce viscosity. Ethanol and unreacted starting materials may serve such purposes.

The dielectric layer 120 comprises a conductive or non-conductive polymer, and may also comprise an inorganic metal oxide, mixed metal oxides, mixed polymer and organic materials, and combinations thereof. The polymer may be a biopolymer. In one embodiment at least some of the polymers are bound to an electrode, forming a sterically constrained dielectric layer. In an independent embodiment, the viscosity of a low-viscosity dielectric material may be increased in a controlled manner by application or removal of energy in the form of heat, a force, electric field, magnetic field or other means of changing viscosity of the applied dielectric composition. The dielectric layer 120 may have its viscosity reduced to aid in the more rapid release of the energy from the bound dipole and ionic layers.

In an energy storage device according to FIGS. 1 and 2, equivalent charges of opposite sign will flow to each of the electrodes 110, 130. If a dielectric 120 (i.e., high permittivity material or a dipole-containing, low-viscosity material applied to the surface of the resistive or insulative coating) of low viscosity is used, the charge flow will be very substantial for an extended period of time. Very viscous materials require much longer charging times at lower rate of charge flow. Once charge has been added from a voltage source, removal of the voltage source will then lead to a slow discharge of the voltage retained at the electrodes. The leakage current resistively discharges the energy stored in the formation of the H and DH layers.

With reference to FIG. 2, in some embodiments the dielectric layer 120 is a sterically constrained dielectric layer comprising an entropic film material that (i) is electrically insulative and/or exhibits a high permittivity and (ii) comprises a plurality of polymeric molecules 122 including polar functional groups and/or ionizable functional groups. The polymeric molecules 122 also may include one or more double bonds. In a sterically constrained dielectric layer, at least some of the polymeric molecules 122 are bound to the positive electrode 110 (or insulative layer 140, if present) via attachment points 124. Each attachment point 124 may be a covalent bond (single, double, or triple), a hydrogen bond, van der Waals forces, or other bonding force that is strong enough to prevent disassociation of the polymeric molecule 122 from the positive electrode 110, assuming that the positive electrode 110 is maintained at a positive charge relative to the negative electrode 130. Some of the polymeric molecules 122 may be bound to the negative electrode 130 (or insulative layer 150, if present) via attachment points 126. Each attachment point 126 may be a covalent bond (single, double, or triple), a hydrogen bond, van der Waals forces, or other bonding force that is strong enough to prevent disassociation of the polymeric molecule 122 from the negative electrode 130, assuming that the negative electrode 130 is maintained at a negative charge relative to the positive electrode 110. The positive and negative electrodes 110, 130 may be attached to a voltage source via conductive leads 115, 135 (e.g., conductive wire leads, traces, or other pathways).

Figure 3:
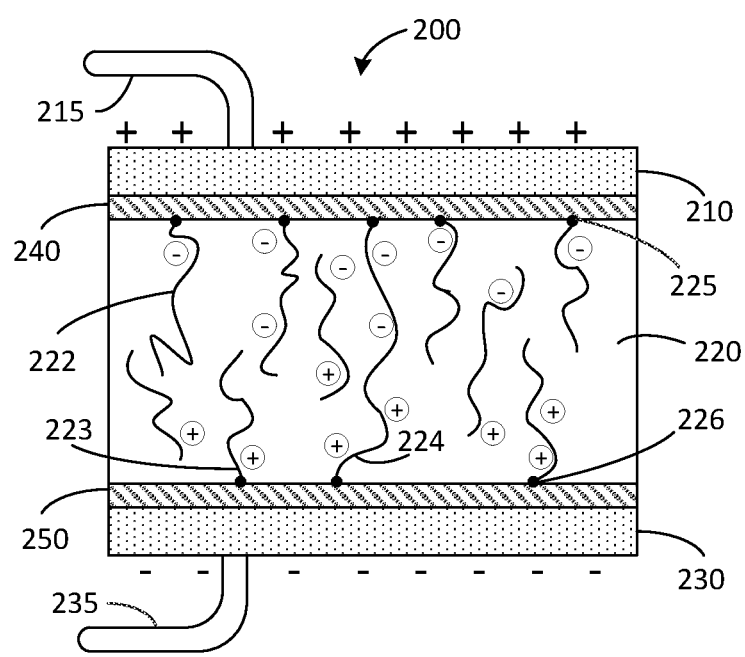
FIG. 3 is a schematic cross-sectional diagram of another exemplary energy storage device.

In an independent embodiment, an energy storage device 200 comprises a positive electrode 210, a sterically constrained dielectric layer 220, and a negative electrode 230 (FIG. 3). The sterically constrained dielectric layer 220 comprises an entropic film material that (i) is electrically insulative and/or exhibits a high permittivity and (ii) comprises a plurality of polymeric molecules 222, 223, 224 including polar functional groups and/or ionizable functional groups. The polymeric molecules also may include one or more double bonds. Insulative or non-conducting layers 240, 250 are disposed between the positive electrode 210 and the dielectric layer 220 and between the dielectric layer 220 and the negative electrode 230. Some of the polymeric molecules 222 have polar and/or ionizable functional groups with a negative or partial negative charge, and are bound to the insulative layer 240 via attachment points 225. Some of the polymeric molecules 223 have polar or ionizable functional groups with a positive or partial positive charge, and are bound to the insulative layer 250 via attachment points 226. Some of the polymeric molecules 224 have at least one polar or ionizable group with a positive or partial positive charge and at least one polar or ionizable group is a negative or partial negative charge. Polymeric molecules 224 of sufficient length may span the distance between insulative layers 240 and 250 and may be bound to both insulative layers. The positive and negative electrodes 210, 230 may be attached to a voltage source via conductive leads 215, 235.

When using a variable viscosity dielectric material, it may be advantageous to include a method for dynamically varying the viscosity. There are a multitude of known methods for efficiently creating a controllable change in the viscosity of a fluid, many of which could easily be integrated into the system implementation by one well-versed in the art of materials sciences.

One non-limiting example of a method for controlling the viscosity of the dielectric is by controlling the temperature. If instead of maintaining the device described above at a constant temperature, during or after charging the device is cooled from an electrode 110 or 130 inward, then the viscosity of the dielectric can be made to gradually increase from electrode layer 110 to electrode layer 130 sequentially, or vice versa. Assuming a viscosity increase with lower temperature (although the opposite effect can sometimes be obtained) the discharge of the H and DH layers as thermal energy can be slowed and essentially halted with complete solidification. The electrical energy can thereby be stored for extended periods of time until ready for release.

Release of the electrical energy with minimal losses to heating is similar to the manner that it was charged. The cooled device can be warmed as necessary with ambient heat or generated heat to release electrical energy through the electrodes as the viscosity of the internal dielectric is reduced. This slow warming has the added benefit of preventing rapid discharge of the energy contained in the H and DH layers. Coordination of the warming of the electrodes and dielectric can be made to accommodate the energy demands of the electrical load. Care must be taken in the system design in order to prevent a runaway condition in which internal or external heating of the dielectric causes the temperature to rise rapidly and in turn decrease viscosity at an increasing, uncontrolled rate.

Another well-known method for viscosity control is via exploitation of non-Newtonian fluid effects. A multitude of materials exhibit, to varying degrees, a nonlinear or offset relationship between viscosity and applied stress, shear rate, time, or other factors. An applied force or pressure may be applied, for example, to electrode 130. Common materials have been noted which exhibit either an increase or decrease in apparent viscosity when subjected to mechanical stress. These materials are often classed as shear thickening (dilitant) or thinning (pseudoplastic), depending on the sign of the viscosity change. Many materials in this class exhibit viscoelastic effects, in that they have a tendency to return to their original shape once stress is removed. Additionally, other materials exhibit time dependence on viscosity with stress (thixotropic and rheopectic fluids, again depending on sign), and still others exhibit an offset relationship between viscosity and stress. The latter is known as a Bingham plastic.

A Bingham plastic is a viscoelastic material that behaves as a rigid body at low stresses but flows as a viscous fluid at high stress. More specifically, a Bingham plastic is known to act as a solid when applied stress is below a given limit, and therefore has a measurable yield stress or other factors. By manipulation of this feature, a dielectric which acts as a Bingham plastic could be held in a solid state under low-stress conditions, preserving H and DH layer formations for an extended period of time. When it becomes necessary to release the energy stored within said layers, a varying amount of stress would be applied to the dielectric, thereby controllably lowering its viscosity.

The makeup of the dielectric may be chosen such that it exhibits a desirable set of non-Newtonian fluid characteristics. The energy storage device could then be engineered such that stress could be applied through mechanical or other means to appropriately control the viscosity of the dielectric. For a non-limiting example, the capacitor stack could be placed between two plates. The bottom plate would be fixed in place, while the top plate is attached to a mechanical, electromagnetic, hydraulic, or pneumatic actuator. When it becomes desirable to apply stress to the material, the actuator could apply force in a linear or rotational direction so as to apply the optimal amount, rate, and combination of shear and normal stresses deemed most suitable to the fluid application. Alternative methods include using a hydraulic or pneumatic bladder to apply stress on the capacitor stack between two fixed plates, as well as surrounding the device with a shape memory alloy, electroactive ceramic, dielectric elastomer, or other active element.

A combination of these effects may also be used to effect a change in the dielectric's viscosity. By combining a non-Newtonian shear thickening dielectric fluid with low stiffness and compliant electrodes, the capacitor forms what is known as an electroactive polymer or specifically a dielectric elastomer actuator. Once a charge is applied to this capacitor, the electrostatic force between the electrodes causes a force directed normal to both plates. This force effectively "squishes" the dielectric together, applying a normal stress to the dielectric. If this dielectric were also a non-Newtonian shear thickening fluid, the viscosity would increase as the applied shear stress increases.

The viscosity of the dielectric material could also be dynamically controlled by the modification of its physical characteristics to enhance the dielectric's viscoelectric properties. In a viscoelectric or electro-rheological fluid, the makeup and structure of the dielectric fluid causes enhanced reactivity to external electric fields. An applied electric field can cause extreme, rapid, and reversible changes in viscosity. Electrorheological fluids can behave as a Bingham plastic, described previously, such that the yield stress is proportional to the applied electric field. The design of the electrode has been shown to increase electro-rheological effects. Much in the same way, the dielectric may be designed to exhibit magneto-rheological effects, which will respond to a magnetic field rather than an electric one. The magneto-rheological effects may be even more applicable through lack of interference with the energy storage mechanism of the device.

In the case of both the dielectric elastomer actuator and viscoelectric embodiment, care must be taken to avoid a runaway condition. Because the viscosity of the fluid is determined by the field magnitude applied to it, specific conditions such as short circuit are especially dangerous. If a short circuit condition is allowed to exist, the charge on the electrodes would be rapidly removed and therefore the viscosity of the dielectric fluid would decrease rapidly. This decrease in viscosity would greatly increase the mobility of the H and DH layers, causing rapid discharge of stored energy into a potentially dangerous (i.e. short circuiting) load.

III. Methods of Making Entropic Energy Storage Devices

Some embodiments of a method for making an energy storage device include (a) applying an entropic dielectric film to an electrically conductive first electrode, the entropic dielectric film comprising a film material that (i) is electrically insulative and/or exhibits a high permittivity and (ii) comprises a plurality of polymeric molecules; (b) contacting the entropic dielectric film with an electrically conductive second electrode; and (c) applying an electric field across the first electrode, the entropic dielectric film, and the second electrode, thereby making the entropic energy storage device. The polymeric molecules may include one or more polar functional groups, ionizable functional groups, or a combination thereof. The electric field may be applied while making the entropic energy storage device, or it may be supplied by the initial charging voltage. At least some of the polymeric molecules are bound to the first electrode by application of the electric field across the first electrode, the entropic dielectric film, and the second electrode, thereby producing a sterically constrained entropic dielectric film in which at least some of the plurality of polymeric molecules are bound to a surface of the first electrode, second electrode, or both the first and second electrodes. In certain embodiments, a sterically constrained entropic dielectric film is produced by (i) applying an electric field across the first electrode, the entropic dielectric film, and the second electrode such that the first electrode is a positive electrode, the electric field being applied for an effective period of time to bind at least some of the polymeric molecules to the first electrode, (ii) treating the entropic dielectric film with a chemical agent, or (iii) a combination thereof.

In an independent embodiment, before an entropic material is completely cured or dried and/or while the entropic material is drying and/or curing, one or more permittivity enhancing fields may optionally be applied to the assembly (i.e., the first substrate, second substrate and entropic material disposed there between). The field may be an electric field produced by connecting a voltage source, such as a direct current voltage source) across the first substrate and the second substrate (e.g., an electric field having a strength greater than 100V/cm); and/or a magnetic field provided by, as an example, placing the assembly between magnetic north and south poles of a magnetic source such that a magnetic field (e.g. a magnetic field having a strength greater than 1 Gauss) between the north pole of the magnetic source and the south pole of the magnetic source is about perpendicular to the outer surface of the first substrate and the outer surface of the second substrate. At low electric field potentials, the increase in permittivity proportionally increases with the increase in the electric field potential. It has been found that magnetic fields help in the enhancement of the dielectric's permittivity in purely organic compounds as well.

In another independent embodiment, a layered dielectric is created with a first dielectric film layered on a different second dielectric film, each of which is composed of a primarily insulative film material and/or a high permittivity material. The film layers are sandwiched between and in direct contact with opposing first and second electrodes. Either during or after formation of the layers, permittivity of one or more layers is enhanced by one or more of: immersion in an electric field and/or magnetic field, and/or introducing a reductant into the film material.

A. Entropic Dielectric Film Formation

A dielectric film comprising an entropic material is prepared by any suitable means, including vapor phase deposition, liquid spraying, screening, spin-coating, or other methods known to those skilled in the art of film formation, and applied to an electrically conductive first electrode. In one embodiment, the electrically conductive first electrode is a bare electrode or a composite electrode comprising an insulative layer, and the entropic dielectric film is formed directly on the bare electrode surface or on the insulative layer of the composite electrode. The entropic dielectric film is then dried at low temperatures (e.g., 25-60° C.) before or after contacting the entropic dielectric film with an electrically conductive second electrode. In an independent embodiment, the entropic dielectric film is formed on a removable carrier film (e.g., a polytetrafluoroethylene film), dried, and subsequently transferred to the electrode surface.

In one exemplary embodiment, a method for creating a spreadable thin coating of high permittivity dielectric material on a substrate, which is suitable for use in energy storage devices such as capacitors, entails creating a wetting agent solution by combining an organic polymer with a solvent and mixing the combined organic polymer with the solvent. After mixing the combined organic polymer with the solvent, any particulate matter not dissolved in the wetting agent solution is optionally removed. The wetting agent solution may then be combined with a high permittivity dielectric material and mixed to create liquid or slurry of entropic material. The liquid or slurry is spread in a thin and even coating onto a first substrate suitable for use in energy storage devices. A drying agent may be added to the wetting agent solution, which may then be allowed to dry to form a film of the entropic material. By way of example and not limitation, the organic polymer may be a parylene, shellac, zein or silicone oil. Alternatively, polymers comprised of polyurethane, acrylic acid, methacrylic acid, methacrylic amides, polyvinylsulfonic acid, cyanoacrylates, polyvinylalcohols, polylactic acid, polyethylene terephthalates (PET), parylenes, silicones, or polyvinylsilanes have been demonstrated to provide enhanced dielectric properties when used with dielectric materials that are suspended in a polymer matrix. Although this list is not an exhaustive list of polymers that can be used, substitution of the polymer matrix with a variety of different polymers and/or non-electrically conductive materials is possible without modifying the novel substantive nature of the method. A second substrate, also suitable for use in energy storage devices, may be placed onto the entropic material opposite the first substrate, with the entropic material being disposed between the first substrate and the second substrate. Optionally, a reducing agent and/or an iron cation or other transition metal cation may be added to the wetting agent solution. The reducing agent may comprise sodium borohydride.

In another independent embodiment, the method entails creating a first solution comprising a polymer mixed with a cross-linking agent. The first solution is combined with a high permittivity dielectric material and mixed to create a liquid or slurry. The liquid or slurry is spread in a thin and even coating onto a first substrate. By way of example and not limitation, the polymer may be a parylene, shellac, zein or silicone oil; and the cross linking agent may be a divinylsilane, cyanoacrylate, or an epoxy. Optionally, a reducing agent (e.g., sodium borohydride) and/or a transition metal cation may be added to the polymer. Particulate matter not dissolved into the first solution may be optionally removed by filtration, separation in a centrifuge or any other suitable technique.

In another independent embodiment, a method for creating a spreadable thin coating of entropic dielectric material on a substrate entails creating and mixing a first solution comprising silicone oil and a finely ground high permittivity dielectric. A borax salt is added to the first solution to form a second solution. The second solution is mixed until it forms a slurry, which is applied to a first substrate, suitable for use in energy storage devices such as capacitors. The substrate with the applied slurry may be heated to facilitate an increase in viscosity of the silicone oil and form a film of entropic material. After the increase in viscosity, a second substrate, also suitable for use in energy storage devices such as capacitors, may be applied on the entropic material opposite to the first substrate, the entropic material being disposed between the first substrate and the second substrate. The entropic material disposed between the first substrate and the second substrate may be heat treated to stabilize the finely ground high permittivity dielectric. Optionally a permittivity enhancing field may be applied across the first substrate, the entropic material and the second substrate. The permittivity enhancing field may be either one of or both an electric field generated by connection of a voltage source across the first substrate and the second substrate, and a magnetic field provided by placing the first substrate, the entropic material, and the second substrate between magnetic north and south poles of a magnetic source.

In some embodiments, the entropic film material is prepared from a liquid or a slurry comprising a solvent and a plurality of polymeric molecules. Suitable solvents include, but are not limited to, alkanols, alkylene glycols, water, and combinations thereof. Exemplary solvents include ethanol, ethylene glycol, water, and combinations thereof. In some embodiments, the polymeric molecules have one or more polar functional groups, ionizable functional groups, or a combination thereof. The polymeric molecules may also include one or more double bonds. Suitable polymeric molecules are described above. In certain embodiments, undissolved polymeric molecules are removed from the mixture, e.g., by filtering or centrifuging the mixture.

The liquid or slurry may further comprise a crosslinking agent. Suitable crosslinking agents include, but are not limited to, anhydrides, carbodiimides, imidoesters, borax salts, sodium borohydride, and reagents including combinations of N-hydroxysuccinimide and maleimide, aryl azide, or diazirine groups. Common crosslinking agents include triallyltriazinetrione and other triallyl or trivinyl reagents known to those versed in polymer chemistry. Exemplary anhydrides include maleic anhydride, itaconic anhydride, cis-4-cyclohexene-1,2-dicarboxylic anhydride, cis-5-norbornene-endo-2,3-dicarboxylic anhydride, and combinations thereof.

In some embodiments, the liquid or slurry further includes an initiator, such as a radical initiator, to catalyze crosslinking between the polymeric molecules. Exemplary initiators include thermal and light-activated chemical initiators, including, but not limited to, azobisisobutyronitrile, 1,1'-azobis(cyclohexanecarbonitrile), dicumyl peroxide, 2-hydroxy-2-methylpropiophenone, camphorquinone, phenanthrenequinone, and combinations thereof. In one example, itaconic anhydride and dicumyl peroxide were used to crosslink zein molecules.

One or more salts, such as salts capable of forming organic salts with the polymeric molecules and/or neutralizing the film material, may be added to the liquid or slurry before crosslinking is complete. In some embodiments, a carbonate salt (e.g., guanidine carbonate, cesium carbonate, strontium carbonate, or a combination thereof) may be used because the reaction releases carbon dioxide and produces no undesired counterion contamination of the dielectric film. In one embodiment, barium titanate is added to the liquid or slurry. In an independent embodiment, a voltage adjuvant, such as a nonconductive polymer, is added.

The liquid or slurry of entropic material is applied to the electrically conductive first electrode by any suitable means. In one embodiment, the slurry is coated onto a stationary or continuous moving strip of an electrode. In another embodiment, the liquid or slurry is poured onto a statically positioned electrode plate through any number of means such as but not limited to pressure ejected from a container or poured from the mixing container. In another embodiment, the liquid or slurry is applied to the electrode by spin coating. Other methodologies for moving the liquid or slurry from the mixing container to the electrode are anticipated. The liquid or slurry may be spread, pressed or rolled to cover the electrode surface and ensure an even thin coating of the entropic material on the electrode surface. Multiple means for performing this step are envisioned including, but not limited to, the use of a spreading blade, roller, or other means. Gas phase deposition of the entropic material can be accomplished through atomization of the entropic material or chemical vapor deposition as known to those skilled in the art of film formation.

In one embodiment, a sufficient amount of liquid or slurry is applied to the electrode surface to produce an entropic dielectric film of the desired thickness when dried. In another embodiment, two or more layers of liquid or slurry may be applied to the electrode surface to provide the desired thickness. Each layer may be dried before another layer is applied, or sequential depositions of liquid or slurry may be performed with drying after all layers have been applied. When two or more layers are applied, the layers may have the same or different chemical compositions.

The electrode and entropic dielectric material may be heated to remove solvent and form an entropic dielectric film on the electrode surface. Heating may take place before or after contacting the entropic material with the electrically conductive second electrode. In some embodiments, the assembly is clamped or pressed to apply pressure to the entropic material and force any air or gas out of the liquid or slurry so that the first and second electrodes are in complete, intimate contact with inwardly facing surfaces of the electrodes. In certain embodiments, the assembly is heated to a temperature of 150° C. to 300° C. to remove the solvent. Other temperature ranges may be suitable depending on the particular solvent.

In an exemplary implementation, an entropic material for an energy storage device according to principles of the invention may be formed from 15 grams of protein powder (such as zein, Sigma-Aldrich #Z3625) dissolved in alcohol, e.g., 50 mL absolute ethanol. The solution is well stirred under inert atmosphere until complete dissolution is obtained. To this solution is added portion-wise 10 g of maleic anhydride (e.g., Sigma-Aldrich #M188) solid with vigorous stirring and heating to 60° C. for a period of time, such as for 30 minutes. At the end of the period 0.5 g of dicumyl peroxide (Sigma-Aldrich #329541) is added portion-wise over 5 min. The solution is allowed to boil and stir at a temperature above 60° C. for 1.5 h. The solution is cooled to room temperature. Then solid guanidine carbonate (Sigma-Aldrich# G1165-9) is added portion-wise until the solution is neutral to basic. A resulting honey colored liquid may be used as the dielectric. Alternatively, other materials such as copolymerized maleic acid/acrylic acid (e.g., Sigma-Aldrich #416053) may be neutralized with guanidine to produce similar results. Alternatives to guanidine may be used as well. As non-limiting examples, cesium carbonate or rubidium carbonate may be used as substitutes. Other organic, polymer, and inorganic cationic species may be substituted. Ultrahigh molecular-weight acrylic acid/acrylamides are also possible dielectrics when they are optionally neutralized to their salt forms.

In an independent embodiment, molecules of a polymeric entropic dielectric film are formed in situ. The dielectric material liquid or slurry comprises a crosslinking agent and a plurality of polymeric molecule precursors comprising one or more polar functional groups, ionizable functional groups, or a combination thereof. In some examples, the precursors are amino acid molecules, oligopeptides, polypeptides, or a combination thereof. In certain embodiments, the polymeric molecule precursors further comprise p-xylene monomers. The liquid or slurry is applied to the first electrode as previously described. After application, the crosslinking agent is activated, thereby crosslinking the polymeric molecule precursors to provide an entropic dielectric film comprising a plurality of polymeric molecules. The crosslinking process also may bind some of the polymeric molecules to the electrode surface, such as when the electrode is a composite electrode comprising an insulative layer.

In an independent embodiment, a method for making a high permittivity dielectric material includes dissolving an organic polymer in a solvent to form a slurry or a solution. Exemplary polymers include, but are not limited to shellac, silicone oil, and zein. Any undissolved organic polymer may be removed from the slurry or solution, for example, by using a filter or centrifuge. An inorganic salt may then be added to the slurry or solution. The inorganic salt may be a transition metal salt, such as a Gd, Sr, Sn, Fe salt, or a mixture thereof. In one embodiment, a breakdown voltage adjuvant may be added to the slurry or solution. The breakdown voltage adjuvant may include one or more of Y, Ni, Sm, Sc, Tb, Yb, La, Te, Ti, Zr, Ge, Mg, Pb, Hf, Cu, Ta, Nb, Bi, or a mixture thereof. To facilitate screening and drying, dimethyl formamide and/or dimethylsulfoxide may be added to the slurry or solution. The slurry or solution may then be heated, e.g., to a temperature of about 150° C. to about 300° C., to remove or evaporate the solvent. This method avoids high process temperatures and produces a high dielectric capacitor with a high breakdown voltage.

Other suitable dielectric materials include conductive polymers salts, such as salts of acrylic acid, acrylamides, methacrylates, polypyrrole, etc.; inorganic metal oxide such as perovskites (i.e. barium titanate, strontium barium titanate, etc.); charged ionic liquids such as polymer salts and other electrically charged liquids or semi-solids that may have ability to migrate or move to some extent within a matrix; or a mixture of these.

In another embodiment, an energy storage device as disclosed herein may contain an entropic dielectric material that has the property of changing viscosity. The methods for introduction of variable viscosity into the dielectric may comprise variable temperature, variable electric field, variable magnetic field, variable pressure, variable shear and/or normal stress. Variable pressure, shear and stress are each a type of application of force. The direction and distribution of the applied force determines whether it is a pressure, shear or stress.

An exemplary method of making a magnetorheological entropic dielectric entails distributing electrically insulated (or non-conducting) magnetic particles throughout the dielectric. Once the H and DH layers are formed, a magnetic field would be applied to increase the viscosity of as well as to prevent particle migration through the dielectric and "lock in" the H and DH layers. Altering the magnetic field strength would allow controlled dissociation of the layers through charge migration (current flow) within the dielectric itself. Also, the applied magnetic field could potentially introduce additional layering or entropic changes for energy storage.

B. Insulative Layer Formation

In some embodiments, the method further comprises applying an insulative layer to the first electrode to form a composite first electrode, and then applying the entropic dielectric film to the insulative layer of the composite first electrode. In one embodiment, the insulative layer comprises polymerized p-xylylene. In another embodiment, the insulative layer comprises copolymers of p-xylylene and other co-monomers as described above. The insulative layer is applied by any suitable means, including vapor phase deposition, liquid spraying, screening, spin-coating, or other methods known to those skilled in the art of film formation.

In some embodiments, the insulative layer is applied using vapor phase deposition. When the insulative layer comprises polymerized p-xylene, xylene may be reacted with a monatomic oxygen source to produce p-xylylene in monomeric form. By way of example, the monatomic oxygen source may comprise nitrous oxide or ionized diatomic oxygen. In some embodiments, the step of reacting xylene with a monatomic oxygen source to produce p-xylylene in monomeric form is performed at atmospheric pressure, in an environment heated to 450° C. to 800° C., at stoichiometric ratio of xylene to monatomic oxygen source. The reaction may take place in an electrically heated pyrolysis reaction tube, such as an Inconel (nickel alloy 600) pyrolysis reaction tube. A flowing stream of inert gas such as argon or nitrogen gas alone, or with a reactive compound such as nitrous oxide, is supplied to the pyrolysis reaction tube. A starting material, e.g., xylene vapor, is introduced into the pyrolysis reaction tube and reacts with monatomic oxygen in the reaction tube. Being very reactive and transient, monatomic oxygen must be available to react with the volatile mixture in the reaction chamber 215. As discussed above, the source of monatomic oxygen may be a gaseous compound supplied with the carrier gas, or a gaseous compound supplied separately, or another source, such as a plasma generator. Monatomic oxygen plasma may be created by exposing oxygen ($O_2$) gas to an ionizing energy source, such as an RF discharge, which ionizes the gas. Alternatively, a compound such as nitrous oxide ($N_2O$) may supply monatomic oxygen for the reaction through thermal, catalyzed, and/or other decomposition. Thus, a monatomic oxygen plasma generator, or a monatomic oxygen chemical compound (e.g., $N_2O$) feed, or another suitable source of monatomic oxygen is provided. A plasma gas can be used with the aforementioned starting materials to form the intermediate oxidized products that may subsequently react to form reaction products that are oxidized forms of the starting materials which may be monomers, dimers, trimers, oligomers, or polymers. At temperatures of 300° C. to 800° C., the output of the reaction tube is sufficiently hot to maintain the monomer p-xylylene in monomeric form. Rapidly cooling of the monomer on an electrode surface results in a liquid condensation of the monomer and rapid polymerization of the monomer into a polymer. A device to mix cool nonreactive gases into the hot reaction stream may be used to reduce the temperature and facilitate condensation of the reactive intermediate exiting the reaction tube. Optionally an expansion valve may be used at the exit of the reaction tube to provide Joule-Thomson cooling of the hot gas.

The method may be extended to other substituents, including, but not limited to, 2-chloro-1,4-dimethylbenzene, 2,5-dichloro-p-xylene, 2,5-dimethylanisole, tetrafluoro-p-xylene, and 1,2,4-trimethyl benzene. Meta and ortho orientations of the substituents on the aromatic rings are also viable reaction starting materials. The reaction can be generalized to include all compounds that are capable of reaction with monatomic oxygen produced from a plasma or from decomposed oxygen-containing substances or its intermediate reaction products and also contain hydrogen atoms stabilized by the presence of an aromatic ring. Typically such hydrogen atoms are located in a position alpha to a phenyl ring (benzylic position). Michael structures removed from the alpha aromatic ring positions are known to give similar reactivity to the hydrogen alpha to the aromatic ring position as is well known to those versed in organic synthesis. However, the reactivity of such hydrogen atoms is not limited to alpha and/or Michael positions from an aromatic ring or the aromatic ring such as benzene. Other aromatic stabilizations are known for many different rings, fused rings, and non-ring systems, as known to those versed in the art of organic chemistry. Such starting materials may preferably have the presence of two hydrogen atoms that are capable of being removed to form partially oxidized starting materials. These preferred materials may optionally have the ability to dimerize, trimerize, oligomerize, or polymerize.

When the insulative layer comprises a copolymer including p-xylene, xylene may be reacted with a monatomic oxygen source to produce p-xylylene in monomeric form.

By way of example, the monatomic oxygen source may comprise nitrous oxide or ionized diatomic oxygen. Monatomic oxygen plasma may be created by exposing oxygen ($O_2$) gas to an ionizing energy source, such as an RF discharge, which ionizes the gas. Alternatively, a compound such as nitrous oxide ($N_2O$) may supply monatomic oxygen for the reaction through thermal, catalyzed, and/or other decomposition. In a preferred implementation, the step of reacting xylene with a monatomic oxygen source to produce p-xylylene in monomeric form is performed at atmospheric pressure, in an environment heated to 350° C. to 800° C., at stoichiometric ratio of xylene to monatomic oxygen source. The reaction may take place in an electrically heated pyrolysis reaction tube, such as an Inconel (nickel alloy 600) pyrolysis reaction tube. The p-xylylene in monomeric form is mixed with a copolymerization compound (co-monomer), i.e., a compound that copolymerizes with the p-xylylene in monomeric form. The p-xylylene in monomeric form and the copolymerization compound are in gaseous form while mixing. A plasma gas may be used with the aforementioned starting materials to form intermediate oxidized products that may subsequently react to form reaction products, which are oxidized forms of the starting materials. After mixing the p-xylylene in monomeric form with a copolymerization compound, the resulting mixture may be trapped in a condenser. The condenser has a temperature at which condensation of the mixture takes place. A temperature of at least −30° C., e.g., in the range of −30° C. to 400° C., allows condensation for most such mixtures. The condenser contains a solvent to facilitate trapping. Optionally, the trapped mixture may be mixed with a tertiary substance, e.g., another monomer, a reactive substance or an inert material. After mixing the p-xylylene in monomeric form with a copolymerization compound, the resulting mixture may be deposited on an electrode. The temperature of the electrode may be controlled to promote solidification of the deposited mixture. Rapidly cooling of the monomers (whether modified or unmodified) while directing the monomers onto an electrode surface results in a liquid condensation of the monomers and rapid polymerization of the monomers into a polymer.

Optionally, the deposited mixture may be exposed to a photoinitiating light energy and/or a permittivity-enhancing field, such as a magnetic field (e.g., such as that provided by a neodymium magnet, S84, K&J Magnetics) and/or an electric field, such as a direct-current electric field. Condensation of the monomer and subsequent polymerization can proceed rapidly while in a magnetic field. If the target (i.e., the deposited insulative material on the electrode) and the magnet maintain the same relative orientation during the polymerization process, then a baseline increase in the electrical permittivity has been shown to occur. If the orientation of the magnetic field relationship to the target is rotated during the polymerization or solid phase condensation process, then the resulting permittivity has been shown to decrease.

When the reaction is conducted as noted above, using the p-xylylene monomer as the polymerization molecule, but without the presence of the applied magnetic field the relative permittivity of the material deposited is approximately 3. When the material is run as described with a magnetic flux 255 density of approximately 200 to 2000 Gauss, the relative permittivity is approximately 7. Thus, the magnetic field has been shown to substantially increase the permittivity of the product by over a factor of 2 times. In a similar manner other salts, dipoles, and salts of organic acids can be entropically oriented during solidification or polymerization to produce enhanced high permittivity materials. Improvements in permittivity from 10 to over 1000% may be attained.

In another implementation, the target is immersed in an electric field such as that provided by a high voltage power supply of 4000V (Emco, G40). Condensation of the monomer and subsequent polymerization can proceed rapidly while in the electric field. If the target and the electric field maintain the same relative orientation during the polymerization process, then a baseline increase in the electrical permittivity has been shown to occur. If the electric field on the target is reduced during the polymerization or solid phase condensation process, then the resulting permittivity has been shown to be lower. Condensation of dielectric reaction products in the presence of an electric and/or magnetic field, has been shown to augment the permittivity of the condensed dielectric. This step may be applied to compounds other than parylene polymers.

The use of electrical and/or magnetic fields during the condensation process modifies the mechanical strength of the product. The material may or may not be anisotropic after condensation in strong fields. In one embodiment, the material is anisotropic after condensation in strong fields. In an independent embodiment, the material is not anisotropic after condensation in strong fields. Thus, this method could be utilized as a way of controlling the mechanical properties of the reaction products made by this procedure.

The thickness of a Puralene™ coating 140, 150 may range from 5 to 30 nm to greater than 10 microns. The coated electrode 110, 130 is then used as the basis for application of the dielectric material 120.

C. Binding Polymeric Molecules to the Electrode

In some embodiments, an electric field is applied across the first electrode, the dielectric film, and the second electrode while making the entropic energy storage device or while initially charging the EESD. The electric field is applied such that the first electrode functions as the positive electrode and the second electrode functions as the negative electrode. The electric field strength may be greater than 100 V/cm, or at least 0.001 V/μm, based on an average thickness of the dielectric film. In certain embodiments, the electric field strength is from 0.005-1 V/μm, 0.01-1 V/μm, 0.1-1 V/μm or 0.4-0.6 V/μm.

The electric field may be applied for an effective period of time to bind at least some of the polymeric molecules in the dielectric film to the first electrode, thereby producing a sterically constrained dielectric film. The effective period of time is based at least in part on the electric field strength and may range from one second to several minutes, such as from 30 seconds to 60 minutes, from 5 minutes to 30 minutes, or from 5 minutes to 15 minutes. In some embodiments, the electric field is 0.005-1 V/μm and the effective period of time is from 1 second to 30 minutes. In one embodiment, an electric field strength of 0.005-0.5 V/μm for 20 minutes is effective to bind more than 50% of protein molecules to a composite electrode surface comprising polymerized p-xylylene. In another embodiment, an electric field strength of 0.5-1 V/μm for 5-15 minutes is effective to bind more than 90% of protein molecules to a composite electrode surface comprising polymerized p-xylylene.

In some embodiments, after assembling the first electrically conductive electrode, dielectric film, and second electrically conductive electrode the dielectric film is treated with a chemical agent to bind at least some of the polymeric molecules to the first electrode, thereby producing a sterically constrained dielectric film. In certain embodiments, an electric field is applied across the first electrode, dielectric film, and second electrode, and the dielectric film is treated with a chemical agent.

In one embodiment, the first electrode is a composite electrode and treating the dielectric film with a chemical agent comprises applying a radical initiator to the insulative layer before applying the dielectric film to the insulative layer, and then activating the radical initiator to bind at least some of the polymeric molecules to the insulative layer and produce a sterically constrained dielectric film. Exemplary radical initiators include azobisisobutyronitrile, 1,1'-azobis (cyclohexanecarbonitrile), dicumyl peroxide, 2-hydroxy-2-methylpropiophenone, camphorquinone, phenanthrenequinone, combinations thereof, and other radical initiators known to one skilled in the art of polymerization. The radical initiator is activated by oxidation-reduction, photoinitiation, thermal initiation, or other methods known to those skilled in the art of polymerization, thereby binding at least some of the polymeric molecules to the insulative layer.

In an independent embodiment, the first electrode is a composite electrode and treating the dielectric film with a chemical agent comprises including a radical initiator in the film material of the dielectric film, and activating the radical initiator after applying the dielectric film to the insulative layer.

In an independent embodiment, the first electrode is a composite electrode and treating the dielectric film with a chemical agent comprises derivatizing the polymeric molecules with a derivatization agent to provide functional groups capable of cross-linking to the insulative layer of the composite first electrode, and subsequently crosslinking the functional groups to the insulative layer by using a radical initiator, ultraviolet light, thermal activation, or a combination thereof, thereby producing a sterically constrained dielectric film. Exemplary derivatization agents include anhydrides, carbodiimides, imidoesters, and reagents including combinations of N-hydroxysuccinimide and maleimide, aryl azide, or diazirine groups. In some embodiments, the derivatization agent is an anhydride, such as maleic anhydride, itaconic anhydride, cis-4-cyclohexene-1, 2-dicarboxylic anhydride, or cis-5-norbornene-end-2,3-dicarboxylic anhydride.

In an independent embodiment, the first electrode is a composite electrode and treating the dielectric film with a chemical agent comprises applying a plasma to the surface of the insulative layer before applying the dielectric film to the insulative layer. The plasma is made by passing a carrier gas (e.g., nitrogen or argon) with oxygen through a high voltage "spark" plasma. The voltage drop across the spark is approximately 100 V to 1000 V at 250 kHz. Alternatively, a high-frequency plasma can be made at much lower voltage (e.g., 13.6 MHz and <100 V) using the same gas mixture. The plasma creates monoatomic oxygen that lasts sufficiently long (e.g., a few milliseconds) to oxidize p-xylene. Polymeric molecules in the dielectric film react with the plasma, thereby binding at least some of the polymeric molecules to the insulative layer and forming a sterically constrained dielectric film.

One or more of the above embodiments for treating the dielectric film with a chemical agent may be used in combination. For example, the polymeric molecules may be derivatized with a derivatization agent, a crosslinking agent may be included in the film material, and a radical initiator may be included in the film material or applied to the insulative layer before applying the dielectric film and subsequently activated.

IV. Methods and Circuits for Use with Entropic Energy Storage Devices

FIG. 4 illustrates an exemplary circuit including a single entropic energy storage device C1 (represented as (C-SCI). A first multi-position switch S1 is adapted to connect the device C1 to a charge voltage source V0 (State A) or a discharge voltage source V3 (State B), or the switch S1 may be in a disconnected (NC), high-impedance (HiZ) position (State C). A second multi-position switch S2 is adapted to connect the device C1 to ground (State A) or to a load, represented as a resistor R1 (States B, C). Voltage V1, V2 may be monitored at various positions in the circuit, as desired, via test points 1, 2. In the following description, it is assumed that the charging voltage is positive with respect to ground voltage, although it is understood that opposite polarity and subsequent voltages relative to that could also be reversed to give essentially the same circuit action. It is also understood that ground potential as a reference to the voltages referred to is an arbitrary reference point. Any voltage could be chosen as a reference point and substituted in place of ground potential in the figures referred to herein as commonly performed to those versed in the art of electrical design.

When connected to a charging voltage, V0, the entropic energy storage device C1 charges with its opposite electrode connected to ground potential as shown in State A via switch S2. When full charge is obtained, no further current flows in this steady state other than non-ideal current due to leakage across the dielectric of the device C1. Methods to recover leakage currents in capacitive devices are disclosed in US 2013/0229157 A1, and could be implemented herein to mitigate the losses due to this leakage.

In State B, the device C1 is set with multi-position switches S1 and S2 configured to allow discharge of the device C1 through the load R1. The discharge voltage V3 may be any voltage less than the original charge voltage V0 and less than the voltage generated by the device when in a HiZ (unconnected) state (State C).

FIG. 5 is a flow chart 500 showing a generalized method of supplying energy from an energy storage device C1 to a load R1 includes providing at process block 510 a circuit including an energy storage device C1 charged to a first voltage level, the energy storage device C1 including first and second electrodes with a dielectric film positioned there between, the dielectric film comprising an entropic material as disclosed herein. The first electrode is charged positively or negatively with respect to the second electrode. At process block 520 a reversed polarization electric potential V3 is applied to the first electrode of the energy storage device C1 in a first mode of operation of the circuit for a discharge period of time, thereby supplying power from the energy storage device C1 to the load R1. A reversed polarization electric potential is applied to the device C1 by connecting the device C1 to a discharge voltage source. The reversed polarization electric potential V3 provided by the discharge voltage source may be less than the first voltage level and less than a voltage that would be generated by the energy storage device in a high impedance state. In some embodiments, the first electrode is charged positively with respect to the second electrode, and applying the reversed polarization electric potential to the first electrode comprises applying a negative voltage to the first electrode.

With reference to FIG. 4 and the flow chart 600 of FIG. 6, the energy storage device C1 may be charged to the first voltage by connecting the energy storage device to ground at step 610, and applying a charge voltage (V0, e.g., provided by a charge voltage source) to the first energy storage device C1 at step 620 for a period of time effective to charge the energy storage device C1 to the first voltage. In some embodiments, a charge current of the energy storage device is monitored while applying the charge voltage. As is understood by a person of ordinary skill in the art of capacitors, the charge current drops when the energy storage device is fully charged. Accordingly, the charge current may be compared to a selected minimum value at step 630 and, when the charge current is at or below the selected minimum value, the circuit is switched to a high-impedance state at step 640 so that the energy storage device no longer receives the charge voltage and so that substantially no energy is supplied from the energy storage device to the load. When it is desired to discharge the energy storage device, the second electrode of the energy storage device is connected to the load, and the reversed polarization electric potential is applied to the first electrode as shown in FIGS. 4 and 5.

FIG. 7 shows an exemplary circuit including two energy storage devices C1, C2. At least one of the energy storage devices C1, C2 is an embodiment of an EESD as disclosed herein. The two energy storage devices C1, C1 are configured in what could be called a push-pull configuration. The advantage of this configuration is the increased total voltage across the load R1 and therefore both a decreased amount of current necessary for a given power level as well as improved compatibility with existing silicon-based devices. There are other advantages that would not normally be considered when using devices other than the EESDs disclosed herein. In State A, energy storage device C1 is connected to a charging voltage V0 at the positive (+) terminal using multi-position switch S1 and a reference or ground voltage at the other terminal. Energy storage device C2 is connected to a charging voltage V0 at the positive (+) terminal using multi-position switch S3 and to a reference or ground voltage at the other terminal using multi-position switch S2. Charging to a given level of capacity is thereby performed in this state for both C1 and C2. In State B, the switches S1, S2, and S3 are reconfigured such that switches S1 and S2 are connected to the load, and switch S3 is connected to ground. Multi-position switches S1, S2, and S3 may be actuated by a computer controller or comparator. The controller/comparator also may monitor voltage in the circuit at V1 and/or V2. In the configuration of State B, device C1 presents a positive polarity to the load R1 that is the same polarity as the positive charging voltage V0. However, when C2 is connected to ground through S3, the positive electrode becomes ground and the second electrode (nearer the load at S2) goes to −V0 relative to ground. Thus, the second device C2 has reversed polarity presented to the opposite terminal of the load such that the polarity to the load is reversed from the charging voltage V0. The connection to ground has the same effect as applying a negative voltage to the entropic energy storage device C1 of FIG. 4. Utilizing a typical capacitor, the configuration of State B theoretically doubles the voltage potential across the load R1 to 2×V0. However, with an EESD, the configuration of State B further increases the device power output due to the voltage-dependent nature of the kinetic discharge of the devices C1, C2. The nonlinear performance of the devices C1, C2 in this way is an unexpected behavior, atypical of most capacitors, particularly in the low frequency regime intended for most applications of the EESD. In State C, switch S2 is connected to ground, and switches S1, S3 are configured to place devices C1, C2 in a high-impedance state in which substantially no energy is supplied from device C1 to the load R1.

In one embodiment, devices C1 and C2 are both EESDs as disclosed herein. In an independent embodiment, one of the devices C1, C2 is an EESD and the other device is a conventional electrostatic capacitor. Use of an electrostatic capacitor as one of the energy storage devices (C1 or C2) in the exemplary circuit of FIG. 7 may aid the discharge of the EESD (the other of C1 or C2) by presenting a lower impedance pathway for the current while still presenting a good voltage to aid in the nonlinear discharge of the EESD. In one non-limiting example, a traditional electrostatic capacitor such as an aluminum electrolytic could be substituted for either of the devices (in place of either C1 or C2 of FIG. 7).

Figure 8:
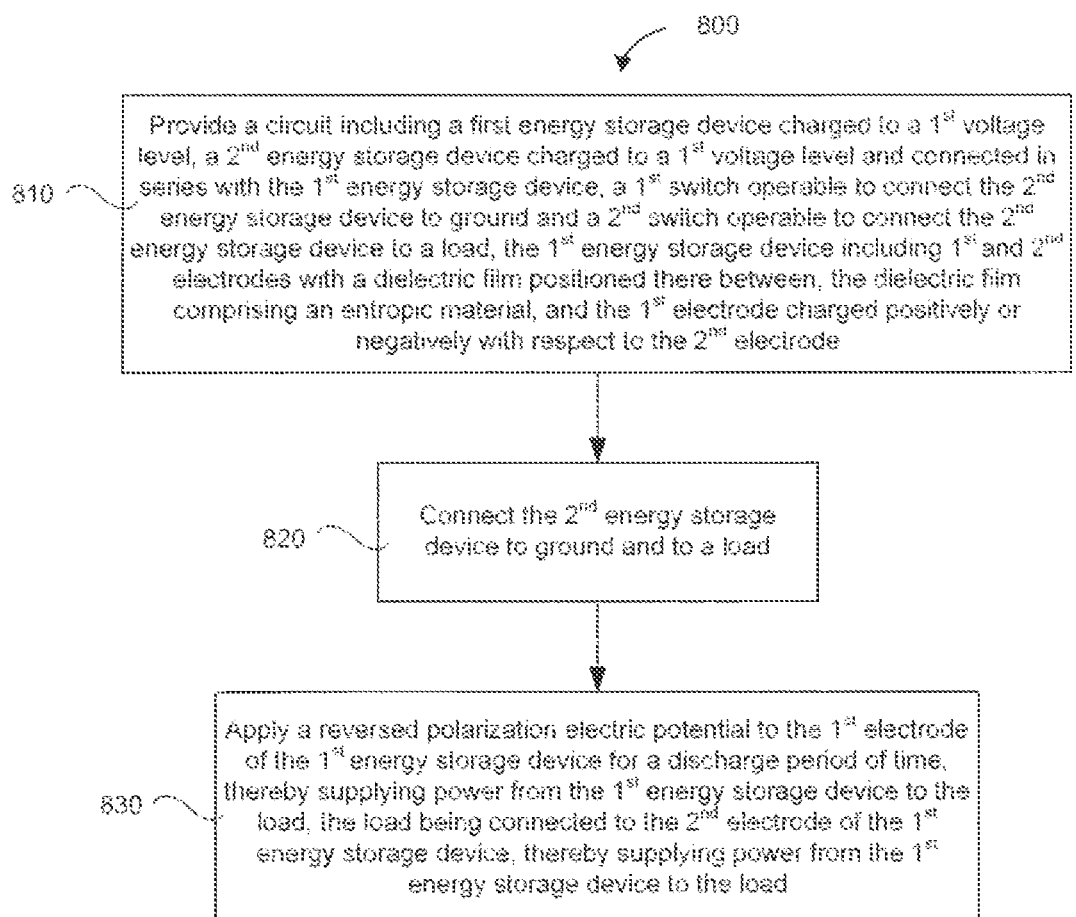
FIG. 8 is a flow chart of a generalized method of supplying energy to a load using a circuit with two energy storage devices, at least one energy storage device being an entropic energy storage device as disclosed herein.

With reference to an exemplary circuit according to FIG. 7 where a first energy storage device C1 is an EESD and the flowchart 800 of FIG. 8, a method of supplying energy from an energy storage device to a load includes providing a circuit at process block 810, the circuit including the first energy storage device C1 charged to a first voltage level, and a second energy storage device C2 charged to a first voltage level, wherein the second energy storage device C2 is coupled in series with the first energy storage device C1. The first energy storage device C1 includes first and second electrodes with a dielectric film positioned there between, the dielectric film comprising an entropic material as disclosed herein, and the first electrode is charged positively or negatively with respect to the second electrode. The first energy storage device C1 is connected to a load. The second energy storage device C2 may be a conventional electrostatic capacitor or an EESD as disclosed herein. The circuit also includes a first switch operable to connect the second energy storage device to ground and a second switch operable to connect the second energy storage device to the load. The method includes connecting the second energy storage device C2 to ground and to the load at process block 820, and applying a reversed polarization electric potential (e.g., ground) to the first electrode of the first energy storage device C1 at step 830 in a first mode of operation of the circuit for a discharge period of time, thereby supplying power from the first energy storage device C1 to the load R1. The reversed polarization electric potential may be less than the first voltage level and less than a voltage that would be generated by the first energy storage device C1 in a high impedance state. In some embodiments, the first electrode is charged positively with respect to the second electrode, and applying the reversed polarization electric potential to the first electrode comprises applying a negative voltage to the first electrode.

A traditional electrostatic capacitor has a time constant (R×C) during discharge that remains constant irrespective of the applied voltage. Unexpectedly, embodiments of the disclosed EESDs, when discharged do not exhibit a constant value for R×C. For example, as shown in Table 2 of Example 2 below, an EESD charged to 10 V may have a time constant that increases 3-fold as the discharge voltage varies from 0 V to −10 V. Application of a negative voltage to the charged EESD may produce a discharge rate 1,000% to 2,000% faster than the discharge rate obtained by application of 0 V (relative to V0).

Figure 9:
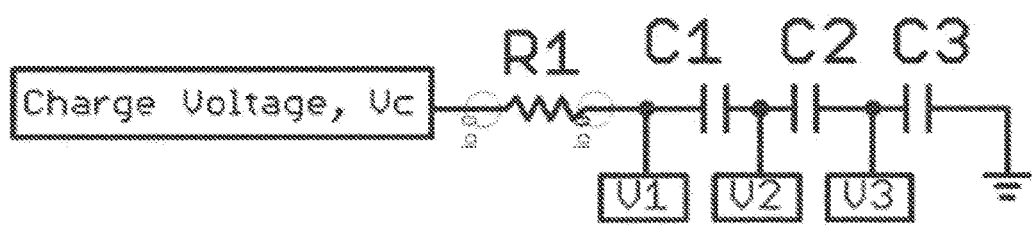
FIG. 9 is a diagram of an exemplary circuit with three ideal capacitors in series.

FIG. 9 is a diagram of an exemplary circuit with three energy storage devices C1, C2, C3 in series. If the energy storage C1, C2, C3 are all ideal capacitors (e.g., traditional electrostatic capacitors) and of the same capacitance, then upon application of a charge or discharge voltage Vc, the voltages at V1, V2, and V3 show the same voltage drop across each capacitor equal to one third of Vc. If one capacitor is of lesser capacitance than the other two, then the voltage drop across the smaller capacitor is larger than the other two.

In the case where a capacitor is replaced with an EESD, the same relationships hold during charging as with an array consisting entirely of ideal capacitors. However, during the discharge of an array of EESD devices, an accumulation of charge on the device with the lesser capacitance increases its voltage drop and thereby increases its rate of discharge which then decreases its voltage drop. An array of EESDs is therefore self-leveling to a greater extent in terms of kinetic discharge, during most of its discharge cycle, than an ideal capacitor array.

Figure 10:
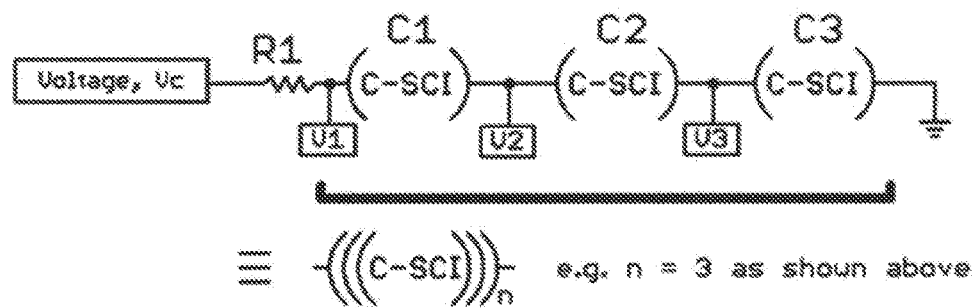
FIG. 10 is a diagram of an exemplary circuit with three entropic energy storage devices in series.

FIG. 10 is a diagram of an exemplary circuit with three entropic energy storage devices (represented as (C-SCI)) C1, C2, C3 in series. If a set of EESD devices are connected in series, then a triple parenthetical symbol around the device symbol is used. A subscript of n is added to denote the number of devices connected in series. A person of ordinary skill in the art understands that the number of EESDs arranged in series is not limited to three as illustrated in FIG. 10. There may be two, three, four, or more EESDs arranged in series. Thus, n may be any integer greater than one, i.e., 2, 3, 4, 5, etc.

Figure 11:
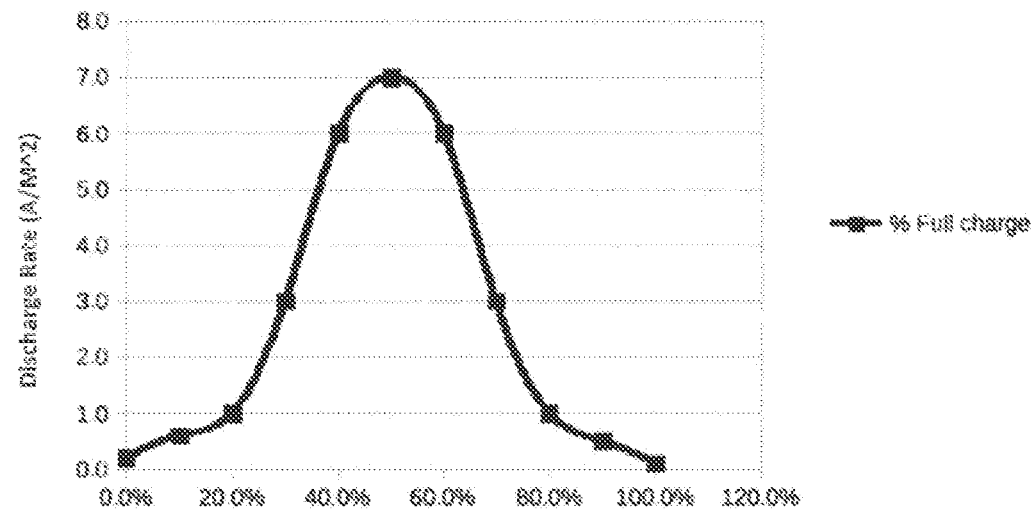
FIG. 11 is a graph of discharge rate versus fractional charge for an exemplary entropic energy storage device in the circuit of FIG. 4.

Embodiments of the disclosed EESDs have an unusual discharge rate pattern. FIG. 11 shows the discharge rate of an entropic energy storage device C1 in the exemplary circuit of FIG. 4. The graph in FIG. 11 was generated using a charge voltage of 20 V and a discharge voltage of 0 V. As the graph shows, when the EESD is only partially charged, for example to 1% of its total capacity, the rate of discharge into a nominal voltage is around 0.2 A/m$^2$. As the EESD is charged to a greater percentage of its full capacity, a much higher discharge rate is obtained, reaching a maxima of around 7 A/m$^2$ at approximately 50% of maximum charge. Although the absolute rates of charge and discharge vary significantly with viscosity of the dielectric material, temperature, and the capacitor thickness, the relative discharge rate may increase about 30-fold from the ground-state discharge rate to the maximum discharge rate as shown in FIG. 11. When the EESD is nearing full charge, the discharge rate falls to a much lower value, sometimes even lower than the original discharge rate at 1% charge. This is in sharp contrast to the behavior of most capacitors which discharge much more quickly when fully charged than when partially charged. This behavior is unexpected. Although not desirable from a rapid energy discharge perspective, this behavior is desirable from a safety standpoint when using these EESDs in larger scale. Advantageously, embodiments of the disclosed EESDs are not prone to rapid discharge at almost any level of charge, and they are not prone to uncontrolled discharge if the EESD is subjected to adverse mechanical or electrical events such as impact or short circuit.

Figure 12:
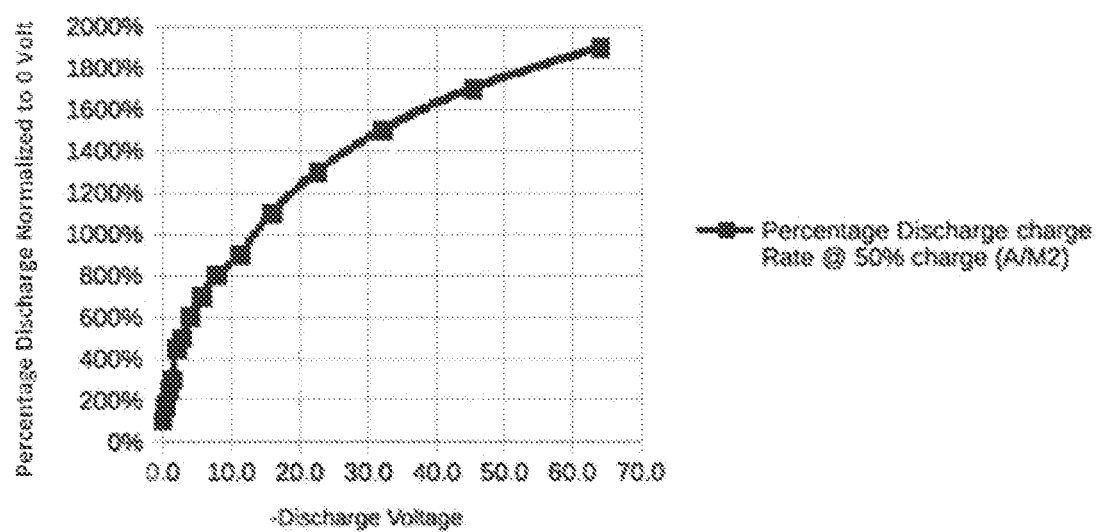
FIG. 12 is a graph illustrating the effect of a negative discharge voltage on the discharge rate of an exemplary entropic energy storage device (at 50% charge) in the circuit of FIG. 4.
Figure 13:
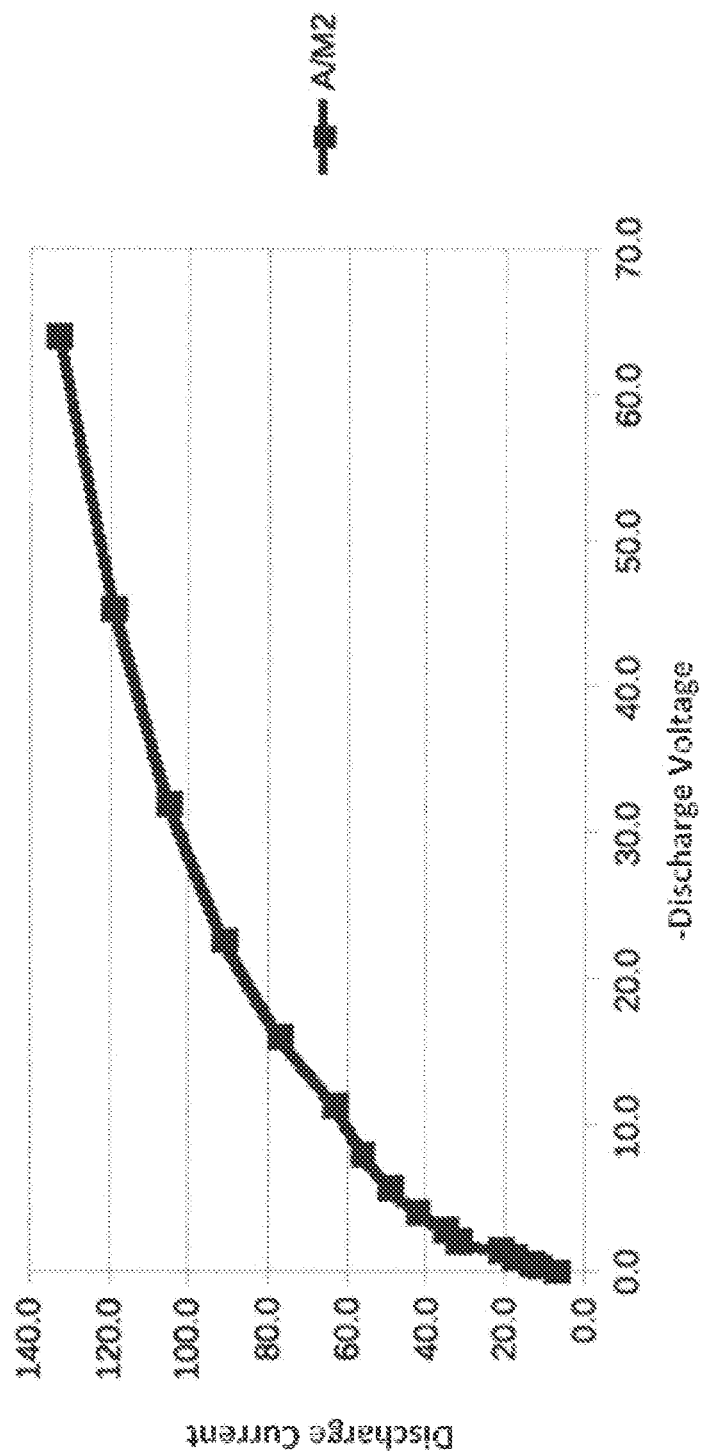
FIG. 13 presents the same data as FIG. 12 in a graph of discharge rate ($A/m^2$) versus negative discharge voltage.

The discharge rate of an EESD as disclosed herein can be dramatically improved by using a discharge voltage less than 0 V. FIG. 12 is a graph showing the effect of a negative discharge voltage on the discharge rate of an entropic energy storage device C1 as shown in the exemplary circuit of FIG. 4. If the EESD is charged to 20V, the rate of discharge is substantially improved by changing discharge voltage to a value that is more negative than 0 V (relative to V0). If the discharge voltage is actually negative (i.e. reversed polarity from the charging voltage), then the rate of discharge at most charge levels changes in a substantial fashion. The graph in FIG. 12 shows the effective of negative discharge voltages on the discharge rate when there is approximately a 50% partial charge on the EESD. As seen in FIG. 12, the rate of discharge is augmented by several multiples with only a small negative voltage. A decreasing percentage effect is obtained as the initial voltage on the EESD increases to more than 20% of the original charge voltage, although much higher discharge rates can be obtained. In FIG. 13, the same data is presented with actual numbers for the rate of discharge per square meter.

As FIGS. 12 and 13 demonstrate, the advantages of a circuit as shown in FIG. 7 are clear. Assuming each energy storage device C1, C2 is an EESD of the same construction, the configuration of FIG. 7 increases the power that each device C1, C2 is able to deliver by a factor of more than two. In the exemplary circuit of FIG. 7, a five- to ten-fold increase in the power delivered can be obtained with a −2.5 V discharge voltage applied to one electrode of each device C1, C2. If the devices C1, C2 were connected to the load R1 with a discharge into ground, then the expected power delivery would be double what each device alone would be able to deliver. However, with the circuit in FIG. 7, the negative voltage applied to the load R1 creates an effective negative discharge voltage for both devices and increases the power delivery by more than a factor of four when at least one of the devices C1, C2 is an EESD as disclosed herein. Interestingly, if the devices are both EESDs of approximately equal capacity and power delivery capability, then the total power output is balanced equally between the devices by the fact that the negative discharge voltage applied to each device is never allowed to reverse charge the opposite entropic device. This also helps to prevent the charging voltage from having to "uncharge" one device during a charge cycle. This balancing/counterbalancing effect aids in keeping both the power delivery and round-trip efficiency maximized in operation.

If two entropic energy storage devices C1, C2 are used in a circuit as shown in FIG. 7, and the two devices are substantially different in capacity and power delivery, then the more robust (higher current) device supplies most of the power during the discharge cycle into the load R1 (State B) due to its lack of voltage drop while under load. In this case, it is possible for the larger device to reverse charge the smaller device. If the circuit is reconfigured back to a charging state (State A), then the charging voltage V0 uncharges the smaller device to bring it back to zero charge and also supplies its energy to positively charge it to some percentage of full charge. The reverse charge's energy in this smaller device is lost. In addition, the energy that the larger device supplied to the smaller device is also required to be supplied during its charging, and therefore another loss of energy occurs on the other side of the load R1. Care should be taken to assure that the reverse charging of asymmetrical entropic energy storage devices does not occur or is minimized; otherwise the system "round-trip" efficiency is adversely affected.

Another factor arising during the charging and discharging of a circuit is the asymmetrical discharge of each EESD itself. Since each individual EESD is comprised of parallel electrodes (e.g., as shown in FIGS. 1 and 2, electrodes 110, 130), it is possible that the thicknesses and the parallelism of the electrodes are not perfect. In this case, or in the case of non-homogeneous dielectric materials and thicknesses, the charging and/or discharging rate of portions of the device's total area may differ. In this event one portion of the device may discharge more rapidly than another portion. If this occurs, then an intra-device reverse charging can take place. If this is the case, the EESD (e.g., device C1 in FIG. 4) can be moved from a discharge state (State B) to a high-impedance state, i.e., unconnected to a load or a charging voltage, (State C) to provide a rest or recovery period of time, during which natural self-equilibration of the dielectric can take place before undesirable reverse charging can take place. By "self-equilibration" is meant that charge/entropy states throughout the entropic dielectric material become more homogeneous. In other words, an area of lesser charge or even reverse charge within the dielectric material may become recharged by energy received from an adjacent region of the entropic dielectric material.

Figure 14:
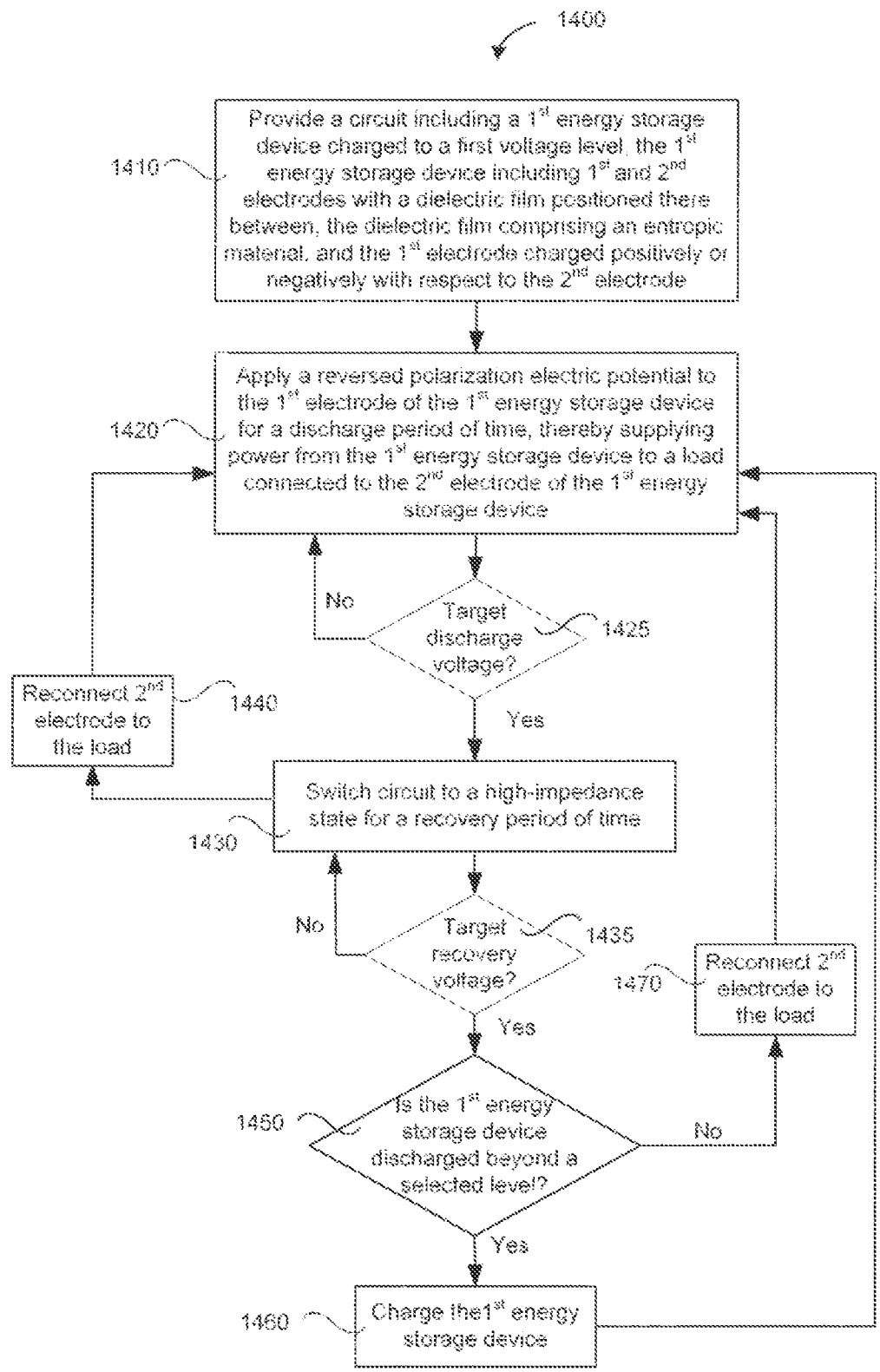
FIG. 14 is a flow chart of a generalized method of supplying energy to a load by pulsed discharge of an entropic energy storage device as disclosed herein.

Thus, in some embodiments, an exemplary circuit as shown in FIG. 4 is operated in a pulsed discharge mode as shown in flowchart 1400 of FIG. 14. Following the initial discharge period of time (State B) in process block 1420, the circuit is switched to a second mode of operation in process block 1430 for at least a threshold recovery period of time to provide a voltage recovery period during which the circuit is in a high-impedance state (State C) so that substantially no energy is supplied from the first energy storage device to the load and the entropic material is restored to a desired level of entropic equilibrium. The circuit may be repeatedly switched between the first and second modes of operation (process blocks 1420, 1430) without recharging the energy storage device from an external power source. If the second electrode is disconnected from the load in the second mode of operation, it is reconnected in process block 1440 before switching the circuit to the first mode of operation. During each discharge period, a reversed polarization electric potential is applied to the energy storage device, producing a voltage drop in the device. During each recovery period, the device voltage recovers (see, e.g., Example 2 and FIG. 19).

The voltage of the first energy storage device may be monitored at process block 1450 to determine when it is discharged beyond a selected level (i.e., when the energy storage device voltage fails to recover to a desired level). If the first energy storage device is not discharged beyond the selected level, the circuit is switched back to the first mode of operation. If the first energy storage device is discharged beyond the selected level, the first energy storage device is charged at process block 1460. With reference to FIG. 4, charging is performed by switching the circuit to State A for a sufficient period of time to charge the first energy storage device C1. When the device C1 is sufficiently charged, the circuit is switched back to State B and the pulsed discharge method can resume. In embodiments where the second electrode is disconnected from the load, the second electrode is reconnected to the load in process block 1470 before switching the circuit back to the first mode of operation.

In some embodiments, the discharge voltage is monitored in step 1425. If the discharge voltage is at or below a target level, the circuit is switched to the second mode of operation in process block 1430. Similarly, the recovery voltage may be monitored in step 1435. If the recovery voltage is at or above a target level, the circuit is switched back to the first mode of operation in process block 1420.

As one example, an EESD is charged to a first voltage V1. During a first discharge period of time, the circuit is configured to State B (see, e.g., FIG. 4) and the EESD is partially discharged to a second voltage V2, where V1>V2. The circuit is then switched to a high-impedance state (State C, FIG. 4) for a recovery period during which the voltage of the EESD increases to a third voltage V3, where V1>V3>V2. The circuit is switched back to the configuration of State B for a second discharge period of time to further supply energy to the load and discharge the EESD to a fourth voltage V4, where V1>V3>V4. The circuit is again switched to the configuration of State C for a second recovery period of time during which the voltage of the EESD increases to a fifth voltage V5, where V1>V3>V5>V4. The cycles are repeated with each subsequent recovery voltage being equal to or slightly less than the previous recovery voltage. When the EESD is fully or mostly discharged, it may be recharged to V1 by applying a charge voltage (see, e.g., State A, FIG. 4).

A discharge period of time and the subsequent recovery period of time collectively constitute a duty cycle. In some embodiments, the discharge period of time is 0.1-99.9% of the duty cycle, such as 1-95%, 5-90%, 5-80%, 10-70%, or 10-50% of the duty cycle. Thus, a duty cycle of 10 ms may have a discharge period of 0.01-9.99 ms, 0.1-9.5 ms, 0.5-9 ms, 0.5-8 ms, 1-7 ms, or 1-5 ms.

In some embodiments, intra-device and/or inter-device reverse charging can occur, such as when using the exemplary circuit shown in FIG. 7. Thus, a circuit such as shown in FIG. 7 can be placed into a high-impedance state (State C) to provide a recovery period for devices C1, C2 when at least one of the devices C1, C2 is an EESD as disclosed herein. In State C a high impedance position of switches S1 and S3 is provided. In some embodiments, a comparator or computer controller circuit is used to monitor the device voltages V1, V2 at test points TP1, TP2 to ensure that the desired polarity of the voltage is maintained at all times and also to monitor the equilibrium or "float" voltage of the device. The recovery period allows a period of time for the comparator/computer controller to determine the equilibrium voltage V1, V2 at the positive electrodes of the devices C1, C2, respectively, and also for any areas of charge/entropic heterogeneity in the entropic dielectric material to readjust for a more consistent charge level across the device C1, C2.

If a pulsed discharge of a circuit such as shown in FIG. 7 is desired, then a sequence of switch S1, S2, S3 positions as shown below in Table 1 can be used. This switching sequence can be used to control current or voltage in a manner well known to those versed in the art of electronic pulse width modulation of active feedback control loops. In the case of entropic devices as described in this document, there are other benefits to using a pulsed width technique, e.g., allowing areas of charge/entropic heterogeneity in the entropic dielectric material to self-equilibrate. These benefits are unexpected and not anticipated in the normal course of active feedback control design.

TABLE 1

| Switch Positions for FIG. 7 During Pulsed Load High Power Discharge | | | | | |
|---|---|---|---|---|---|
| step | Time | State | S1 | S2 | S3 |
| 1 | 0 | charge | 1 | 2 | 1 |
| 2 | just before transition to A | — | 3 | 2 | 3 |
| 3 | line A | discharge | 2 | 1 | 2 |
| 4 | just before transition to B | — | 3 | 1 | 3 |
| 5 | line B | HiZ | 3 | 2 | 3 |
| 6 | just before transition to C | — | 3 | 1 | 3 |
| 7 | line C | discharge | 2 | 1 | 2 |
| repeat to step 4 | | | | | |

Since the unconnected high-impedance state (FIG. 7, State C) will produce a "dead-time" in the power delivery, a variety of solutions present themselves as possibilities to allow a continuous flow of power to the load R1, if desired. One such possibility is to provide a multitude of EESDs attached to the same load. When one "set" of devices is in a high-impedance state, another set of devices is switched into the load to provide continuous current. For example, one or both of devices C1 and C2 in FIG. 7 may be replaced by two or more EESDs connected in parallel, where any one of the EESDs may be connected to the load R1 at any given time. Alternatively, a simple electrostatic capacitor could be added to store a portion of the energy and maintain power delivery for the period of time necessary for the balancing and monitoring to take place.

Figure 15:
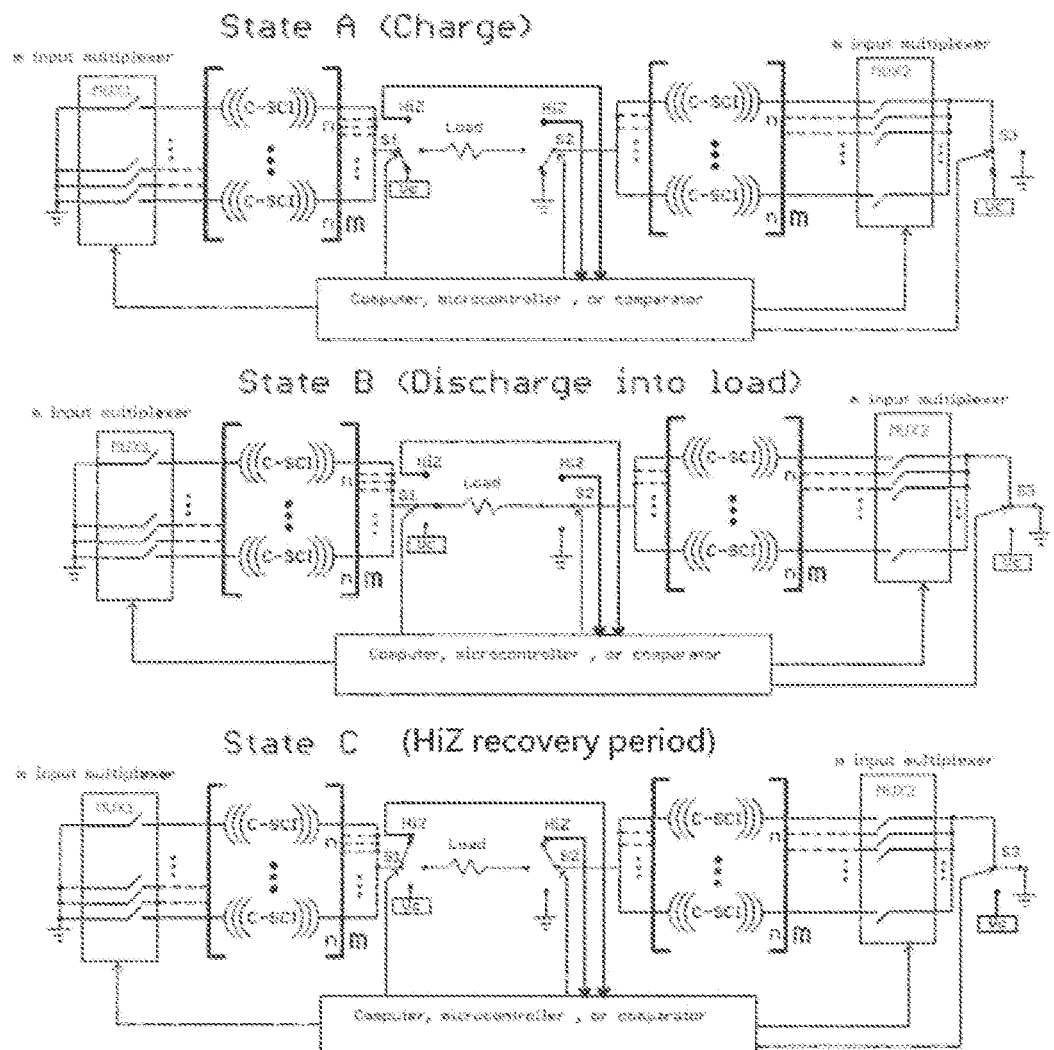
FIG. 15 shows diagrams of an exemplary circuit including arrays of entropic energy storage devices as disclosed herein. The circuit is shown in a charging state (State A), a discharging state (State B), and a high impedance state (State C).

FIG. 15 shows a circuit including arrays of EESDs connected in series. The series connection of EESDs provides more voltage to enable more power for a given size conductor. A parallel connection of two or more series of EESDs enables a more continuous flow of power to the load. A multitude of devices (m*n) including m number of parallel-connected rows of n number of series-connected EESDs are shown in FIG. 15. The inclusion of several rows provides for a more continuous current to the output from the array when using the pulsed techniques described. As one non-limiting example, if a 10% duty cycle were used for the pulsation, then it would be advantageous to provide ten rows of series-connected devices. During operation of the circuit, individual rows in the arrays are cycled through discharge and high-impedance states. Actuation of the multiplexer switch arrays (MUX1, MUX2) as well as S1, S2, and S3, utilizing a control microprocessor or an analog comparator enables the control of current and voltage as will be understood by persons of ordinary skill in the art of control circuits and electronics.

Figure 16:
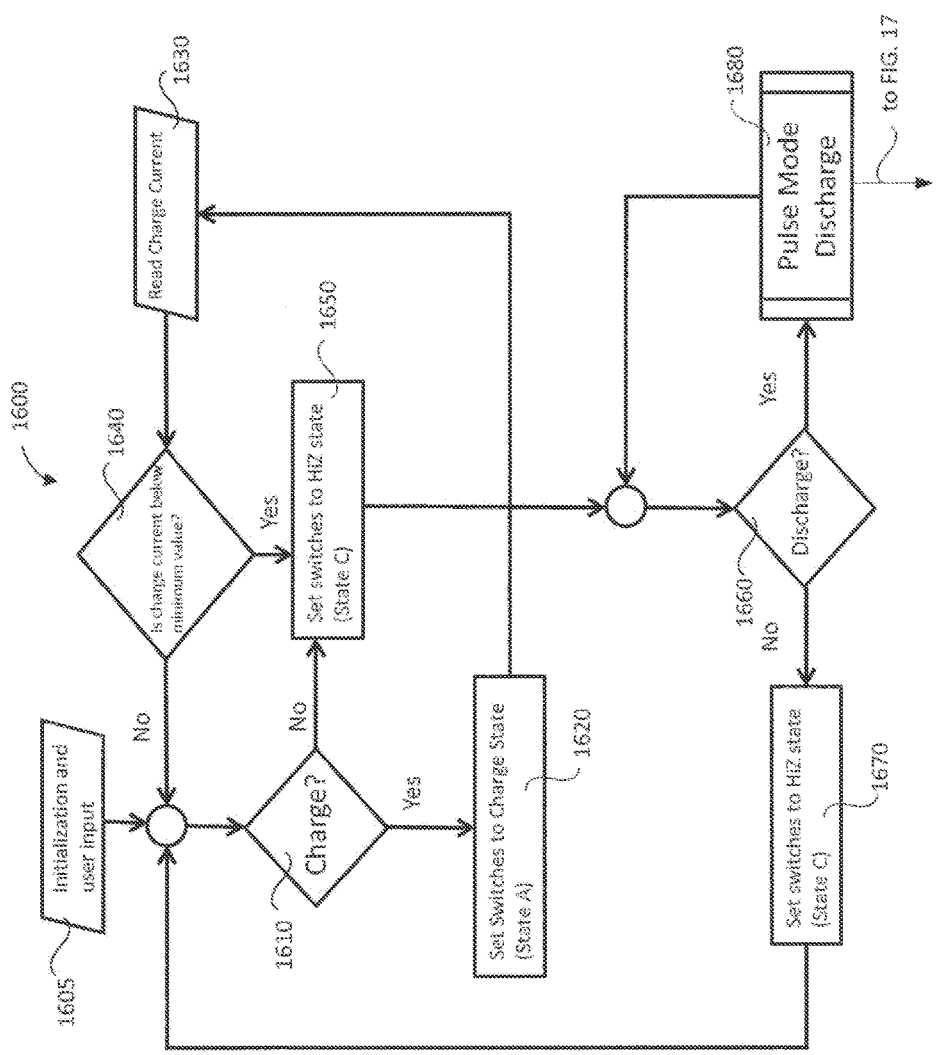
FIG. 16 is a flow chart illustrating control of multi-position switches during operation of a circuit according to any one of FIG. 4, 7, or 15.
Figure 17:
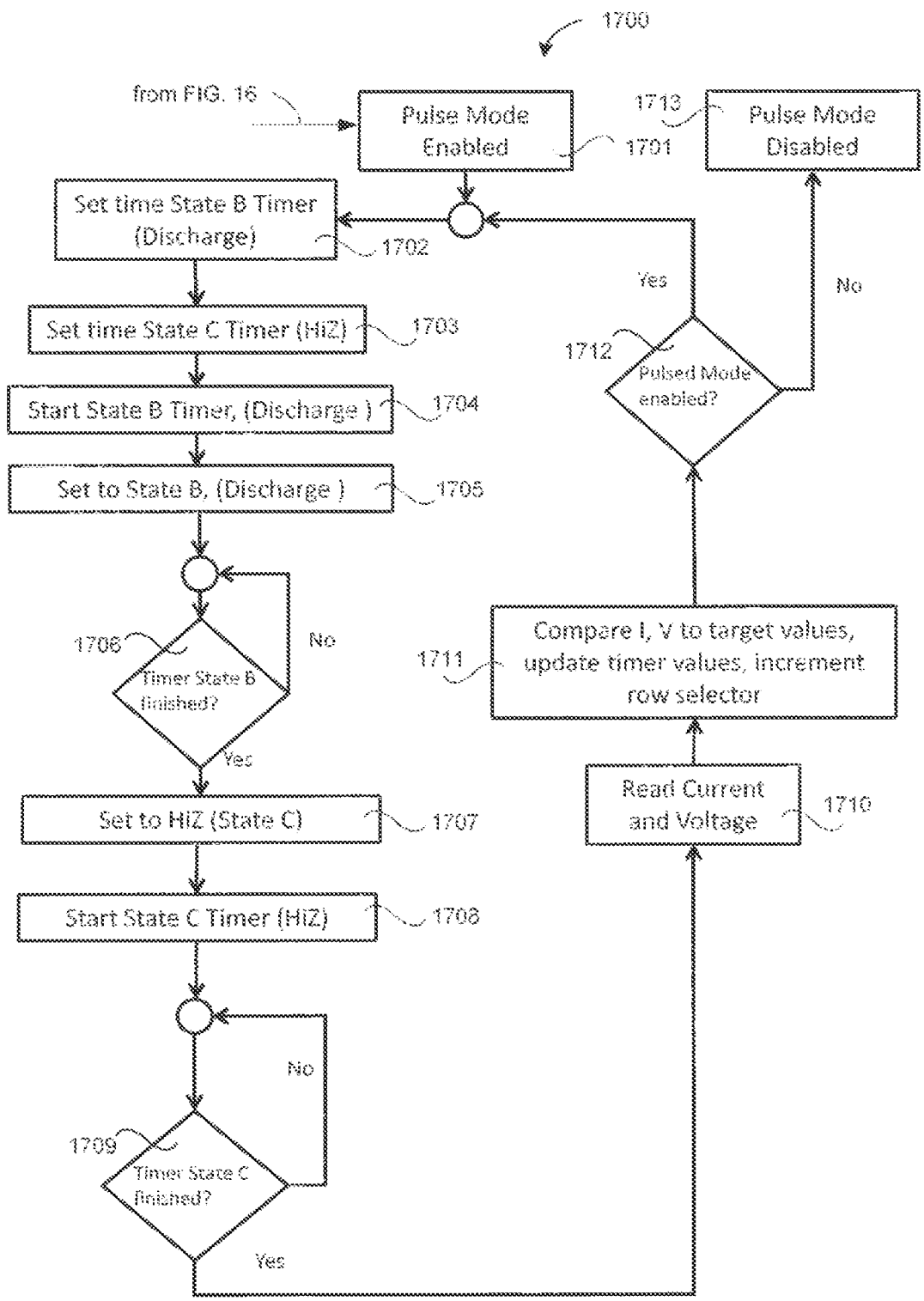
FIG. 17 is a flow chart illustrating control of multi-position switches in a pulsed-discharge mode of operating a circuit according to any one of FIG. 4, 7, or 15.

FIGS. 16 and 17 are flow diagrams 1600, 1700 illustrating exemplary algorithms for controlling multi-position switches to provide a pulsed discharge in a circuit including an entropic energy storage device, e.g., a circuit as shown in FIG. 4, 7, or 15. A person of ordinary skill in the art of circuit control algorithms will understand that the illustrated algorithms are only examples and that other algorithms may be used to accomplish the same control steps. Control may be provided by a comparator or computer controller as will be understood by a person of ordinary skill in the art of circuit control.

With reference to flowchart 1600 of FIG. 16, an exemplary algorithm begins with initialization and user input in step 1605. A decision of whether to charge the EESD(s) is made in step 1610. If the answer is "yes," then the multi-position switches (e.g., switches S1, S2 of FIG. 4, or switches S1, S2, S3 of FIG. 7 or 15) are set to the charge state (e.g., State A of FIG. 4, 7, or 15) in step 1620. The charge current is read in step 1630 (e.g., at Test Points 1, 2 of FIG. 4 or 7) and compared to a minimum value. If the charge current is not below the minimum value, the answer is "no" and another decision may be made in step 1610 to charge the EESD(s). When the EESD(s) is fully charged, the charge current falls below the minimum value, and the multi-position switches are set to a high-impedance state (e.g., State C of FIG. 4, 7, or 15) in step 1650. A decision of whether to discharge the EESD(s) is made in step 1660. If the answer is "no," the multi-position switches are set, or maintained, to provide a high-impedance state in step 1670. If the answer is "yes," then the algorithm switches to a pulse-mode discharge algorithm in step 1680. Details of the pulse-mode discharge algorithm are provided in flowchart 1700 of FIG. 17.

With reference to the flowchart 1700 of FIG. 17, pulse mode is enabled in step 1701. In steps 1702 and 1703, respectively, the State B (discharge) and State C (high-impedance) timers are set. Steps 1702 and 1703 may be performed simultaneously or sequentially in any order. Initial time values may be input into the controller, e.g., by an operator. The State B timer is started in step 1704. In step 1705, the multi-position switches (e.g., S1, S2, S3) are set to discharge (e.g., State B of FIG. 4, 7, or 15). Steps 1704 and 1705 may be performed sequentially in any order. The algorithm then queries in step 1706 whether the State B timer is finished. When the answer is "yes," the multi-position switches are switched in step 1707 to place the EESD(s) in a high-impedance state (e.g., State C of FIG. 4, 7, or 15). In step 1708, the State C timer is started. Steps 1707 and 1708 may be performed sequentially in any order. The algorithm then queries in step 1709 whether the State C timer is finished. When the answer is "yes," the current and voltage of the EESD(s) are read in step 1710 (e.g., at Test Points 1, 2 of FIG. 4 or 7). In step 1711, the current and voltage are compared to target values and the timer values are updated. When the circuit includes an array of EESDs (e.g., as shown in FIG. 15), the row selector is incremented in step 1711 to switch a different set of EESDs into the circuit. In step 1712, a decision is made whether to remain in pulsed-mode discharge. If the answer is "no," then the pulse mode is disabled in step 1713.

As an alternative to using timers for States B and C, the voltage of the EESD may be monitored by a controller as will be under by a person of ordinary skill in the art of circuit control. For example, the voltage may be monitored by a controller while the circuit is in the first mode of operation (discharge mode) until the voltage reaches a desired discharge voltage level. The circuit is then switched to the second mode of operation (high-impedance mode) until the voltage reaches a desired recovery voltage level. The circuit may be switched between the first and second modes of operation as the monitored voltage reaches the desired discharge and recovery voltage levels.

V. EXAMPLES

The entropic material used in the following examples was prepared as follows. A zein-based entropic material for an energy storage device was formed from 15 grams of zein (Sigma-Aldrich #Z3625), to which 50 ml of absolute ethanol was added. The solution was well stirred under inert atmosphere until complete dissolution was obtained. To this solution was added portion-wise 10 g of maleic anhydride (Sigma-Aldrich #M188) solid with vigorous stirring for a total period of 30 min. The solution was heated to 60° C. during this period of time. At the end of the period 0.5 g of dicumyl peroxide (Sigma-Aldrich #329541) was added portion-wise over 5 min. The solution was allowed to boil and stir at above 60° C. for 1.5 h. The solution was cooled to room temperature. Then solid guanidine carbonate (Sigma-Aldrich# G1165-9) was added portion-wise until the solution was neutral to basic. The resulting honey colored liquid was used as the dielectric.

The entropic energy storage devices also included an insulative layer comprising the Puralene™ polymer (polymerized p-xylylene) on each electrode. Spacers were used to provide spacing between the electrodes (e.g., a spacing of approximately 10 microns), and a separator was included between the electrodes. When assembled, the constructed EESD was vacuum sealed in aluminum foil with leads extending from the sealed EESD for electrical connections.

Example 1

Discharge of an Entropic Energy Storage Device

Figure 18:
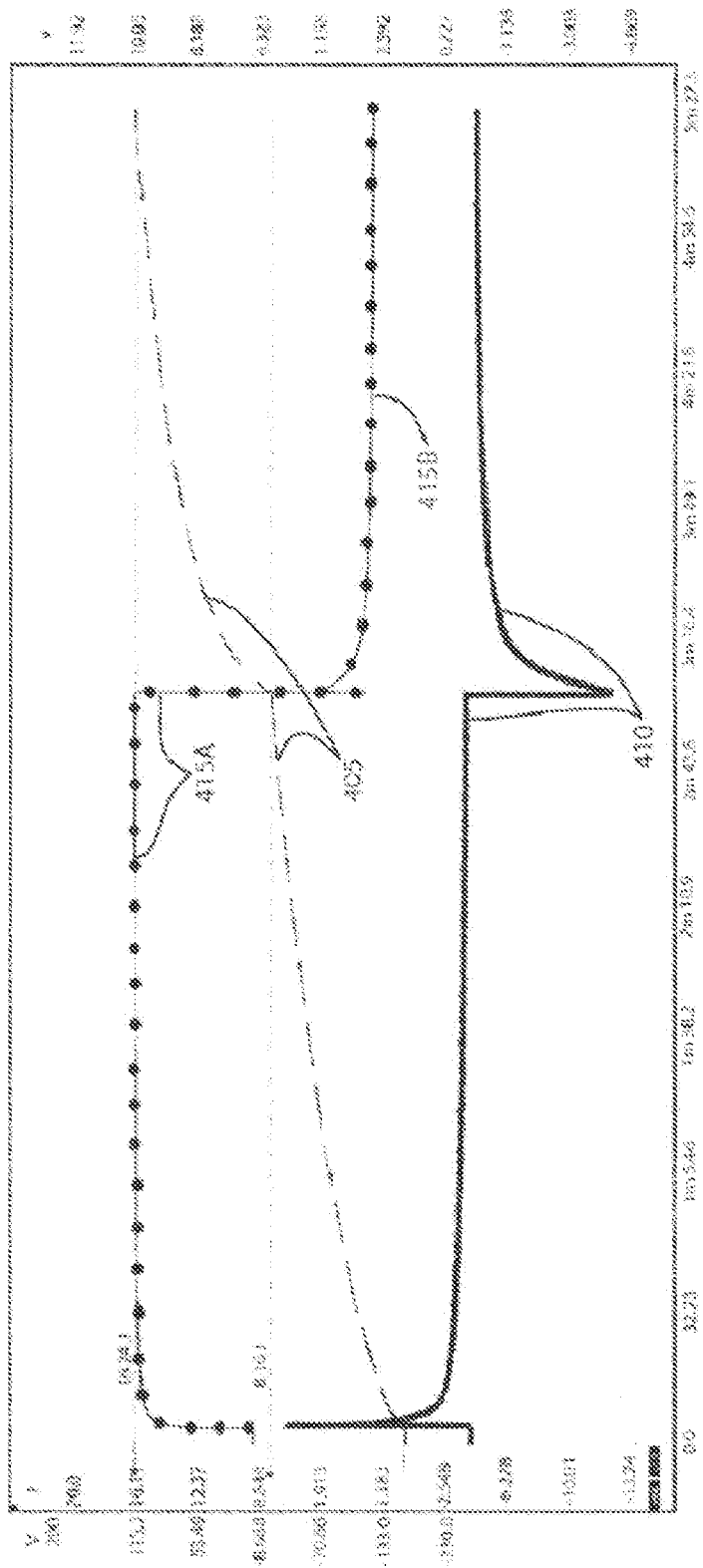
FIG. 18 illustrates voltages over time for charge and discharge of an exemplary entropic energy storage device.

Referring now to FIG. 18, energy and voltages over time for an exemplary energy storage device according to principles of the invention are conceptually illustrated. The energy storage device was charged through a resistor coupled to a 120 VDC source. Connection of a PicoScope™ Model 4262 to each electrode of the energy storage device and utilization of the scope's integrated math functions allowed calculation and display of the energy flowing into the circuit as shown by trace 405. The applied voltage to the first electrode is represented by trace 415A-415B, and the displacement current is represented by the trace 410. The first charging voltage of approximately 120V supplied 8.16 J to the capacitor. The second voltage of −120 VDC applied at approximately the 3 minute mark showed an energy delivery of 8.08 J. In this particular charge sequence, the amount of charge and discharge were approximately equal. Integration of the displacement current across the capacitor revealed that the energy absorbed and the energy discharged were approximately equal to within the error limits of the data acquisition device and integration routine. Longer charge cycles could be used, but essentially all of the energy supplied in this period of time at this voltage had been absorbed by the energy storage device in this time frame. Some drop in the power supplies were present due to the low reactance of the energy storage device during initial switching. This voltage drop was accounted for in the calculations of the scope. In this example, the energy absorbed was 8.16 J. The volume of sample was 0.006333 mL. The energy density was 1288 J/mL or 198 Wh/kg. Integration of the charged revealed that essentially a >90% recovery of the charge could be obtained when the discharge cycle was at least 10 times longer than the charge cycle.

Example 2

Comparison of Electrostatic Capacitor and Entropic Energy Storage Device

In the context of charging (and discharging) an electrostatic capacitor, a real electrostatic capacitor can be modeled as an ideal capacitor in series with a resistor.

The relationships of the current, voltage, and time constant (RC values) are set out below.

C=the capacitance of C1
$V_S$=the supply voltage to the resistor supplying voltage to the first electrode of the capacitor
$V_C$=the voltage across the capacitor's electrodes (at the junction of the first capacitor electrode and the resistor)
i=the current across the capacitor, or $$\frac{dQ}{dt}$$

R=the Ohmic resistance of the resistor including the equivalent series resistance, ESR
$Q_C$=the charge accumulated on each electrode of the capacitor
t=time $$V_S - iR - V_C = 0$$

$$V_S - V_C = iR$$

knowing CV=Q, then $$V_s - \frac{Q_c}{C} = iR$$

substituting for i, $$V_S - \frac{Q_c}{C} = R\frac{dQ_c}{dt}$$

$$\frac{1}{R}\left(V_s - \frac{Q_c}{C}\right) = \frac{dQ_c}{dt}$$

-continued $$\frac{1}{R}(CV_s - Q_c) = \frac{dQ_c}{dt}$$

$$\frac{dt}{RC} = \frac{dQ_c}{(CV_s - Q_c)}$$

$$\frac{-dt}{RC} = \frac{-dQ_c}{(CV_s - Q_c)}$$

One can integrate from time 0 to time t where $Q_0$ is charge at time 0 and Q is the charge at time t.

$$\frac{-1}{RC}\int_0^t dt = \int_{Q_0}^Q \frac{-dQ_c}{(CV_s - Q_c)}$$

$$\frac{-t}{RC} = \ln(CV_s - Q) - \ln(CV_s - Q_0)$$

$$\frac{-t}{RC} = \ln\frac{CV_s - Q}{CV_s - Q_0}$$

$$e^{\frac{-t}{RC}} = \frac{CV_s - Q}{CV_s - Q_0}$$

$$(CV_s - Q_0)e^{\frac{-t}{RC}} = CV_s - Q$$

$$(CV_s - Q_0)e^{\frac{-t}{RC}} - CV_s = -Q$$

$$CV_s - (CV_s - Q_0)e^{\frac{-t}{RC}} = Q$$

$Q_0$ can be replaced using the relationship, $$CV = Q$$

and with the initial voltage, $V_0$, and capacitance C $$CV_s - (CV_s - CV_0)e^{\frac{-t}{RC}} = Q$$

In simplified form $$C\left[V_s - (V_s - V_0)e^{\frac{-t}{RC}}\right] = Q$$

by taking the time derivative $$\frac{d}{dt}C\left[V_s - (V_s - V_0)e^{\frac{-t}{RC}}\right] = \frac{dQ}{dt} = i$$

$$C\left[\frac{1}{RC}(V_s - V_0)e^{\frac{-t}{RC}}\right] = i$$

which simplifies to $$\left[\frac{1}{R}(V_s - V_0)e^{\frac{-t}{RC}}\right] = i \qquad \text{Equation 1}$$

as a final form for current as a function of time, which gives the time dependency for $$V_S - V_C = iR$$

Now that the form of the equation that describes the kinetic relationship of voltage (V), RC, and current (i) across a capacitor is determined, it is useful to also express the relationship of voltage to the other quantities.

Starting with equation $$C\left[V_s - (V_s - V_0)e^{\frac{-t}{RC}}\right] = Q$$

by dividing both sides by C $$\left[V_s - (V_s - V_0)e^{\frac{-t}{RC}}\right] = \frac{Q}{C}$$

using identity $$CV = Q$$

$$\left[V_s - (V_s - V_0)e^{\frac{-t}{RC}}\right] = V$$

All curves were fitted using the general form equation for exponential time decay, $$y = y_o + A1 e^{\frac{-x}{t1}}$$

In this case $$y_o = V_s$$

$$A1 = -(V_s - V_0)$$

$$x = t$$

$$t1 = RC$$

so that $$y = y_o + A1 e^{\frac{-x}{t1}} = \left[V_s - (V_s - V_0)e^{\frac{-t}{RC}}\right] = V$$

Figure 19:
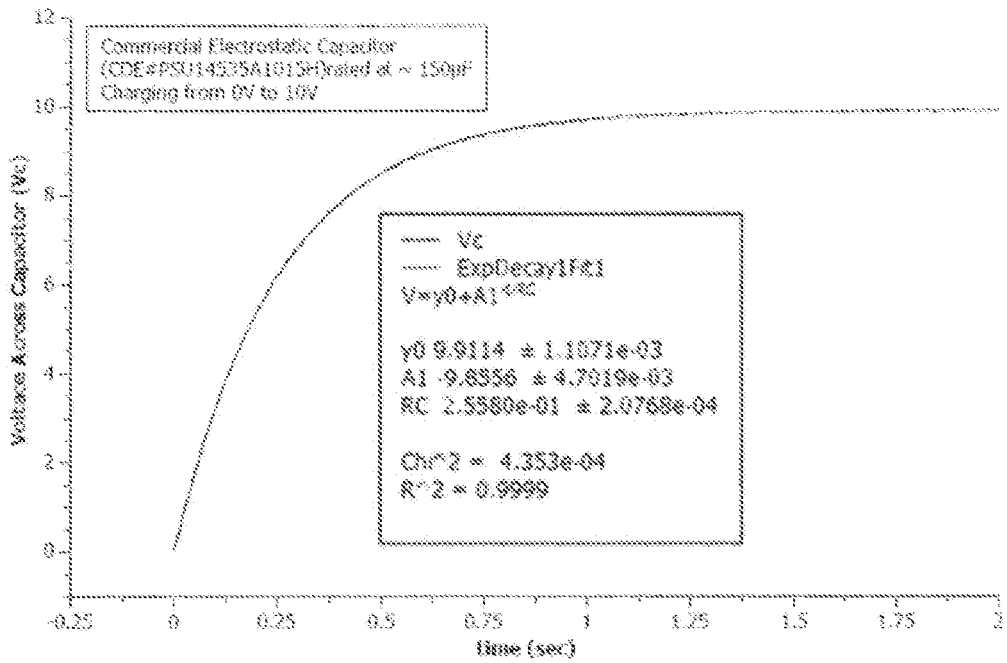
FIG. 19 is a charge curve showing voltage as a function of time while charging a commercial electrostatic capacitor from 0 V to 10 V.
Figure 20:
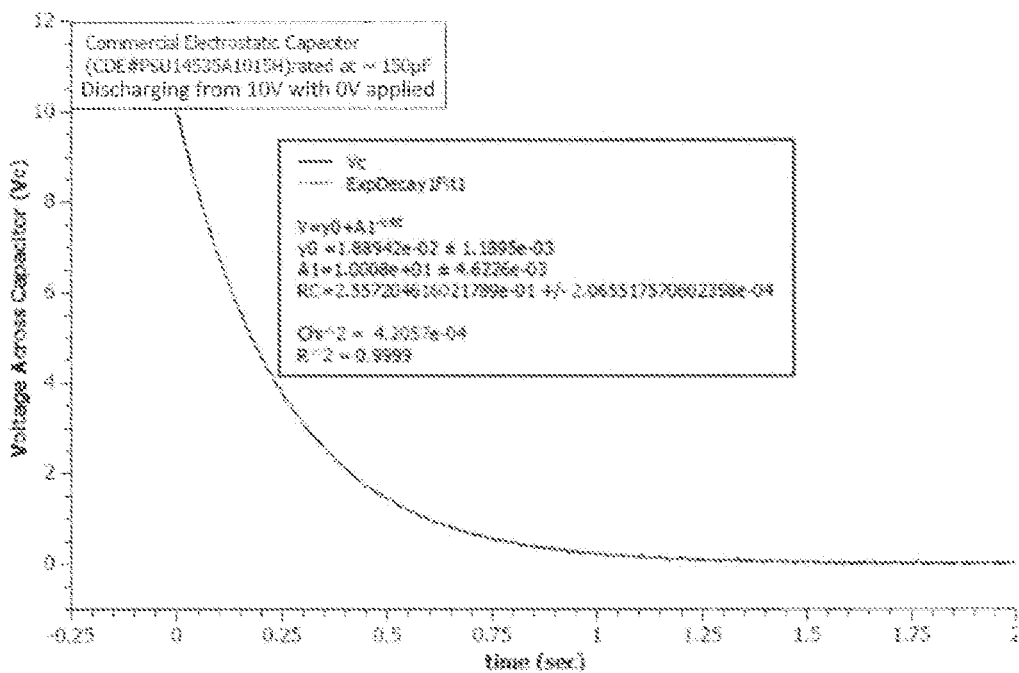
FIG. 20 is a discharge curve showing voltage as a function of time while discharging the commercial electrostatic capacitor of FIG. 19 with an applied voltage of 0 V.
Figure 21:
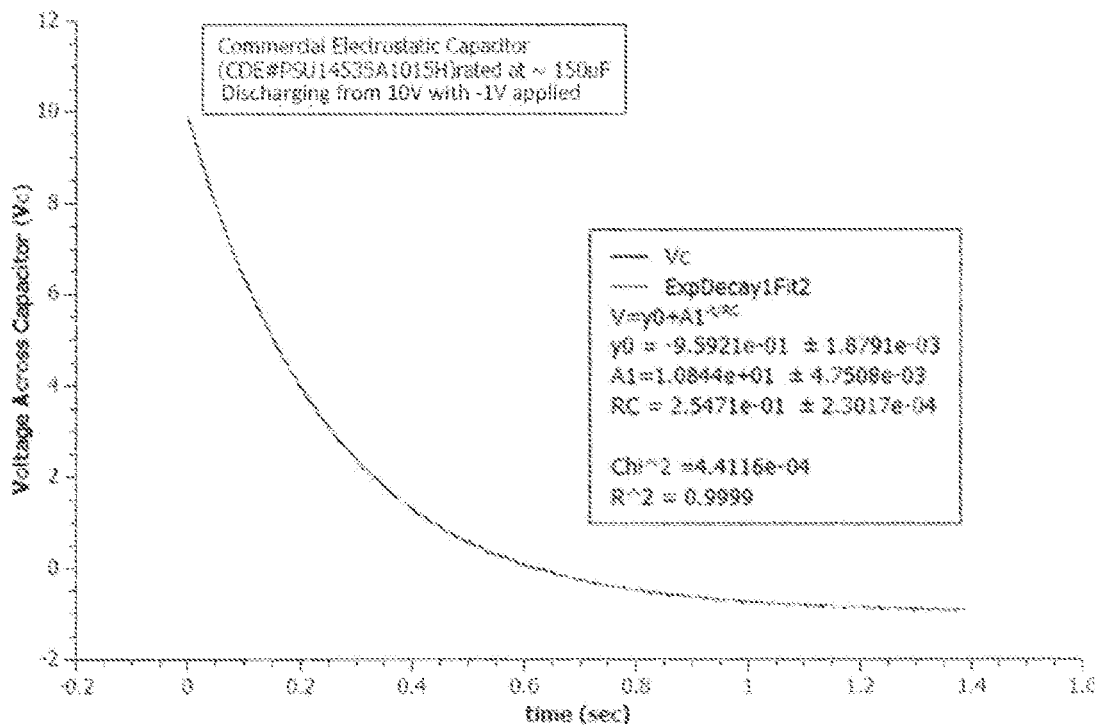
FIG. 21 is a discharge curve showing voltage as a function of time while discharging the commercial electrostatic capacitor of FIG. 19 with an applied voltage of −1 V.
Figure 22:
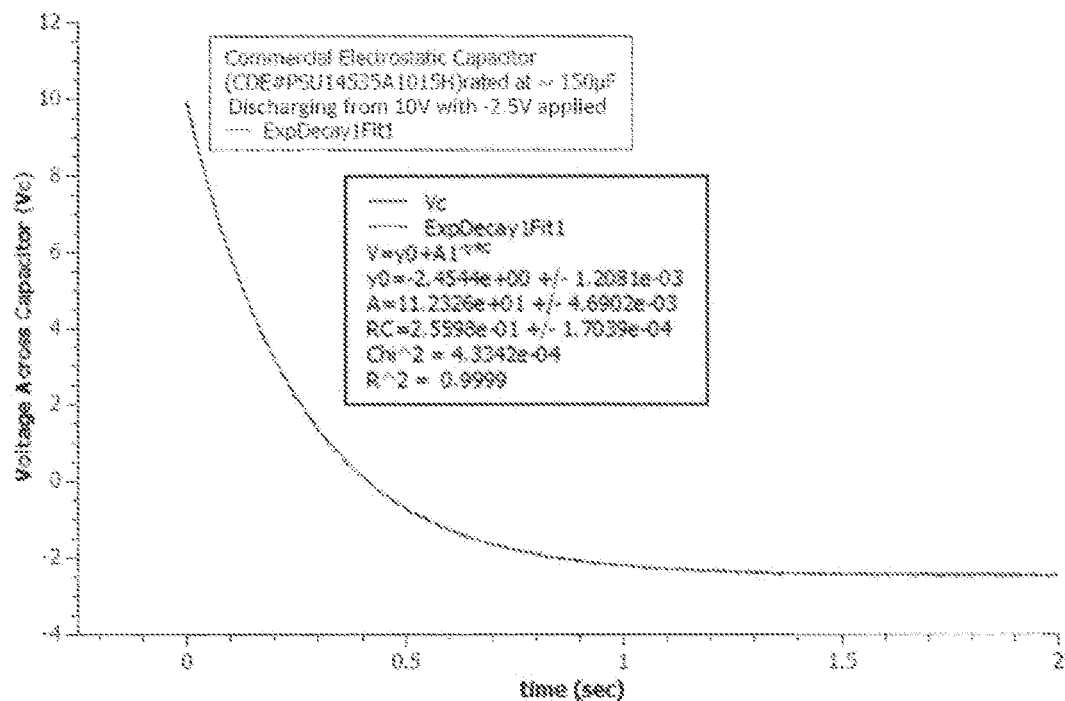
FIG. 22 is a discharge curve showing voltage as a function of time while discharging the commercial electrostatic capacitor of FIG. 19 with an applied voltage of −2.5 V.
Figure 23:
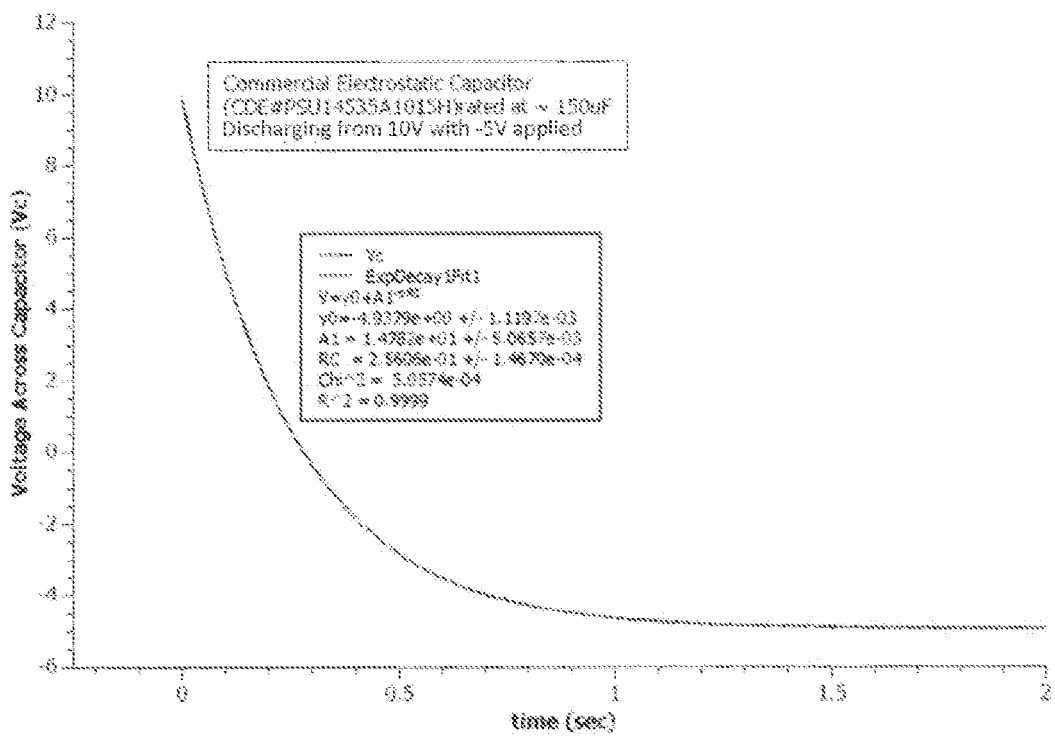
FIG. 23 is a discharge curve showing voltage as a function of time while discharging the commercial electrostatic capacitor of FIG. 19 with an applied voltage of −5 V.
Figure 24:
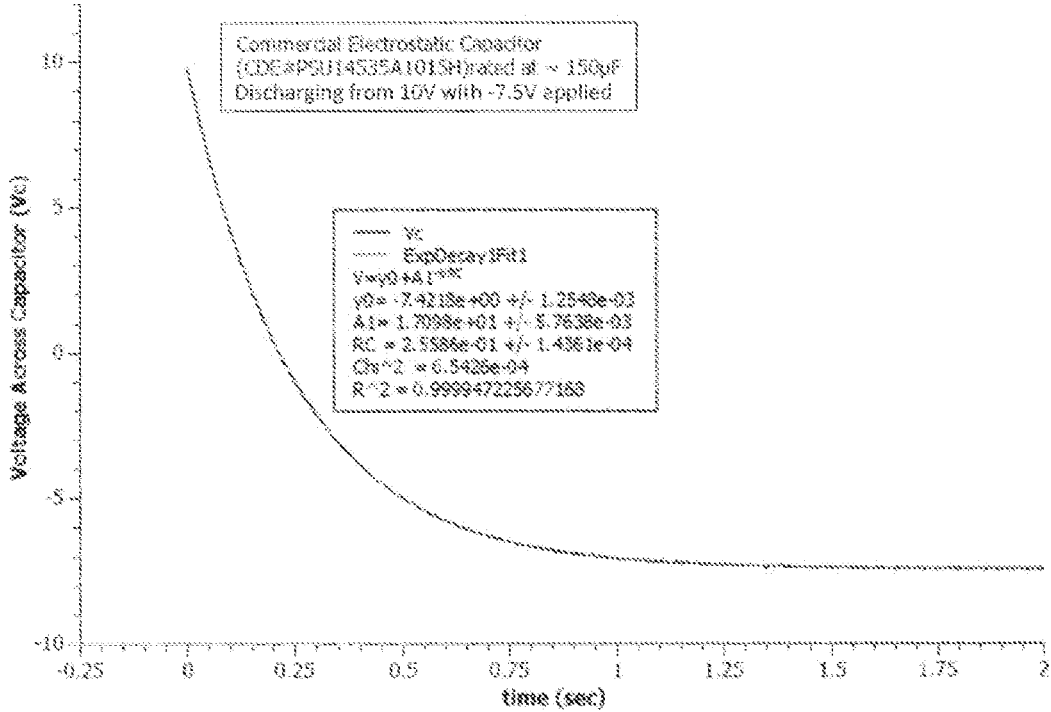
FIG. 24 is a discharge curve showing voltage as a function of time while discharging the commercial electrostatic capacitor of FIG. 19 with an applied voltage of −7.5 V.
Figure 25:
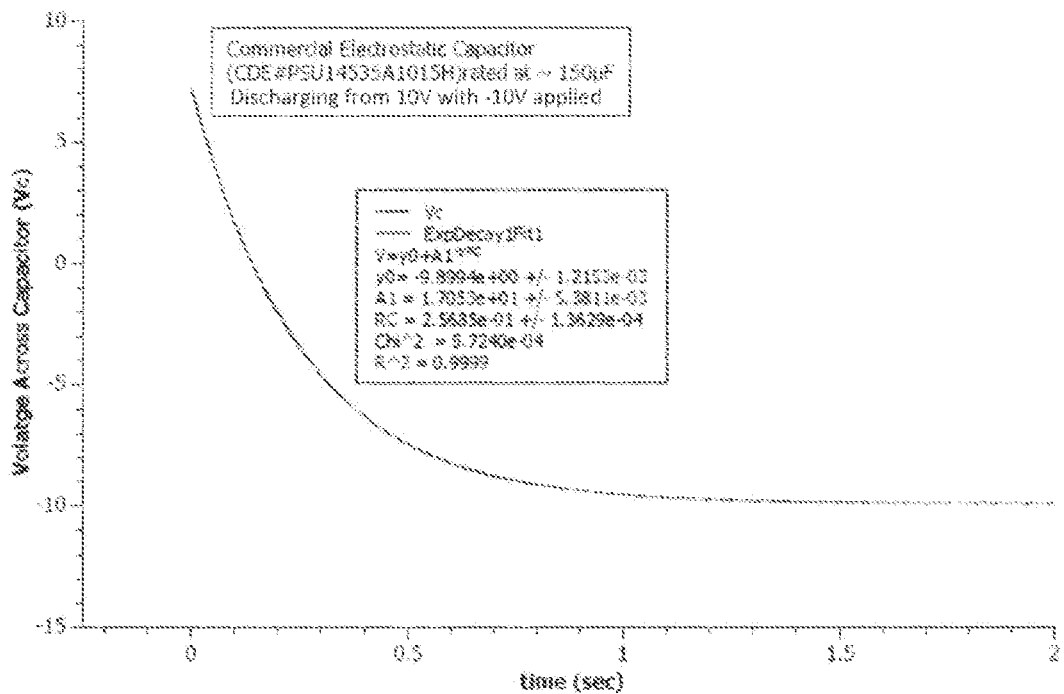
FIG. 25 is a discharge curve showing voltage as a function of time while discharging the commercial electrostatic capacitor of FIG. 19 with an applied voltage of −10 V.

From this equation, it is seen that the voltage across the capacitor in the circuit is dependent on the time constant of the circuit (t1 or R*C.) To this end, a circuit with a nonpolar 150-µF aluminum electrolytic capacitor (CDE#PSU14535A1015H, Cornell Dubilier, Liberty, S.C.) in series with a 1740-Ohm resistor was constructed as shown in FIG. 4. The capacitor was charged with a 10V power supply and discharged using varying voltages. The charge graph is shown in FIG. 19. Graphs showing the discharge curves with applied voltages of 0 V, −1 V, −2.5 V, −5 V, −7.5 V, and −10 V and fittings of the curves are shown in FIGS. 20-25, respectively.

The curves and fittings demonstrated that the experimental method of charging and discharging a capacitor agreed with what was predicted using circuit analysis as defined by the previous equations. As shown in the inserts of the curve-fitted graphs, the time constants for the discharges did not vary depending upon the voltage of discharge across the capacitor. The data is summarized in Table 2.

Figure 26:
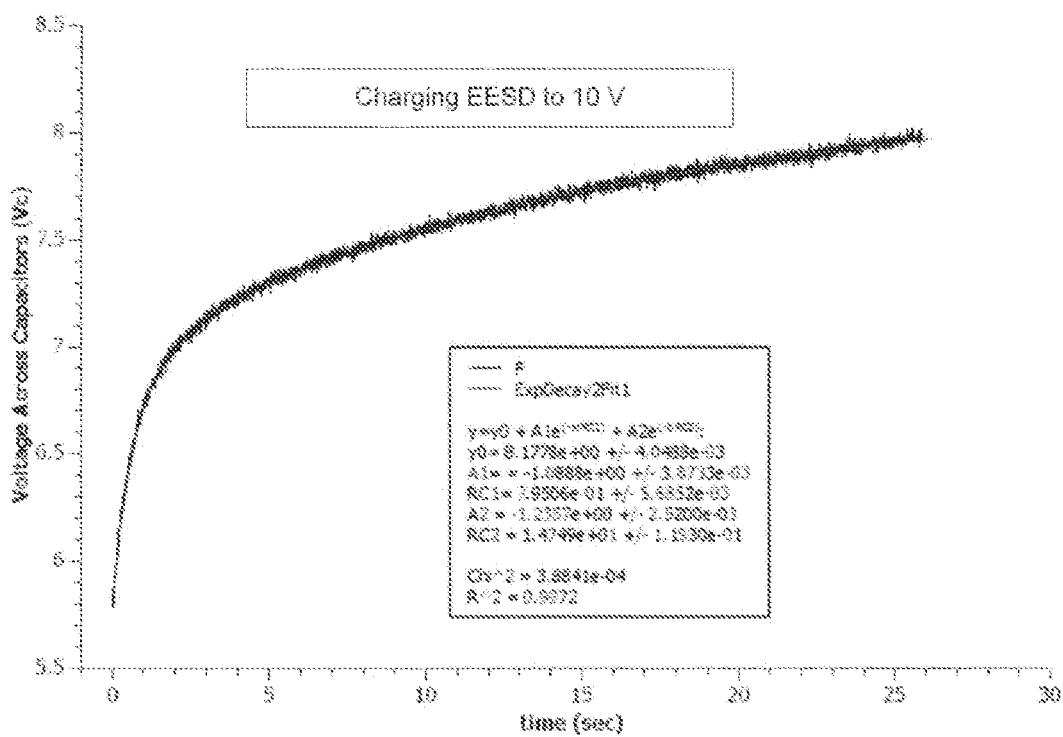
FIG. 26 is a charge curve showing voltage as a function of time while charging an entropic energy storage device as disclosed herein from 0 to 10 V.
Figure 27:
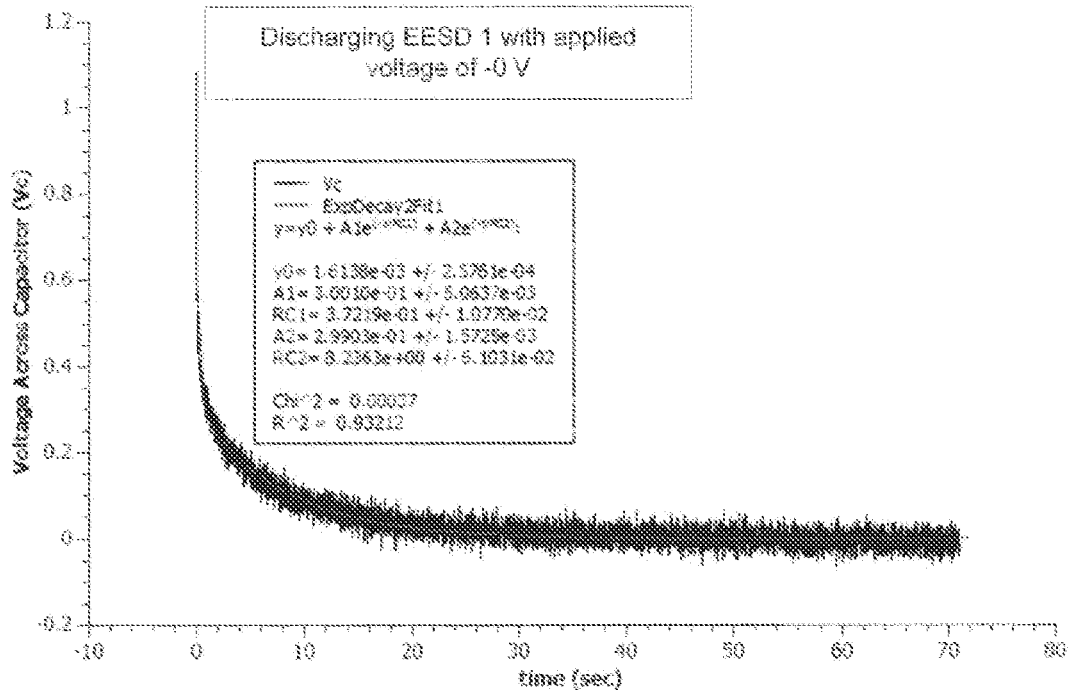
FIG. 27 is a discharge curve showing voltage as a function of time while discharging an EESD (charged to 10 V) with an applied voltage of 0 V.
Figure 28:
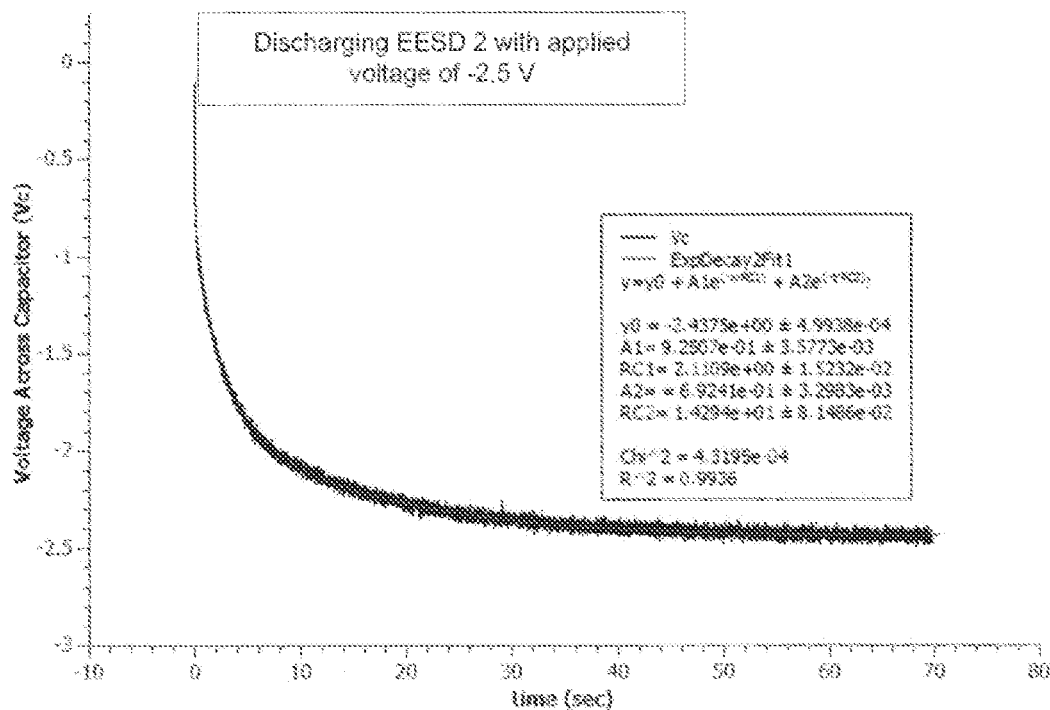
FIG. 28 is a discharge curve showing voltage as a function of time while discharging an EESD (charged to 10 V) with an applied voltage of −2.5 V.
Figure 29:
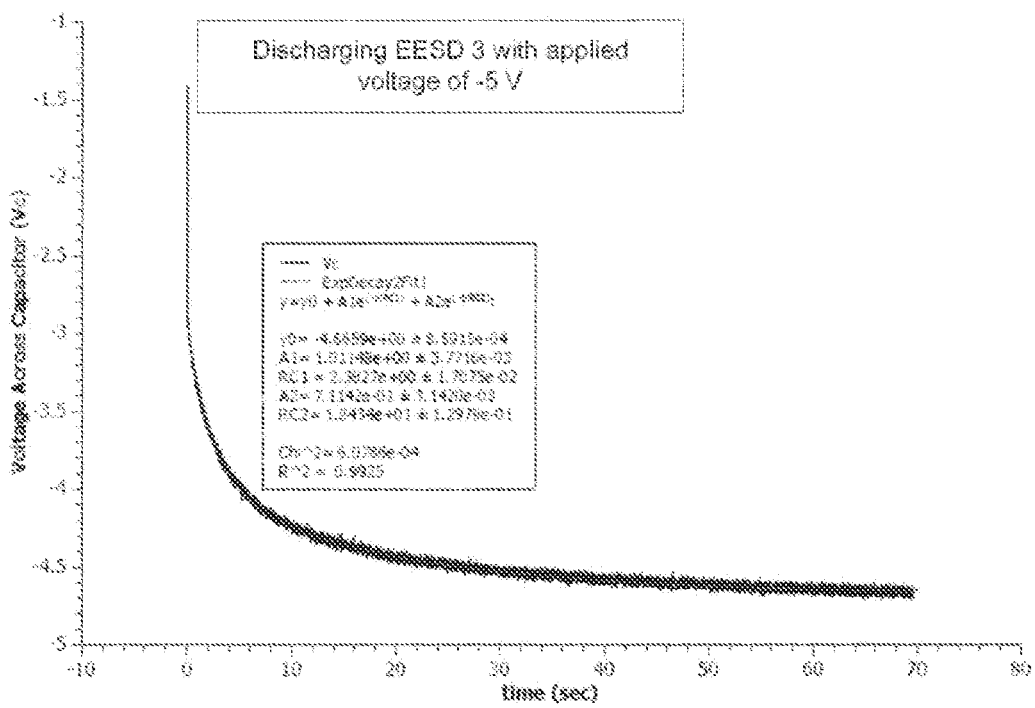
FIG. 29 is a discharge curve showing voltage as a function of time while discharging an EESD (charged to 10 V) with an applied voltage of −5 V.
Figure 30:
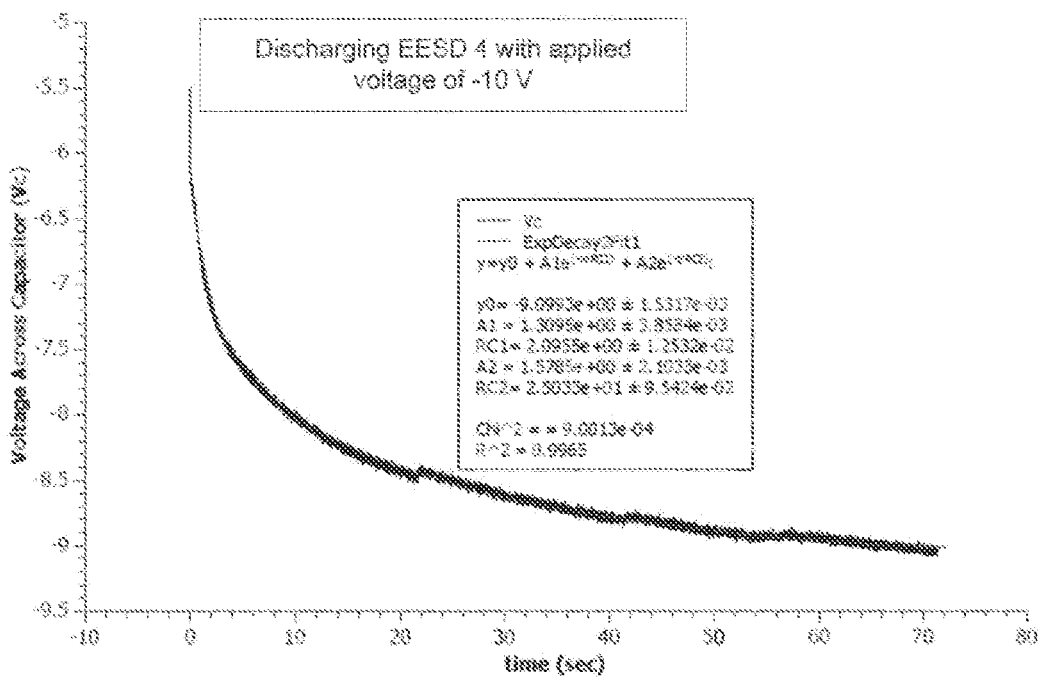
FIG. 30 is a discharge curve showing voltage as a function of time while discharging an EESD (charged to 10 V) with an applied voltage of −10 V.
Figure 31:
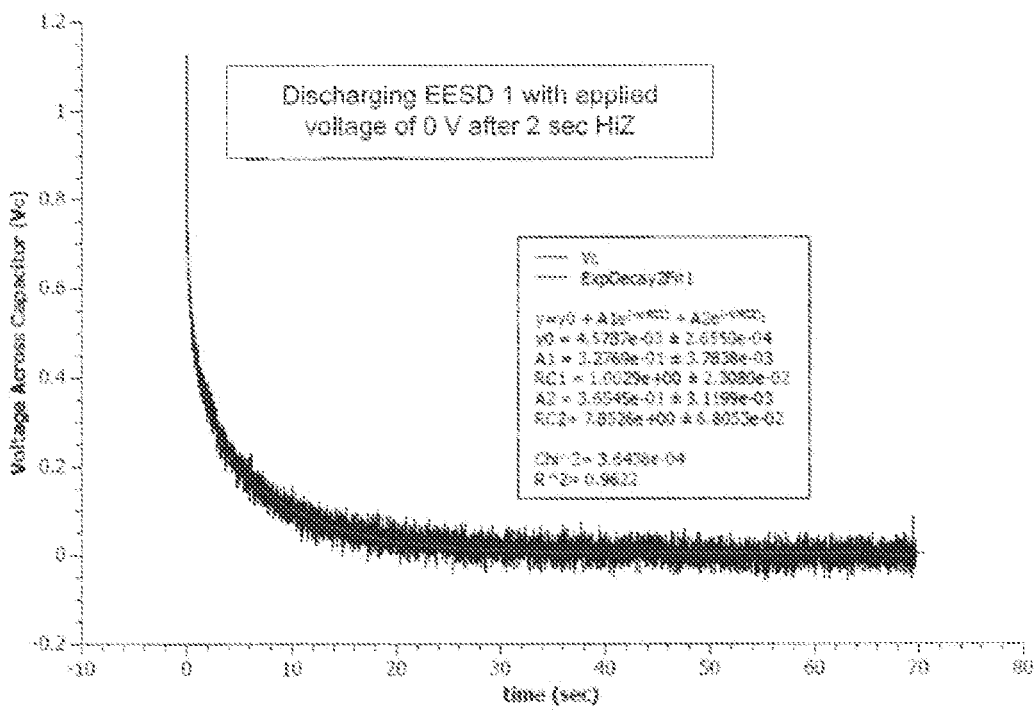
FIG. 31 is a discharge curve showing voltage as a function of time while discharging an EESD (charged to 10 V) with an applied voltage of 0 V and a 2-second high-impedance section.
Figure 32:
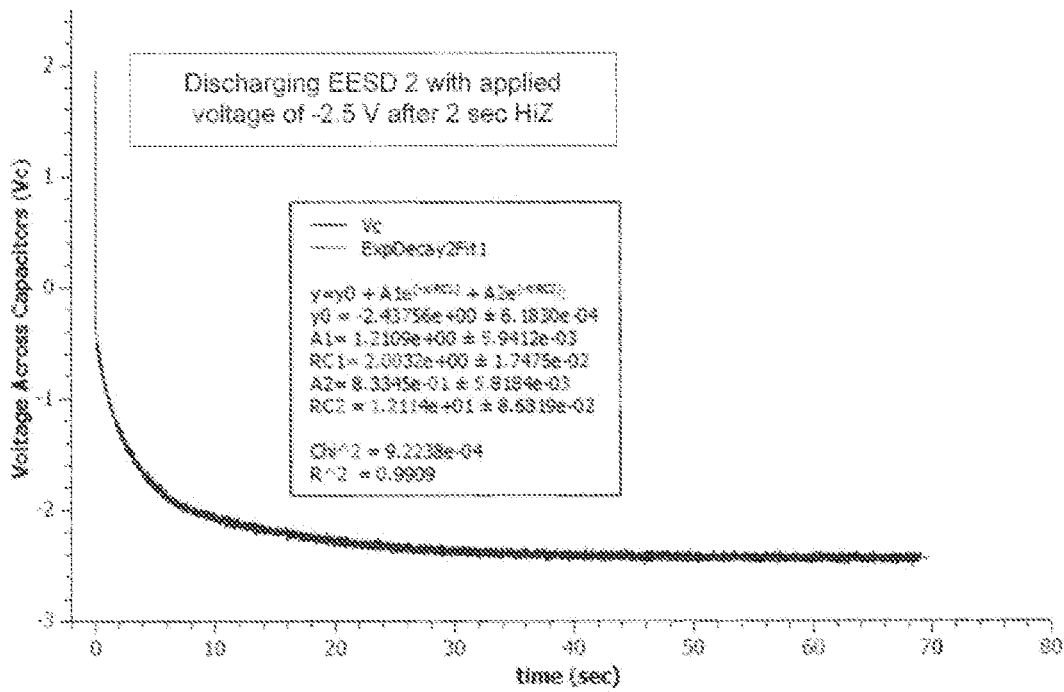
FIG. 32 is a discharge curve showing voltage as a function of time while discharging an EESD (charged to 10 V) with an applied voltage of −2.5 V and a 2-second high-impedance section.
Figure 33:
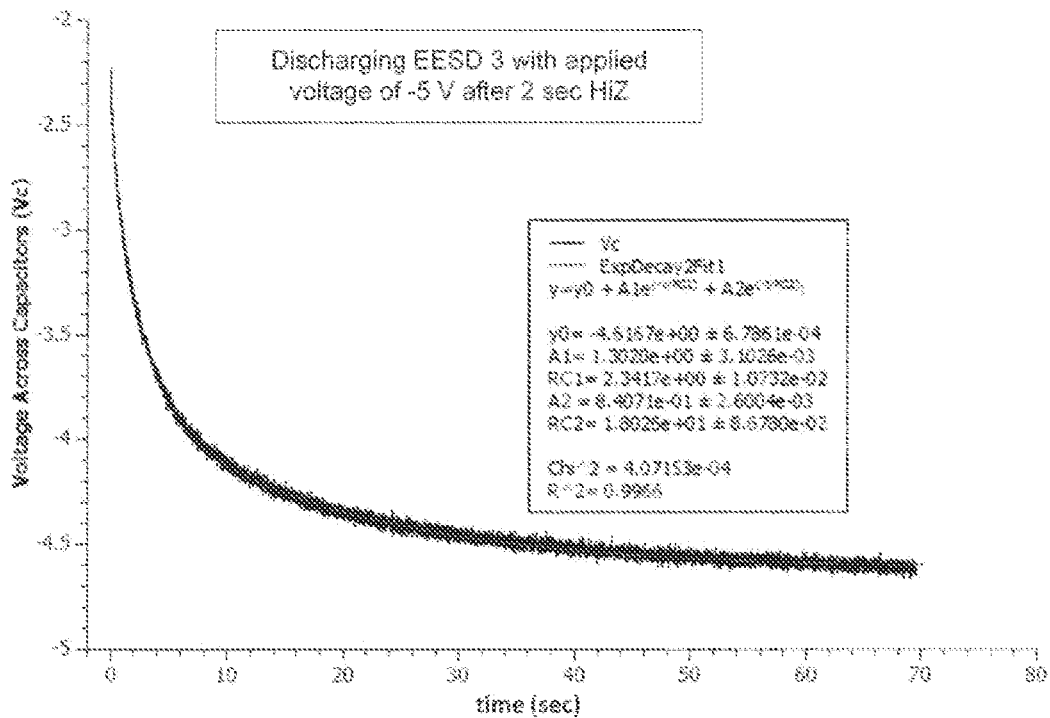
FIG. 33 is a discharge curve showing voltage as a function of time while discharging an EESD (charged to 10 V) with an applied voltage of −5 V and a 2-second high-impedance section.
Figure 34:
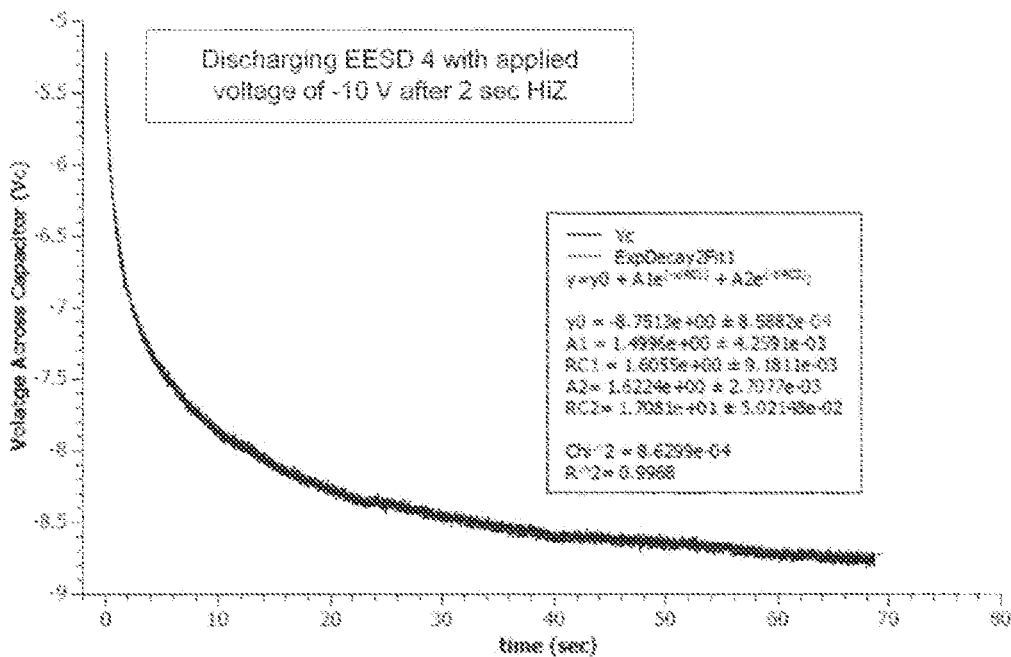
FIG. 34 is a discharge curve showing voltage as a function of time while discharging an EESD (charged to 10 V) with an applied voltage of −10 V and a 2-second high-impedance section.

The same procedure was then followed using an EESD including an entropic dielectric material comprising zein (see Table 3). Four separate EESDs of substantially uniform composition and construction were prepared and evaluated. In some cases, a brief (2 sec) open, or "high impedance", section was added to study the energy dissipation rate. The charge curve for the EESD is shown in FIG. 26. Graphs showing discharge curves (without a high impedance section) with applied voltages of 0 V, −2.5 V, −5 V, and −10 V and fittings of the curves are shown in FIGS. 27-30, respectively. Graphs showing discharge curves with a 2-second high-impedance section followed by applied voltages of 0 V, −2.5 V, −5 V, and −10 V and fittings of the curves are shown in FIGS. 31-34, respectively.

The above discharge curves for the EESD could not be fitted using a standard Pt order exponential decay. But, by using a 2nd order exponential decay equation, $$y = y_o + A1 e^{\frac{-x}{t1}} + A2 e^{\frac{-x}{t2}}$$

a good fit, with a goodness of roughly 0.99, could be performed on the EESD. With a traditional capacitor a first order exponential decay fit works very well.

TABLE 2

Plotted Discharge/Charge Curves with Fitted Values to Parametric Equations

| | Applied discharge voltage | y intercept | Coefficient of first term | First Time Constant | Coefficient of second term | Second Time Constant | Goodness of Fit |
|---|---|---|---|---|---|---|---|
| "Traditional" | 0 V | 0.018894 | 10.008 | 0.25572 | NA | NA | 0.9999 |
| Aluminum | −2.5 V | −2.4544 | 12.326 | 0.25598 | NA | NA | 0.9999 |
| electrolytic cap (CDE | −5 V | −4.9379 | 14.782 | 0.25606 | NA | NA | 0.9999 |
| #PSU14535A1015H), | −10 V | −9.894 | 17.053 | 0.2568 | NA | NA | 0.9999 |
| charged to 10 V then immediately discharged | | | | | | | |

TABLE 3

| Plotted Discharge/Charge Curves with Fitted Values to Parametric Equations | | | | | | |
|---|---|---|---|---|---|---|
| Applied discharge voltage Vs | y intercept $Y_0$ | Coefficient of first term A1 | First Time Constant RC1 | Coefficient of second term A2 | Second Time Constant RC2 | Goodness of Fit $R^2$ |
| EESDs charged to 10 V, then discharged immediately after charging to 10 V | | | | | | |
| EESD_1    0 V | 0.0016138 | 0.3001 | 0.37219 | 0.29903 | 8.2363 | 0.93212 |
| EESD_2  −2.5 V | −2.4375 | 0.92507 | 2.1109 | 0.69241 | 14.294 | 0.9936 |
| EESD_3   −5 V | −4.6659 | 1.0115 | 2.3827 | 0.71142 | 18.434 | 0.9925 |
| EESD_4  −10 V | −9.0993 | 1.3095 | 2.0955 | 1.5785 | 25.033 | 0.9965 |
| EESDs charged to 10 V, discharge after 2 sec of HiZ | | | | | | |
| EESD_1    0 V | 0.0045787 | 0.32769 | 1.0029 | 0.3654 | 7.8526 | 0.9622 |
| EESD_2  −2.5 V | −2.4376 | 1.2109 | 2.0032 | 0.83345 | 12.114 | 0.9909 |
| EESD_3   −5 V | −4.6167 | 1.302 | 2.3417 | 0.84071 | 18.026 | 0.9966 |
| EESD_4  −10 V | −8.7513 | 1.4996 | 1.6055 | 1.6224 | 17.081 | 0.9968 |

The data in Table 3 demonstrates that there are at least two mechanisms for energy storage concurrently present in the charge/discharge of these entropic energy storage devices. Both time constants for each effect are not constant with discharge voltages as they would be in a traditional capacitor (see Table 3). A consistent increase in the time constants for both the RC1 and RC2 (time constants 1 and 2) in Table 3 is noted as discharge voltage across the entropic energy storage device is increased.

This would indicate that possibly some secondary mechanism, not found in the standard capacitor, exists. The two mechanisms can be better studied using the time constants of each effect.

The experiment indicates that the applied voltage, Vs, as well as the initial voltage, $V_0$, can affect the time constants across the capacitor. It is possible to modify the discharge rate by using a negative discharge voltage. By altering one or both of the time constants, the discharge rate can be altered in a way that can possibly increase discharge time or conversely decrease discharge time while increasing power output.

If less than a full current discharge or a managed discharge is desired, then this circuit can also achieve that result with the addition of a program change to the computer or comparator as shown in FIG. 7. Modifications of this nature are well known to those versed in the art of electronic circuit design and control systems. For example, a desired current of 50% of the maximum output (maximum duty cycle at a given frequency) may be desired for control of an electric motor. This circuit would simply pulse either at one-half that pulse width at that frequency or pulse at the same width at one-half the frequency. Various combinations of the above maybe selected by the designer depending upon the other elements in the design.

Example 3

Pulsed Discharge of an Entropic Energy Storage Device in a Circuit

A circuit as shown in FIG. 4 was constructed. The energy storage device C1 was an EESD with an entropic dielectric layer comprising zein. The EESD was charged to an initial voltage of 10 V. A discharge curve (FIG. 35) was obtained by alternating between the discharge configuration of State B and the high-impedance (HiZ) configuration of State C. The discharge curve shows that an initial rapid discharge of the EESD occurred for approximately 200 microseconds followed by a slower flatter much reduced power discharge for a longer period of time. The configuration of the circuit was changed to the HiZ state (State C), and the voltage at the device's positive electrode showed a "recovery" of voltage as the heterogeneities within the dielectric homogenized.

Figure 35:
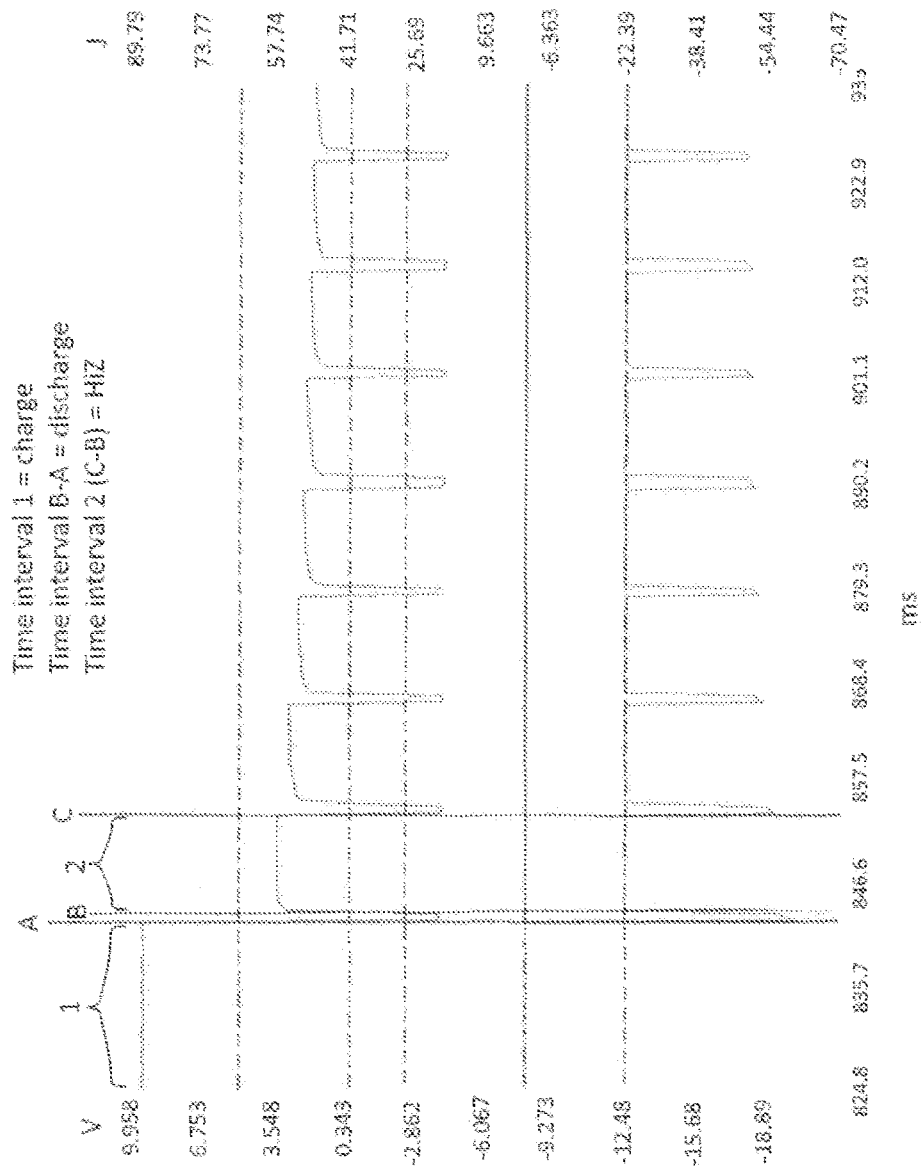
FIG. 35 is a discharge curve showing voltage changes over time during pulsed discharge of an exemplary entropic energy storage device in the circuit of FIG. 4.

With reference to FIG. 35, the upper tracing is the voltage applied to the EESD. The lower trace shows the voltage between the EESD and a 1K resistor connected to ground (this voltage is proportional to the current flowing from the EESD). A charging period of interval 1 from time 0 to the time denoted by letter A is seen during which the EESD is partially charged at +10 V.

A discharge period is denoted by the time between line A and line B. As the graph depicts, the voltage dropped from 9.5 V to −5 V to discharge the capacitor. The current discharged from the device was approximately 20 times greater than the current the device would otherwise discharge if the discharge voltage were held at ground potential. This greatly increased discharge current, however, was not constant with respect to discharge voltage. As the device discharges at a voltage more negative than ground potential, a reverse polarization of the device can take place. The discharge current rapidly fell from this very high value. This can be seen in the lower trace as a decrease in the negative voltage during the discharge time of the first pulse. When the first pulse of discharge reached a time value of approximately 1 millisecond, the EESD was disconnected from the discharge voltage and placed in a high impedance state, or resting period. Interval 2, between line B and line C, is the HiZ, resting period.

The voltage at the discharge electrode (the upper trace) increased rapidly to approximately 3.4 V. As the device was allowed to "rest" in this high impedance state, the voltage recovered somewhat further as can be seen from the slight upwards drift of the voltage prior to the next discharge pulse. This effect of voltage recovery became more pronounced as the discharge process progressed. The HiZ "recovery time" allowed the device to equilibrate its dielectric to a more homogeneous state. The next discharge pulse then was able to generate a current that was substantially larger than the current would have been if the discharge voltage had remained constant and connected.

In the example shown above, the discharge was only allowed to take place for 10% of the total time of each discharge/HiZ duty cycle. The frequency with which the 10% duty cycle discharge was applied was approximately 1 kHz. Despite the higher currents generated with this pulsed discharge regime, the device may not discharge as fast it would with a continuous discharge voltage. There is a terrific advantage when using the pulsed-discharge technique, however, since this technique helps prevent reverse polarization of the dielectric.

Although the total energy discharged during a given period of time from one pulse to the next might have been larger with a constant negative voltage rather than a short pulse, the reverse polarization of the dielectric with its possibility of heterogeneity is a problem. For many areas in the discharge curve for the device, increased discharge rate is obtained using the pulsed discharge.

Of particular interest with respect to the pulsed-discharge method is the greatly reduced rate of discharge in both the low charge area and the high charge area (see FIG. 35). This is not behavior that would have been predicted with a traditional electrostatic capacitor, particularly in the fully charged portion of the graph. If the discharge from the fully charged EESD had taken place into ground potential, then reverse polarization would not have been possible. However, the ground potential discharge current is on the order of 1% of the negative voltage discharge current. So, overall an increased rate of energy discharge is obtained using the pulsed negative DC voltage techniques described above. The 10% discharge availability is offset by the 2,000% increase in discharge current to provide an overall 100% increase in the total power delivery during the discharge.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of supplying energy from an energy storage device to a load, comprising:
   providing a circuit including a first energy storage device charged to a first voltage level, the first energy storage device including first and second electrodes with a dielectric film positioned there between, the dielectric film comprising an entropic material, and the first electrode charged positively or negatively with respect to the second electrode; and
   applying a reversed polarization electric potential to the first electrode of the first energy storage device in a first mode of operation of the circuit for a discharge period of time, thereby supplying power from the first energy storage device to a load connected to the second electrode of the first energy storage device.

2. The method of supplying energy from an energy storage device to a load according to claim 1, wherein the reversed polarization electric potential is less than the first voltage level and less than a voltage that would be generated by the first energy storage device in a high impedance state.

3. The method of supplying energy from an energy storage device to a load according to claim 1, wherein the first electrode is charged positively with respect to the second electrode, and wherein applying the reversed polarization electric potential to the first electrode comprises applying a negative voltage to the first electrode.

4. The method of supplying energy from an energy storage device to a load according to claim 1, wherein the circuit comprises a plurality of first energy storage devices connected in series.

5. The method of supplying energy from an energy storage device to a load according to claim 1, wherein the circuit further includes a second energy storage device charged to a first voltage level and coupled in series with the first energy storage device, a first switch operable to connect the second energy storage device to ground and a second switch operable to connect the second energy storage device to the load, and wherein applying a reversed polarization electric potential to the first electrode of the first energy storage device in the first mode of operation of the circuit comprises actuating the first switch to connect the second energy storage device to ground and actuating the second switch to connect the second energy storage device to the load.

6. The method of supplying energy from an energy storage device to a load according to claim 5, wherein the second energy storage device includes first and second electrodes with a dielectric film positioned there between, the dielectric film comprising an entropic material.

7. The method of supplying energy from an energy storage device to a load according to claim 1, wherein providing a circuit comprising a first energy storage device charged to a first voltage comprises:
   connecting the first energy storage device to ground; and
   applying a charge voltage to the first energy storage device for a period of time effective to charge the first energy storage device to the first voltage.

8. The method of claim 7, further comprising:
   monitoring a charge current of the first energy storage device while applying the charge voltage;
   comparing the charge current to a selected minimum value; and
   when the charge current is at or below the selected minimum level, switching the circuit to a second mode of operation in which the circuit is in a high-impedance state so that the first energy storage device does not receive the charge voltage and so that substantially no energy is supplied from the first energy storage device to the load.

9. The method of supplying energy from an energy storage device to a load according to claim 1, further comprising:
   switching the circuit to a second mode of operation for at least a threshold recovery period of time to provide a voltage recovery period during which the circuit is in a high-impedance state so that substantially no energy is supplied from the first energy storage device to the load and the entropic material is restored to a desired level of entropic equilibrium; and
   repeatedly switching the circuit between the first and second modes of operation without recharging the first energy storage device from an external power source.

10. The method of supplying energy from an energy storage device to a load according to claim 9, wherein the discharge period of time and the recovery period of time collectively constitute a duty cycle, and wherein the discharge period of time is 0.1-99.9% of the duty cycle.

11. The method of supplying energy from an energy storage device to a load according to claim 9, wherein the energy storage device is disconnected from the load while in the second mode of operation, the method further comprising reconnecting the energy storage device to the load before switching the circuit from the second mode of operation to the first mode of operation.

12. The method of supplying energy from an energy storage device to a load according to claim 9, further comprising:
   monitoring a voltage of the first energy storage device with a controller while in the first mode of operation until the voltage reaches a desired discharge voltage level;
   switching the circuit from the first mode of operation to the second mode of operation with the controller when the desired discharge voltage level is reached;
   monitoring the voltage of the first energy storage device with the controller while in the second mode of operation until the voltage reaches a desired recovery voltage level; and
   switching the circuit from the second mode of operation to the first mode of operation with the controller when the desired recovery voltage level is reached.

13. The method of supplying energy from an energy storage device to a load according to claim 9, further comprising:
   (a) receiving, with a controller, a time value for the discharge period of time;
   (b) receiving, with the controller, a time value for the recovery period of time;
   (c) monitoring the discharge period of time with the controller while the circuit is in the first mode of operation;
   (d) switching the circuit from the first mode of operation to the second mode of operation with the controller when the time value for the discharge period of time is reached;
   (e) monitoring the recovery period of time with the controller while the circuit is in the second mode of operation;
   (f) receiving, with the controller, current and voltage levels of the first energy storage device after the time value for the recovery period of time is reached;
   (g) comparing, with the controller, the current and voltage levels to target values of the current and voltage levels to provide target value comparisons; and
   (i) updating, with the controller, the time values for the discharge period of time and the recovery period of time based at least in part on the target value comparisons.

14. The method of supplying energy from an energy storage device to a load according to claim 13, further comprising:
   (j) switching the circuit from the second mode of operation to the first mode of operation with the controller; and
   (k) repeating steps (c)-(i).

15. The method of supplying energy from an energy storage device to a load according to claim 1, wherein the circuit comprises an array of first energy storage devices, the array comprising m rows connected in parallel of n energy storage devices connected in series, wherein m and n independently are integers greater than one, the method further comprising:
   connecting the load to a first row of the array via a multi-position switch;
   applying the reversed polarization electric potential to a first electrode of a first energy storage device in the first row of the array for a first discharge period of time, thereby supplying power from the first row of the array to the load;
   after the first discharge period of time, connecting the load to a subsequent row of the array via the multi-position switch; and
   applying the reversed polarization electric potential to a first electrode of a first energy storage device in the subsequent row of the array for a subsequent discharge period of time, thereby supplying power from the subsequent row of the array to the load.

16. The method of supplying energy from an energy storage device to a load according to claim 1, wherein the entropic material (i) is electrically insulative and/or exhibits a high permittivity, and (ii) comprises a plurality of polymeric molecules.

17. The method of supplying energy from an energy storage device to a load according to claim 16, wherein the polymeric molecules have one or more polar functional groups, ionizable functional groups, or a combination thereof.

18. The method of supplying energy from an energy storage device to a load according to claim 16, wherein the polymeric molecules comprise proteins.

19. The method of supplying energy from an energy storage device to a load according to claim 1, wherein the entropic material is a sterically constrained dielectric material comprising a plurality of polymeric molecules having one or more polar functional groups, ionizable functional groups, or a combination thereof, the energy storage device having an energy storage capacity, in the absence of the energy storage device having been charged and/or discharged, of at least 1 Wh/kg based solely on the weight of the sterically constrained dielectric film disposed between the electrically conductive first and second electrodes.

20. The method of supplying energy from an energy storage device to a load according to claim 19, wherein at least 1% of the plurality of polymeric molecules are bound to the first electrode or to an insulative layer disposed between the first electrode and the dielectric film.

21. The method of supplying energy from an energy storage device to a load according to claim 1, wherein the first energy storage device further comprises:
   a first insulative layer disposed between the first electrode and the dielectric film;
   a second insulative layer disposed between the second electrode and the dielectric film; or
   a first insulative layer disposed between the first electrode and the dielectric film and a second insulative layer disposed between the second electrode and the dielectric film.

22. The method of supplying energy from an energy storage device to a load according to claim 21, wherein the first insulative layer, the second insulative layer, or the first insulative layer and the second insulative layer comprise polymerized p-xylylene.

23. A circuit, comprising:
   a first energy storage device including first and second electrodes with a dielectric film positioned there between, the dielectric film comprising an entropic material, and the first electrode charged positively or negatively with respect to the second electrode;
   a second energy storage device including first and second electrodes with a dielectric film positioned there between, the first electrode charged positively or negatively with respect to the second electrode;
a first multi-position switch connected to the first electrode of the first energy storage device and adapted to (i) couple the first electrode of the first energy storage device to a charge voltage source, (ii) couple the first electrode of the first energy storage device to a load, or (iii) place the first energy storage device in a high-impedance state so that substantially no energy is supplied from the first energy storage device to a load;
a second multi-position switch connected to the second electrode of the second energy storage device and adapted to couple the second electrode of the second energy storage device to a load or to ground; and
a third multi-position switch connected to the first electrode of the second energy storage device and adapted to (i) couple the first electrode of the second energy storage device to a charge voltage, (ii) couple the first electrode of the second energy storage device to ground, or (iii) place the second energy storage device in a high-impedance state in conjunction with the second multi-position switch positioned to connect the second electrode of the second energy storage device to ground.

24. The circuit of claim 23, wherein the dielectric film of the second energy storage device comprises an entropic material.

25. The circuit of claim 23, further comprising a controller operable to actuate the first, second, and third multi-position switches.

26. A circuit, comprising:
a first array of energy storage devices, the first array comprising $m_1$ rows in parallel of $n_1$ energy storage devices connected in series, wherein $m_1$ and $n_1$ are integers, each energy storage device of the first array including first and second electrodes with a dielectric film positioned there between, the dielectric film comprising an entropic material, and the first electrode of each energy storage device charged positively or negatively with respect to the second electrode;
a second array of energy storage devices, the second array comprising $m_2$ rows in parallel of $n_2$ energy storage devices connected in series, wherein $m_2$ and $n_2$ are integers, each energy storage device of the second array including first and second electrodes with a dielectric film positioned there between, the first electrode of each energy storage device charged positively or negatively with respect to the second electrode;
a first input multiplexer connected to ground and to the first array;
a second input multiplexer connected to the second array;
a first multi-position switch coupled to the first array and adapted to (i) couple the first array to a charge voltage source, (ii) couple the first array to a load, or (iii) place the first array in a high-impedance state so that substantially no energy is supplied from the first array to a load;
a second multi-position switch coupled to the second input multiplexer and adapted to (i) couple the second input multiplexer to a charge voltage source, or (ii) couple the second input multiplexer to ground;
a third multi-position switch coupled to a first side of the second array and adapted to (i) couple the first side of the second array to a load, (ii) couple the first side of the second array to ground, or (iii) place the second array in a high-impedance state in conjunction with the second multi-position switch positioned to connect the second input multiplexer to ground; and
a controller operable to control the first and second input multiplexers and to actuate the first, second, and third multi-position switches.

* * * * *